United States Patent
Mizuo

(10) Patent No.: US 10,199,964 B2
(45) Date of Patent: Feb. 5, 2019

(54) MOTOR CONTROL APPARATUS AND MOTOR CONTROL METHOD

(71) Applicant: CANON KABUSHIKI KAISHA, Tokyo (JP)

(72) Inventor: Yoshihiro Mizuo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 967 days.

(21) Appl. No.: 13/949,939

(22) Filed: Jul. 24, 2013

(65) Prior Publication Data

US 2014/0035496 A1 Feb. 6, 2014

(30) Foreign Application Priority Data

Jul. 31, 2012 (JP) ................................. 2012-170253
Jul. 31, 2012 (JP) ................................. 2012-170254
Aug. 2, 2012 (JP) ................................. 2012-172375

(51) Int. Cl.
*H02P 1/04* (2006.01)
*H02P 6/15* (2016.01)
*H02P 8/18* (2006.01)

(52) U.S. Cl.
CPC . *H02P 6/15* (2016.02); *H02P 8/18* (2013.01)

(58) Field of Classification Search
CPC ............ G01N 33/5061; G01N 33/566; G03G 15/5008; G03G 2215/0161
See application file for complete search history.

(56) References Cited

U.S. PATENT DOCUMENTS 3,699,441 A * 10/1972 Linders .................. G01R 29/16
324/108
2006/0274861 A1* 12/2006 Langenbach ..... H04L 25/03197
375/341

(Continued)

FOREIGN PATENT DOCUMENTS

JP     09-312989 A    12/1997
JP     2002-018178 A   1/2002

(Continued)

OTHER PUBLICATIONS

The above foreign patent documents were cited in the Feb. 28, 2017 Japanese Office Action, which is enclosed with an English Translation, that issued in Japanese Patent Application No. 2013135249.

*Primary Examiner* — Bickey Dhakal
*Assistant Examiner* — Zoheb Imtiaz
(74) *Attorney, Agent, or Firm* — Cowan, Liebowitz & Latman, P.C.

(57) ABSTRACT

A motor control apparatus applying a sinusoidal drive waveform to a motor and including a position detection unit outputting a signal according to a motor shaft's position; and a control unit: acquiring a phase value of the motor's drive waveform when a signal is output by the position detection unit, changing a cycle of the drive waveform by measuring time from a previously output signal to a presently output signal, comparing the phases of the drive waveform and the motor shaft, and controlling to change to a cycle at which a phase value of the drive waveform matches a target phase value when a travel time corresponding to a phase value for adjustment has elapsed from a present time when a phase value of the drive waveform presently acquired differs from a target phase value acquired when the motor's drive current and drive voltage are in a designated phase relationship.

24 Claims, 45 Drawing Sheets

(56) References Cited

U.S. PATENT DOCUMENTS

| | | | |
|---|---|---|---|
| 2007/0172257 A1* | 7/2007 | Matsuda | G03G 15/161 399/167 |
| 2008/0061723 A1* | 3/2008 | Fujita | G05D 13/62 318/560 |
| 2008/0303463 A1* | 12/2008 | Darby | D06F 37/304 318/400.09 |
| 2009/0079380 A1* | 3/2009 | Lundell | G05B 23/0235 318/603 |
| 2009/0102437 A1* | 4/2009 | Nakagawa | H02P 9/48 323/217 |
| 2009/0302792 A1* | 12/2009 | Osada | H02P 29/032 318/400.21 |
| 2010/0052589 A1* | 3/2010 | Hsieh | H02H 7/09 318/490 |
| 2011/0280627 A1* | 11/2011 | Matsuda | G03G 15/5008 399/167 |
| 2012/0139461 A1* | 6/2012 | Suzuki | H02P 27/085 318/400.02 |
| 2012/0187877 A1* | 7/2012 | Yamagiwa | H02K 1/276 318/400.02 |
| 2014/0232309 A1* | 8/2014 | Zhou | H02P 27/08 318/400.02 |
| 2014/0254217 A1* | 9/2014 | Li | G01R 21/06 363/37 |

FOREIGN PATENT DOCUMENTS

| | | |
|---|---|---|
| JP | 2002-119089 A | 4/2002 |
| JP | 2004-348227 A | 12/2004 |
| JP | 2005-012955 A | 1/2005 |
| JP | 2009-106009 A | 5/2009 |

* cited by examiner

DIRECTION OF FORWARD ROTATION

MOTOR CONTROL APPARATUS AND MOTOR CONTROL METHOD

BACKGROUND OF THE INVENTION

Field of the Invention

The present invention relates to a control apparatus and control method for a motor provided with a position detection unit, and to a technology for enhancing motor drive efficiency.

Description of the Related Art

A stepping motor has features such as compact size, high torque, and long life, and enables easy implementation of digital positioning operations by open-loop control. Thus, it is widely used in equipment such as imaging devices, optical disk devices, printers, and projectors. However, step-out occurs when large loads are imposed on the stepping motor or during high-speed rotation. In order to solve this situation, prevention methods that an encoder is attached to the stepping motor and the energization is switched in accordance with a detected position of the rotor, i.e. brushless DC motor operation is performed have previously been performed.

Japanese Patent Laid-Open No. 2002-119089 discloses a method that high speed and high torque are realized while preventing step-out by using an encoder signal that outputs an output signal according to rotation of a rotor in the stepping motor and by efficiently applying a square-wave drive waveform to the magnetic phase of the rotor.

On the other hand, with respect to conventional brushless motors, a technology that the motor is actually rotated in forward direction and reverse direction after completion of assembly so as to measure motor properties in each direction and that measurement results of motor properties is compared so as to adjust a physical position of a rotational position sensor is known. Moreover, Japanese Patent Laid-Open No. 2005-12955 discloses a method that the rotor of the brushless motor is rotated by using a separate external power source and that a phase difference of an electromotive force signal generated by a motor coil and an encoder output signal is compared so as to detect an amount of physical position deviation of the encoder.

Japanese Patent Laid-Open No. 2004-348227 discloses a method that with respect to a stepping motor, a moving position is corrected so that the motor is again driven to the target position when the position of the motor does not reached the target position, after a drive signal for driving to a target position is input.

However, in the prior art technologies, because a square-wave drive waveform is used and the drive waveform includes harmonic components, a large amount of noise is occurred. Moreover, with a square-wave drive waveform, the accuracy of the stopping position of the stepping motor is poor.

In Conventional brushless motors, it is required that the speed is measured while brushless driving is conducted and deviations of the position are adjusted from the measurement results to thereby take many time. Moreover, in the conventional technology disclosed in Japanese Patent Laid-Open No. 2005-12955, it is impossible to adjust after the brushless motor has been incorporated into the equipment to be driven. Setting operations are difficult for adjustment, because the rotor unit required to be exposed to the exterior in order to connect the rotor to an external power source.

With conventional methods for correcting moving position, positional determination is performed after temporarily stopping the motor, after which the correction operation is performed. Thus, it takes long time for moving to the target position including static stoppage time and the like.

SUMMARY OF THE INVENTION

The motor control apparatus of the present invention controls the phase of a drive waveform by using a sinusoidal drive waveform while detecting a motor shaft position.

The motor control apparatus of the present invention also simply and quickly adjusts a signal output by a position detection unit provided at the motor.

Furthermore, the motor control apparatus of the present invention causes the motor to rapidly reach the target position even when the motor loses step, by constantly correcting deviations of the position due to step-out by detecting the existence or non-existence of step-out during moving to a target position.

The apparatus of the present invention is A motor control apparatus drives by application of a sinusoidal drive waveform to a motor and includes a position detection unit configured to output a signal according to a position of a motor shaft; and a control unit configured to acquire a phase value of a drive waveform of the motor at a point of a signal output by the position detection unit, and change a cycle of the drive waveform by measuring a time from a point of a signal that has been previously output by the position detection unit to a point of a signal that is presently output by the position detection unit. The control unit compares phases of the drive waveform and the motor shaft, and controls to change to a cycle at which a phase value of the drive waveform matches a target phase value at a point when a travel time corresponding to a phase value for adjustment has elapsed from a present time when a phase value of the drive waveform presently acquired at a timing of the signal differs from a target phase value of the drive waveform acquired when a drive current and a drive voltage of the motor are in a designated phase relationship.

According to the present invention, a motor control apparatus using a sinusoidal drive waveform can control the phase of the drive waveform by detecting the position of the motor shaft. In addition, according to the present invention, it is possible to simply and quickly adjust a signal output by a position detection unit. Furthermore, according to the present invention, motor control that can be realized the motor rapidly reach the target position even when the motor loses step, by constantly correcting deviations of the position due to step-out by detecting the existence or non-existence of step-out during moving to a target position.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the attached drawings. The motor control apparatus and the motor control method are described with illustration of a rotary drive motor, but the present invention can also be applied to a linear drive motor in which the motor shaft conducts linear movement.

Figure 1:
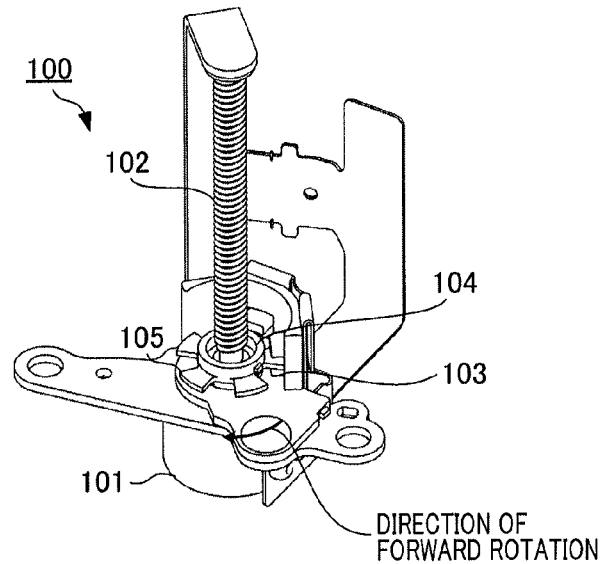
FIG. 1 is a diagram illustrating a motor unit including a position detection sensor of an embodiment of the present invention.

FIG. 1 is an external view illustrating a motor unit 100 of an embodiment of the present invention. The motor unit 100 comprises a stepping motor 101, and a rotor shaft 102 comprises a slit rotating plate 105. The slit rotating plate 105 is designed so that the ratio of a light region and a dark region is 50:50. As a pair of optical detection units which optically detect the light region and the dark region, a ch0 photointerrupter 103 and a ch1 photointerrupter 104 are attached to the slit rotating plate 105 that is an unit to be detected. The slit rotating plate 105 rotates in conjunction with rotation of the rotor shaft 102 to thereby vary the output signals of each photointerrupter. Hereinafter, the ch0 photointerrupter used to detect rotational position of the motor shaft is referred to as ch0-PI, and the ch1 photointerrupter is referred to as ch1-PI.

Figure 2:
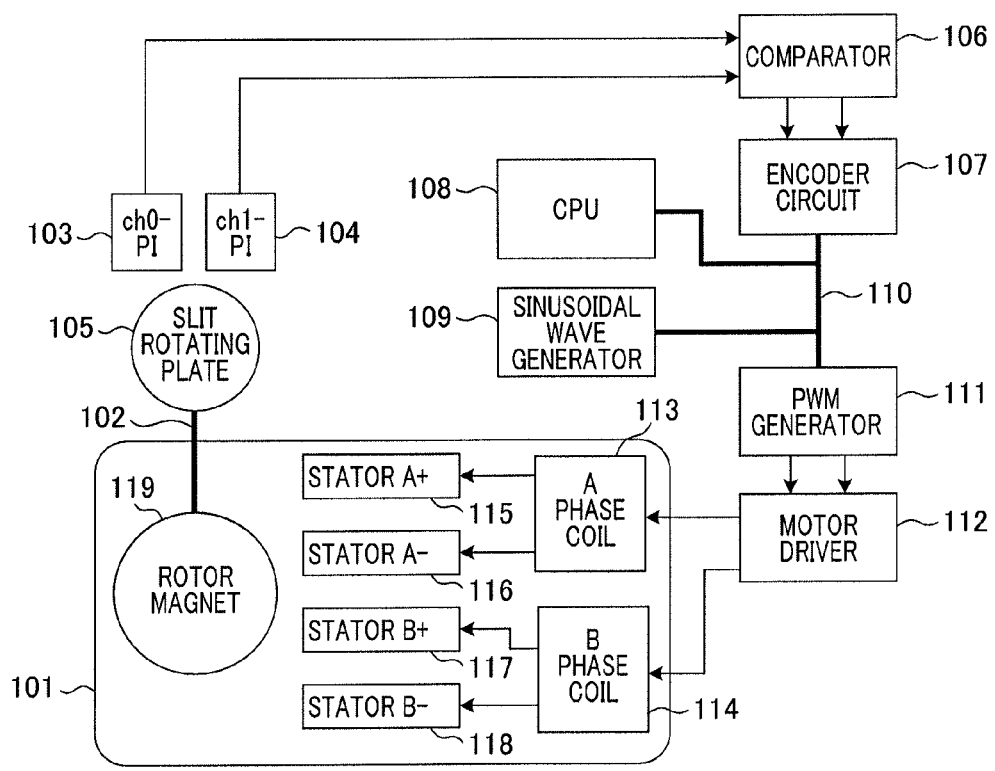
FIG. 2 is a schematic diagram illustrating a system configuration.
Figure 4:
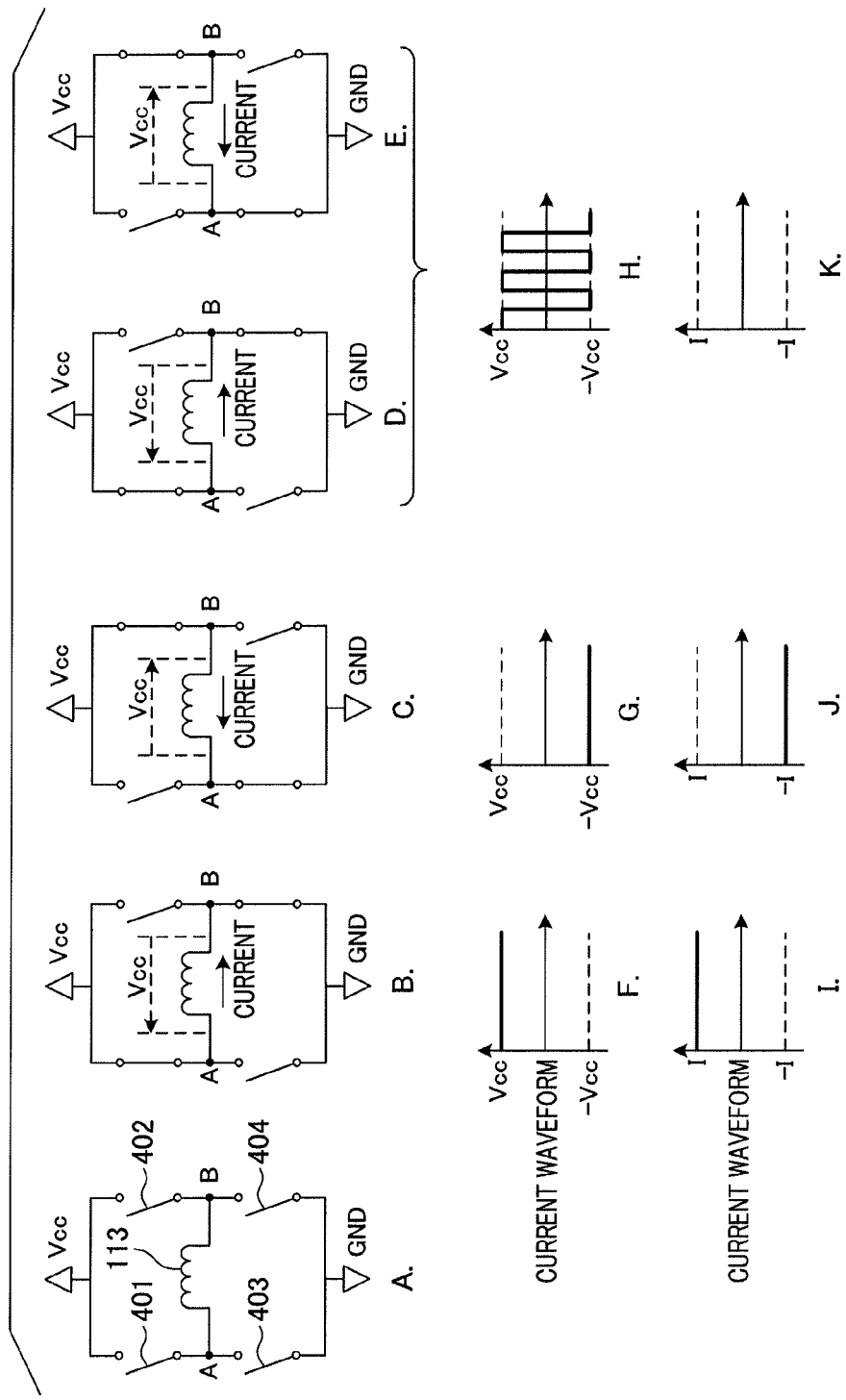
FIGS. 4A to 4K are diagrams of motor driver operation.

FIG. 2 shows an example of a system configuration including an electric circuit for driving. The respective components indicated by reference numbers 101 to 105 are as described above. A comparison unit 106 outputs a binarized signal in a subsequent stage by comparing the respective analog input signals from the ch0-PI 103 and the ch1-PI 104 with a set threshold voltage value. In the present embodiment, the threshold value is adjusted in advance so that the ratio of an H (high) level and an L (low) level of output of the comparison unit 106 is 50:50 in a state where the motor is rotating at fixed speed without rotational irregularity. Hereinafter, a first detection signal that the signal of ch0-PI 103 is binarized is referred to as an ENC0 signal, and a second detection signal that the signal of ch1-PI 104 is binarized is referred to as an ENC1 signal. The encoder circuit 107 acquires timing information at the variation times of the respective signal of the ENC0 signal and the ENC1 signal and performs position counting and signal cycle counting with respect to these signals. In encode processing, the four signal categories of rise and fall of the ENC0 signal and rise and fall of the ENC1 signal are distinguished, and interrupt processing is performed in a CPU (central processing unit) 108 at the respective timing that the respective signals are input. At this time, the CPU 108 determines the four signal categories according to the interrupt factor. The CPU 108 has a function that reads and runs a program from memory, and accesses the encoder circuit 107, a sinusoidal wave generator 109, and a PWM (pulse width modulation) generator 111 via a bus 110. The sinusoidal wave generator 109 has a reference table of a multi-value waveform data with a resolution of 512 with respect to one cycle of a sinusoidal wave. When the sinusoidal wave generator 109 transmits the signal of a PWM value corresponding to a multi-value waveform table value to the PWM generator 111, the PWM signal output by the PWM generator 111 is amplified by a motor driver 112 and is supplied to the stepping motor 101. The details of signal transmission from the sinusoidal wave generator 109 to the stepping motor 101 are described below with reference to FIGS. 4 and 5.

Next, the structure of the motor driver 112 is described with reference to the schematic diagrams of FIGS. 4A to 4K. FIG. 4A illustrates states that an A phase coil 113 is connected via switching elements 401 to 404. As shown in FIG. 4B, when the A phase PWM signal from the PWM generator 111 is a HIGH signal (hereinafter referred to as "H signal"), only switching elements 401 and 404 are in a closed state. At this time, at both ends of the A phase coil 113, a potential difference is generated in a voltage Vcc supplied to the motor driver 112 with the A side as high potential. FIG. 4F shows the A side potential relative to the B side of the coil 113 at this time, and FIG. 4I shows the current that flows. The drive current that flows to the A phase coil 113 at this time is referred to for purposes of convenience as "I."

Conversely, when the A phase PWM signal from the PWM generator 111 is a LOW signal (hereinafter referred to as "L signal"), only switching elements 402 and 403 are closed to thereby be switched to a state as shown in FIG. 4C. At this time, at both ends of the A phase coil 113, a potential difference is generated in a voltage Vcc supplied to the motor driver 112 with the A side as high potential. FIG. 4G shows the A side potential relative to the B side of the A phase coil 113 at this time, and FIG. 4J shows the drive current.

An example of the case where the above two states are repeated in a short time are shown in FIGS. 4D, 4E, 4H and 4K. When the states of FIGS. 4D and 4E are repeated in equal periods of time, a binary square-wave voltage signal of −Vcc and +Vcc is generated as shown in FIG. 4H. When this voltage signal is applied to the A phase coil 113, a current waveform appears in a form in which the voltage signal is flattened due to the current delay component of the coil. When the HL signal ratio of −Vcc and +Vcc is 50%, the effective current value is 0. Application to the output of a steady voltage of 0 V when the HL signal ratio of the PWM signal is 50% can be treated as effectively identical to application of a steady voltage of +Vcc when 100%, and a steady voltage of +Vcc/2 when 75%.

Figure 5:
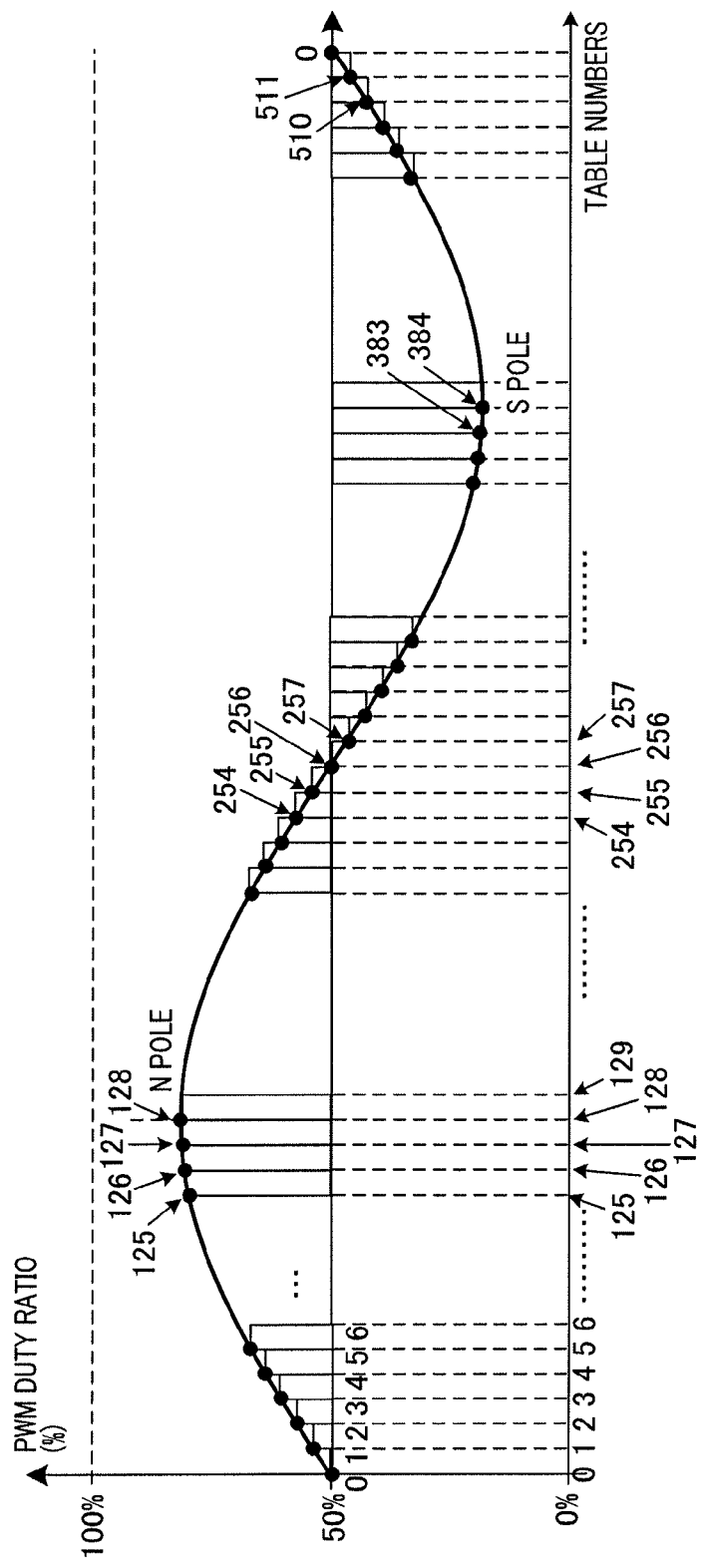
FIG. 5 is a diagram illustrating an output of a sinusoidal wave generator.

In the sinusoidal wave generator 109, a duty ratio value (%) for PWM control is stored in the reference table with respect to each of the 512 table numbers. The table numbers from 0 to 511 correspond to phase values of a sinusoidal waveform. FIG. 5 shows the details of an example of a sinusoidal wave reference table. Table number 0 is equivalent to the 0° phase of a sinusoidal wave, and table number 256 is equivalent to the 180° phase of a sinusoidal wave. A value of duty ratio 50% is stored with respect to table number 0, and duty ratio values for PWM output are stored according to phase with respect to the subsequent table numbers. In the example of FIG. 5, since a +Vcc value is output when the duty ratio value is 100%, the peak of the table values is set at a value less than 100% so that the gain of a sinusoidal wave can be varied at any time. According to the above method, a sinusoidal voltage signal can be effectively applied to a motor coil with a digital binary output signal.

Figure 3:
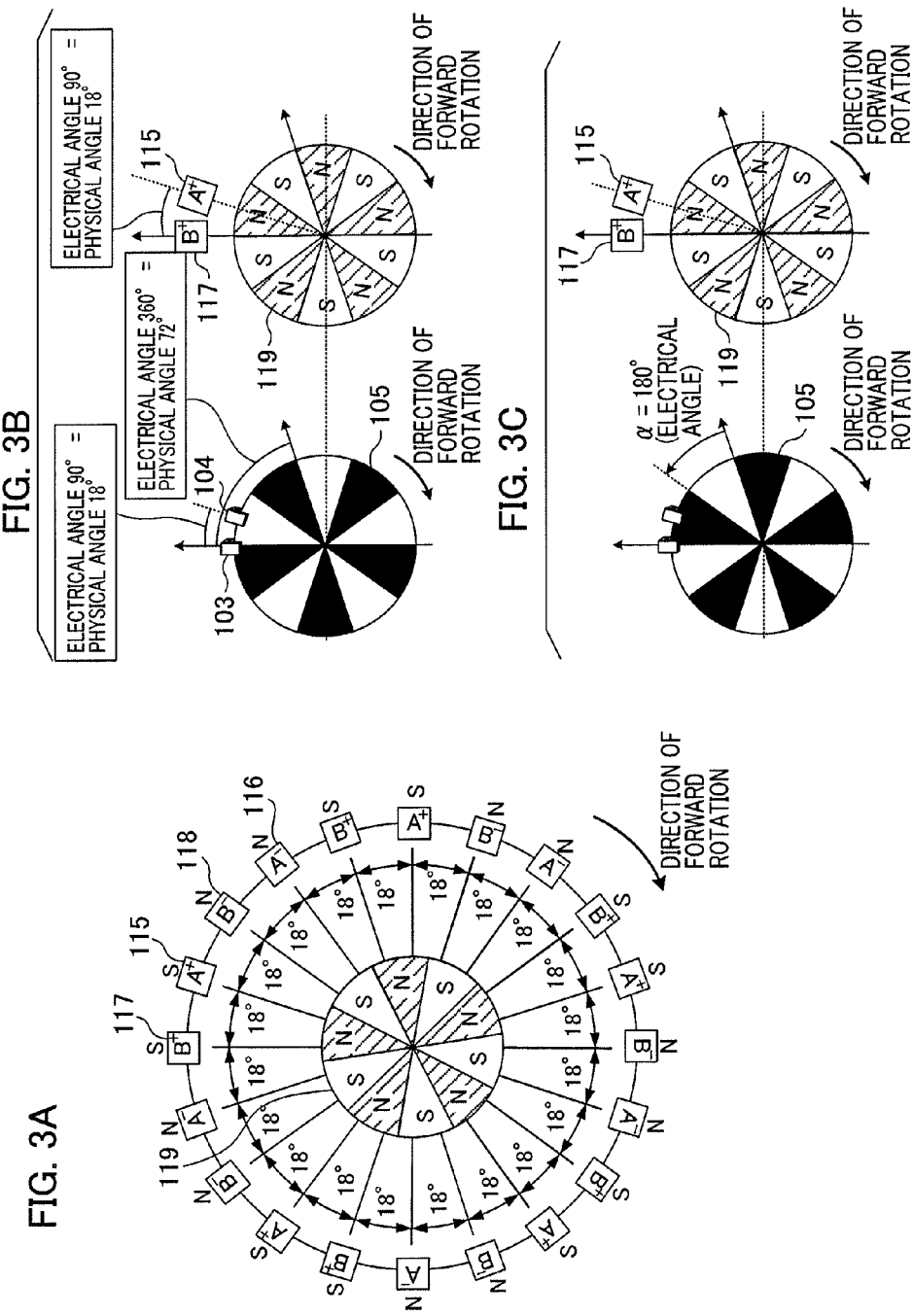
FIGS. 3A to 3C are diagrams illustrating positional relationships of a motor, stator, and slit rotating plate.

Continuing the description by returning to FIG. 2, sinusoidal signals output by the motor driver 112 are applied to the A phase coil 113 and a B phase coil 114. Four sinusoidal voltages with different phases are generated with respect to below-described a stator A+ 115, a stator A− 116, a stator B+ 117, and a stator B− 118. The voltage waveforms of the A phase and the B phase, the stator application voltage, the rotor stoppage position, and the position of the slit rotating plate 105 at that time are described in detail with reference to FIGS. 3, 5, and 6.

FIG. 3A is a schematic diagram illustrating the internal structure of the stepping motor 101 of the present embodiment. The number of pole pairs of a rotor magnet 119 is 5 (10 poles), and stators are disposed at every 18° of physical angle around the perimeter thereof. The clockwise direction is adopted as the direction of forward rotation (first direction).

The stator A+ 115, the stator A− 116, the stator B+ 117, and the stator B− 118 are disposed at regular intervals around the motor shaft. The stator A+ 115 and stator B+ 117 generate a magnetic force of N pole when the voltage applied to the coil is in the positive region of a sinusoidal waveform. The stator A− 116 and stator B− 118 generate a magnetic force of S pole when the voltage applied to the coil is in the positive region of a sinusoidal waveform. In FIG. 5, N pole is described in the positive region of a sinusoidal waveform and S pole in the negative region is described, and these illustrate the magnetic force generated with respect to the stator A+ 115 and stator B+ 117. The reverse relation exists with respect to the stator A− 116 and stator B− 118.

Figure 6B:
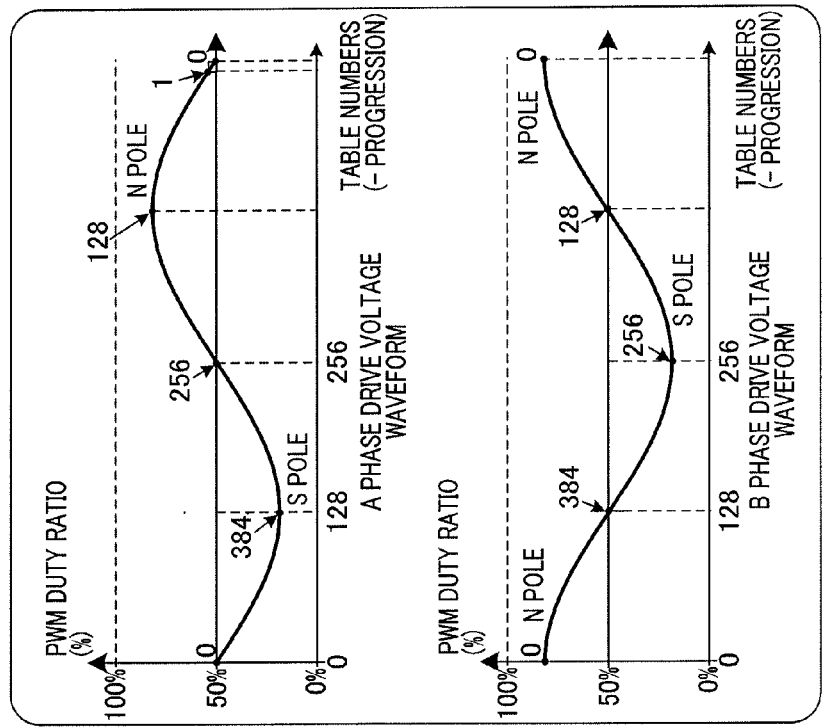
FIGS. 6A and 6B are diagrams illustrating a sinusoidal drive waveform.
Figure 6A:
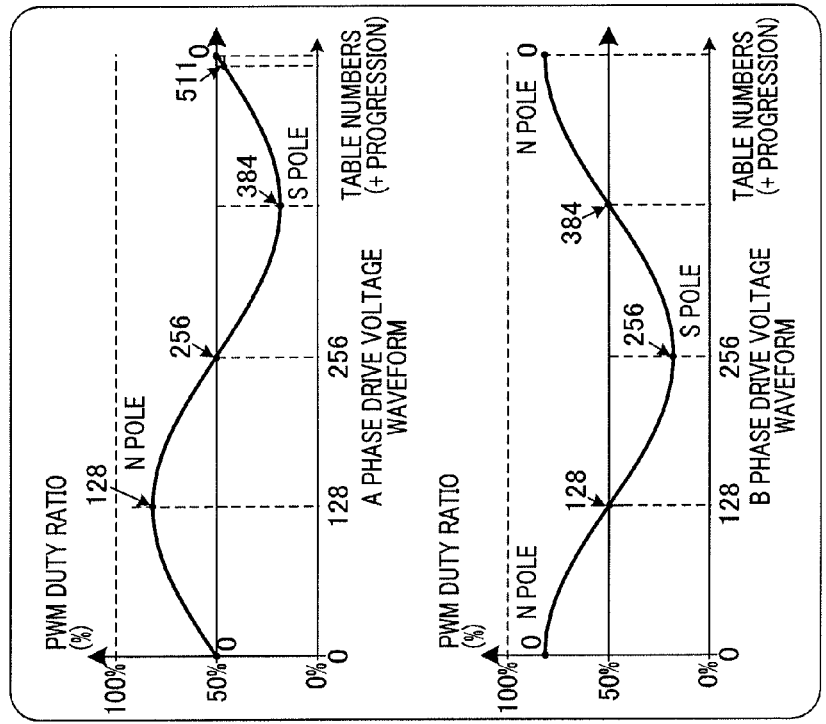

FIGS. 6A and 6B illustrate drive voltage waveforms of each phase. When the signal shown in FIG. 6A is respectively applied to the A phase coil and the B phase coil, the rotor shaft 102 rotates in the direction of forward rotation shown in FIGS. 1 and 3. When the signal shown in FIG. 6B is respectively applied to the A phase coil and the B phase coil, the rotor shaft 102 rotates in the second direction that opposes the direction of forward rotation shown in FIGS. 1 and 3. During forward rotation, drive waveform signals are generated with the table numbers advancing in the positive direction, and during reverse rotation, drive waveform signals are generated with the table numbers advancing in the reverse direction. With respect to the outputs of the A phase and the B phase, during forward rotation, the B phase outputs a waveform that is 90 degrees ahead of the A phase so that the A phase is a Sin wave (sine wave), and the B phase is a Cos wave (cosine wave). Consequently, during reverse rotation, a waveform is output in which the B phase is delayed by 90 degrees relative to the A phase.

FIG. 3B shows the positional relationship between a respective stator and photointerrupter, and the phase relationship between the magnetization phases of the rotor magnet 119 and the reference positions of the slit rotating plate 105. The positional relationship where the N pole region of the rotor magnet 119 and the light region of the slit rotating plate 105 exactly overlap is established as the reference positional relationship. Based on the reference position relationship, FIG. 3C shows the case where the slit rotating plate 105 is fixed at a position where it is displaced at an electrical angle of α degrees (180 degrees in the diagram) in the direction of reverse rotation. An electrical angle is a phase angle of a sinusoidal waveform applied to the rotor, and the angle at which the rotor magnet 119 advances at that time is redefined to 360 degrees. Consequently, in the case of the present embodiment, a physical angle of 72 degrees of the slit rotating plate 105 and the rotor magnet 119 is equivalent to an electrical angle of 360 degrees.

FIG. 3B shows physical positions of the stator A+ 115, the stator B+ 117, the ch0-PI 103, and the ch1-PI 104. There are actually 20 stators, as in FIG. 3A, but the positions of the stator A+ 115 and the stator B+ 117 are representatively shown. The stator B+ 117 is located at a position separated from the stator A+ 115 by a physical angle of 18 degrees in the direction of reverse rotation. In angular terms, the layout is such that the ch0-PI 103 is at a position corresponding to the stator B+ 117, and the ch1-PI 104 is at a position corresponding to the stator A+ 115.

Figure 7A:
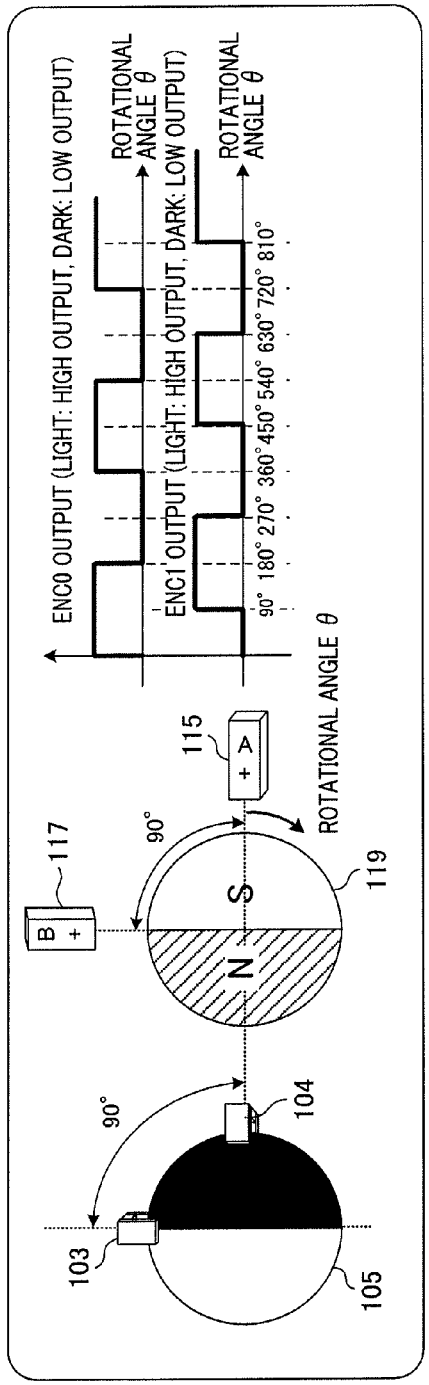
FIGS. 7A and 7B are diagrams illustrating the relationship between a rotor magnet and a slit rotating plate.
Figure 7B:
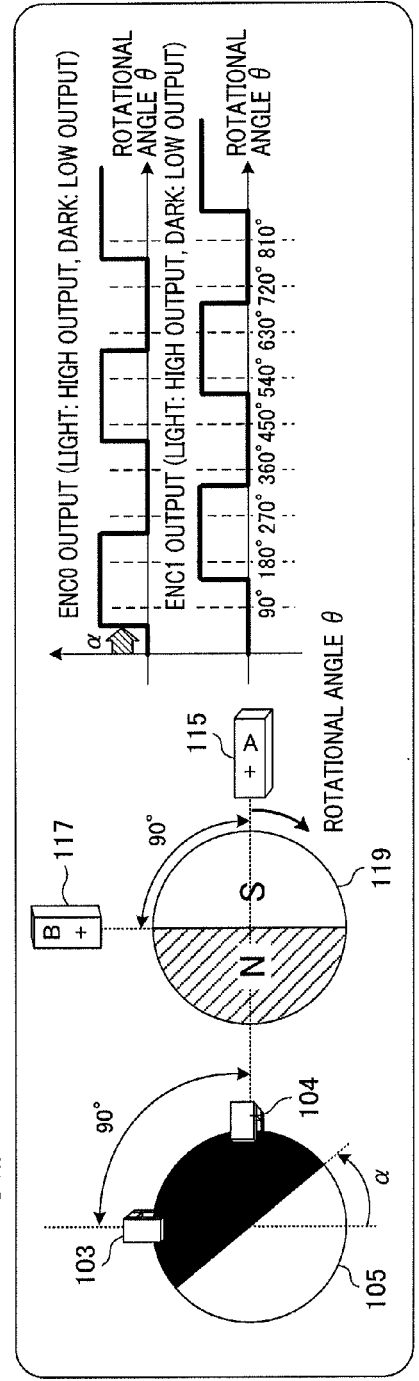

FIGS. 7A and 7B are diagrams a motor with a pole pair number of 5 is modeled in a configuration with a pole pair number of 1 so as to facilitate comprehension. Thus, since the electrical angle and the physical angle coincide, this model is used in the following description. FIG. 7A shows the case where the magnetization phase of the rotor magnet 119 and the light/dark phase of the slit rotating plate 105 are in the reference position relationship. The graph on the right side of FIG. 7A represents output changes in the ENC0 signal and the ENC1 signal when the rotational position is rotated degrees from the state of the diagram. Relative to FIG. 7A, FIG. 7B shows the case where the slit rotating plate 105 is attached at the position displaced in the direction of reverse rotation to the extent of an electrical angle of α degrees. Compared to the case of FIG. 7A, the respective outputs of the ENC1 signal and the ENC1 signal at this time exhibit a delaying output of the α degree electrical angle portion.

(Principles for Specification of an Attachment Displacement Amount α)

FIGS. 8A to 8F are diagrams illustrating circumstances where a drive waveform is applied to a motor to rotate a rotor in the direction of forward rotation. The upper part of FIG. 8 illustrates rotational states extending from 0° to 270° at increments of a 90° electrical angle.

FIGS. 8A and 8B illustrate excitation waveforms of the stator A+ 115 and the stator B+ 117, respectively. FIG. 8C illustrates table numbers of excitation signals (micro stop waveforms). In FIGS. 8A and 8B, the+ side is considered as the side where N pole excitation is imparted to the stator.

FIG. 8D illustrates a stoppage magnetization phase corresponding to when a drive waveform is fixed at a certain table phase with respect to the rotor magnet 119 directly underneath the stator B+ 117. FIG. 8E illustrates a magnetization phase corresponding to the case where the rotor magnet 119 directly underneath the stator B+ 117 is in a rotating state with application of a drive waveform. In the case of FIG. 8E, there is a rotor following delay 802 relative to FIG. 8D. FIG. 8F illustrates a light/dark phase of the slit rotating plate 105 corresponding to the same angular position as the stator B+ 117, and an ENC1 signal that is output and binarized by the ch0-PI 113 located at the corresponding position. The rising phase from the light region to the dark region of the slit rotating plate 105 is in a phase position which is delayed to the extent of an attachment position displacement amount 803 compared to the change phase of the rotor magnet from the N pole to the S pole. This attachment position displacement amount 803 is equivalent to the angle α shown in FIG. 7. Although extremely small, there is an electrical delay 804 between the phase of the slit rotating plate 105 and the ENC0 signal output shown in FIG. 8F.

Processing is performed in which interrupt processing is generated in the CPU 108 at the timing where an ENC0 signal falls, at which timing a table number for a micro-step waveform is acquired from the sinusoidal wave generator 109. At this time, when the sum of the following delay 802, attachment phase displacement amount 803, and electrical delay 804 is zero, the acquired value is 384 (see position 807 of FIG. 8C). In actuality, however, the sum of the three delay components is not zero, resulting in obtainment of the value of 59 as shown by position 808 in FIG. 8C. If the attachment phase displacement amount 803 is the only delay component, the phase displacement amount could be calculated from the differential between the table number of position 807 and the table number of position 808, but in actuality the following delay 802 and the electrical delay 804 are included. A description is given below of the means for solving this situation with reference to FIG. 9.

Figure 8:
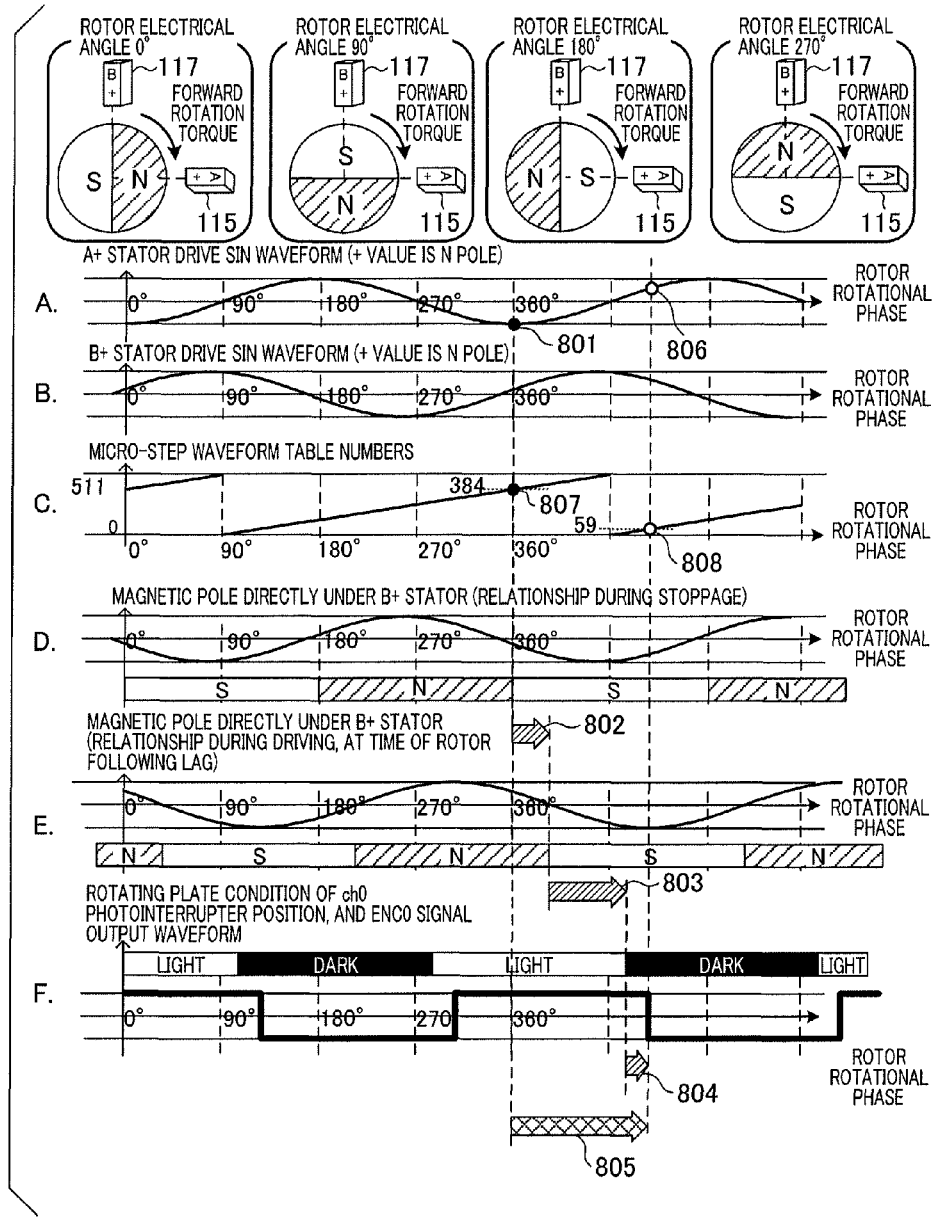
FIG. 8A to 8F are diagrams illustrating the phase relationship of a drive waveform and a sensor output waveform.
Figure 9:
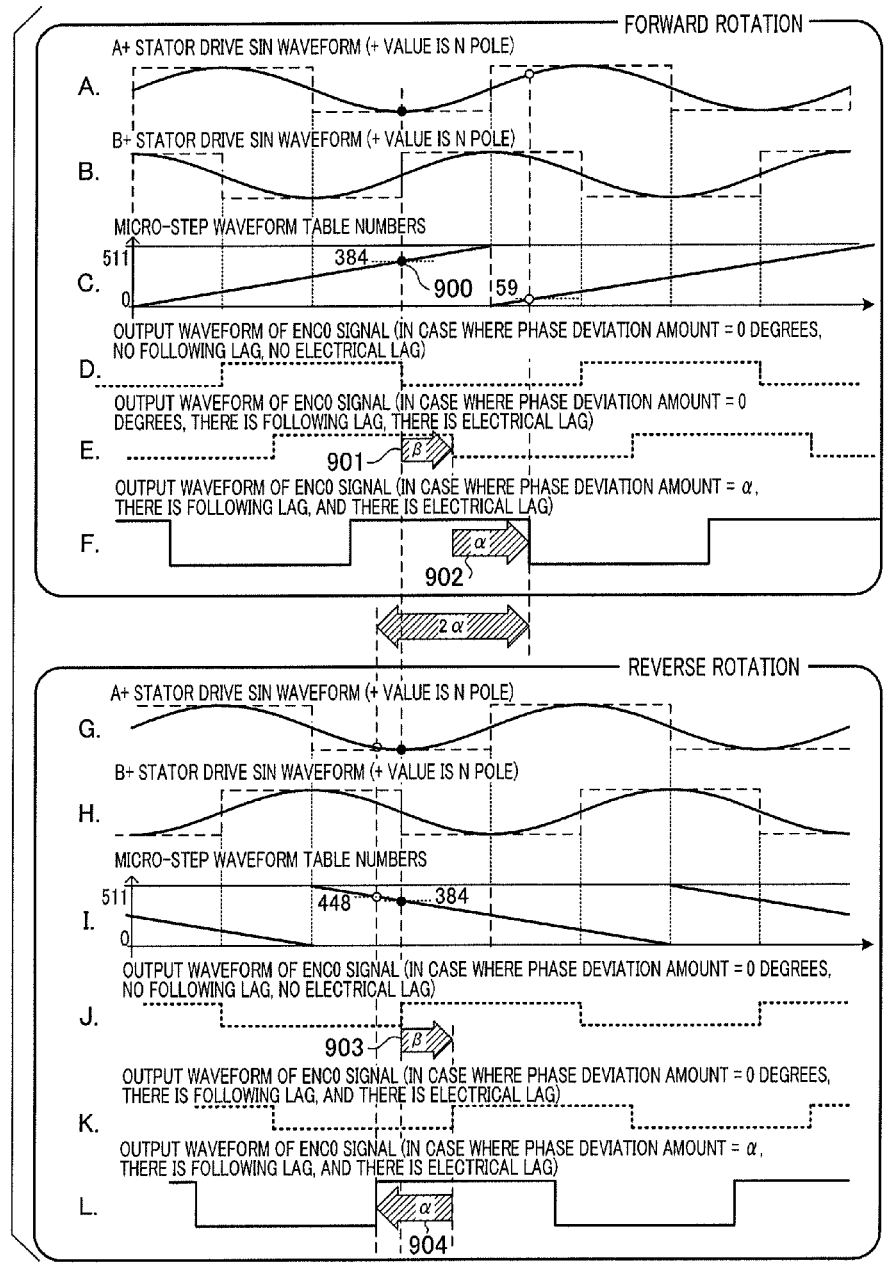
FIG. 9A to 9L are diagrams illustrating phase differences between a drive waveform and a sensor output waveform.

FIGS. 9A to 9F show waveform examples during motor driving in the direction of forward rotation. FIGS. 9A to 9C correspond to FIGS. 8A to 8C, and FIGS. 9D to 9F show output waveforms of the ENC0 signal (corresponding to a first detection signal). The following delay 802 and the electrical delay 804 of FIG. 8 are collectively shown as a delay component β 901 and the attachment phase displacement amount 803 is treated as α 902. FIGS. 9G to 9L show waveform examples during motor driving in the direction of reverse rotation. FIGS. 9G to 9I correspond to FIGS. 8A to 8C, and FIGS. 9J to 9L show output waveforms of the ENC0 signal (corresponding to a second detection signal). With respect to the rotational frequency of FIG. 9, a state is assumed where the motor is rotated at the same rotational frequency during forward rotation and reverse rotation, at a stable rotational frequency where the stepping motor is not subject to rotational irregularities or resonant operation. During motor driving in the direction of forward rotation, as shown in FIG. 9C, the table number of the micro-step waveform obtained at the timing where the ENC0 signal falls is 384 if there is no delaying or position displacement (see point 900). In actuality, however, a delay and a displacement amount exist, resulting in obtainment of, for example, table number 59. When a differential is calculated from these two values, one obtains (512−384)+59=187. This value corresponds to a first phase differential (α+β) obtained by adding together the displacement amount α 902 and the delay component β 901.

On the other hand, during motor driving in the direction of reverse rotation, the timing at which the slit rotating plate 105 changes from the light region to the dark region during forward rotation corresponds to the timing at which there is a change from the dark region to the light region during reverse rotation. Consequently, the table number of the micro-step waveform is acquired at the time where there is a change from the dark region to the light region in FIG. 9L. When there is neither a delay nor a position displacement at this time, a table number of 384 identical to that obtained during forward rotation ought to be acquired. In actuality, however, the phase displacement amount α 904 and the delaying component β 903 exist, resulting in obtainment of, for example, the value of 448 shown at FIG. 9I. In this case, when the differential of the table numbers is calculated, 448−384=64 is obtained. This value corresponds to a second phase differential (α−β) obtained by subtracting the delay component β 903 from the phase displacement amount α 904.

As is clear from the above, addition of the differential of the table numbers during forward rotation and the differential of the table numbers during reverse rotation results in 187+64=251. This value corresponds to (α+β)+(α−β)=2α, and α (i.e., the attachment phase displacement amount) is obtained from a value resulting from division of 251 by 2. Consequently, in a state where the motor is rotated at equal speed under open control during forward rotation and during reverse rotation, the attachment phase displacement amount can be specified if micro-step waveform table numbers are respectively acquired at the timing of the ENC0 signal change, and if the sum of the two is calculated, and divided by two. In open control, motor drive control is not performed based on a positional detection signal, in contrast to feedback control in a closed loop. The foregoing constitutes the principles of the method for specifying the attachment phase displacement amount corresponding to displacement between the magnetization phase of the rotor magnet 119 and the light/dark phase of the slit rotating plate 105.

(Control at 1/4 Cycle)

Figure 10:
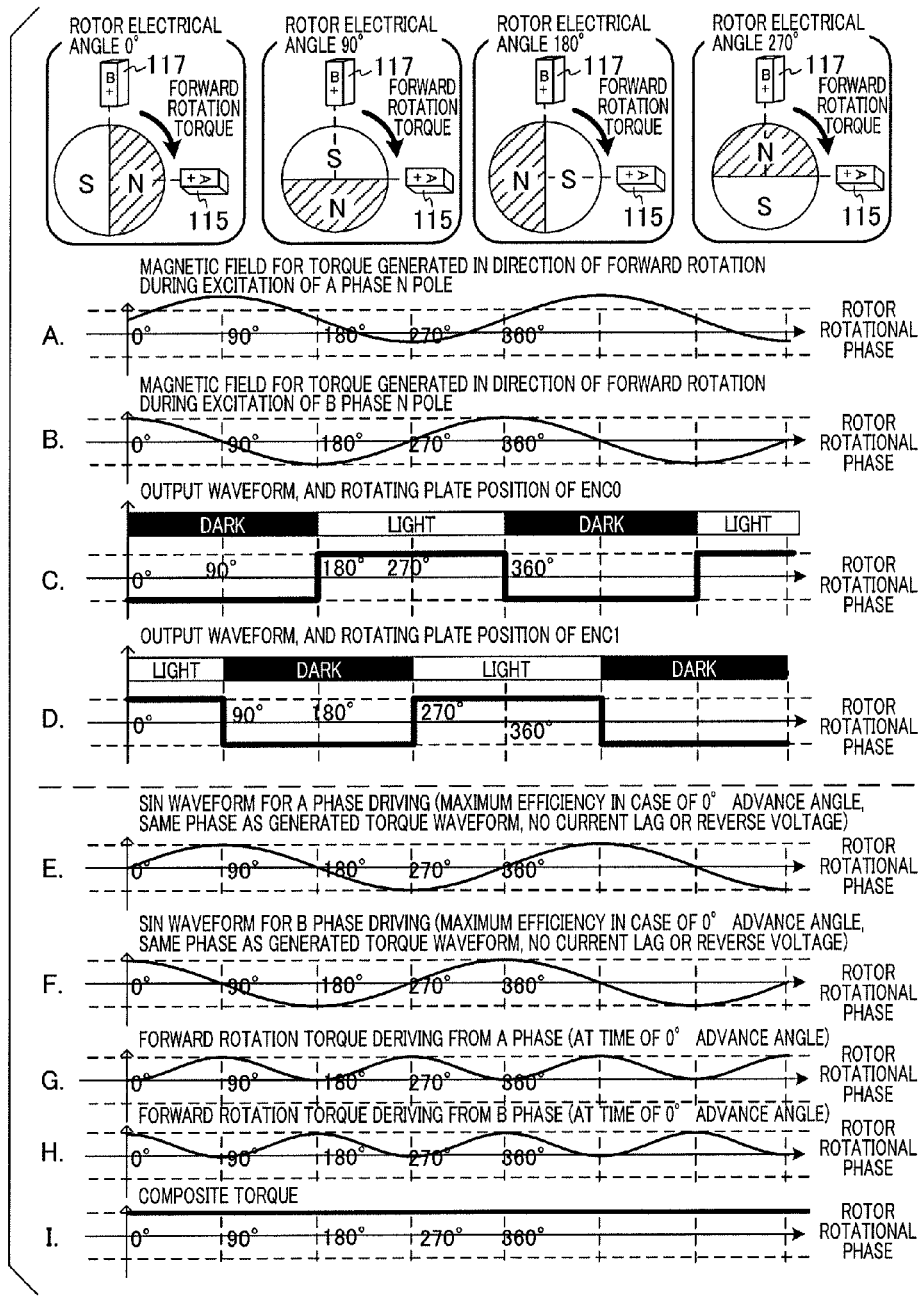
FIG. 10A to 10I are diagrams illustrating a state where an advance angle is 0°, for purposes of describing the correction processing of the present invention at 1/4 cycle in conjunction with FIGS. 11 to 23.
Figure 11:
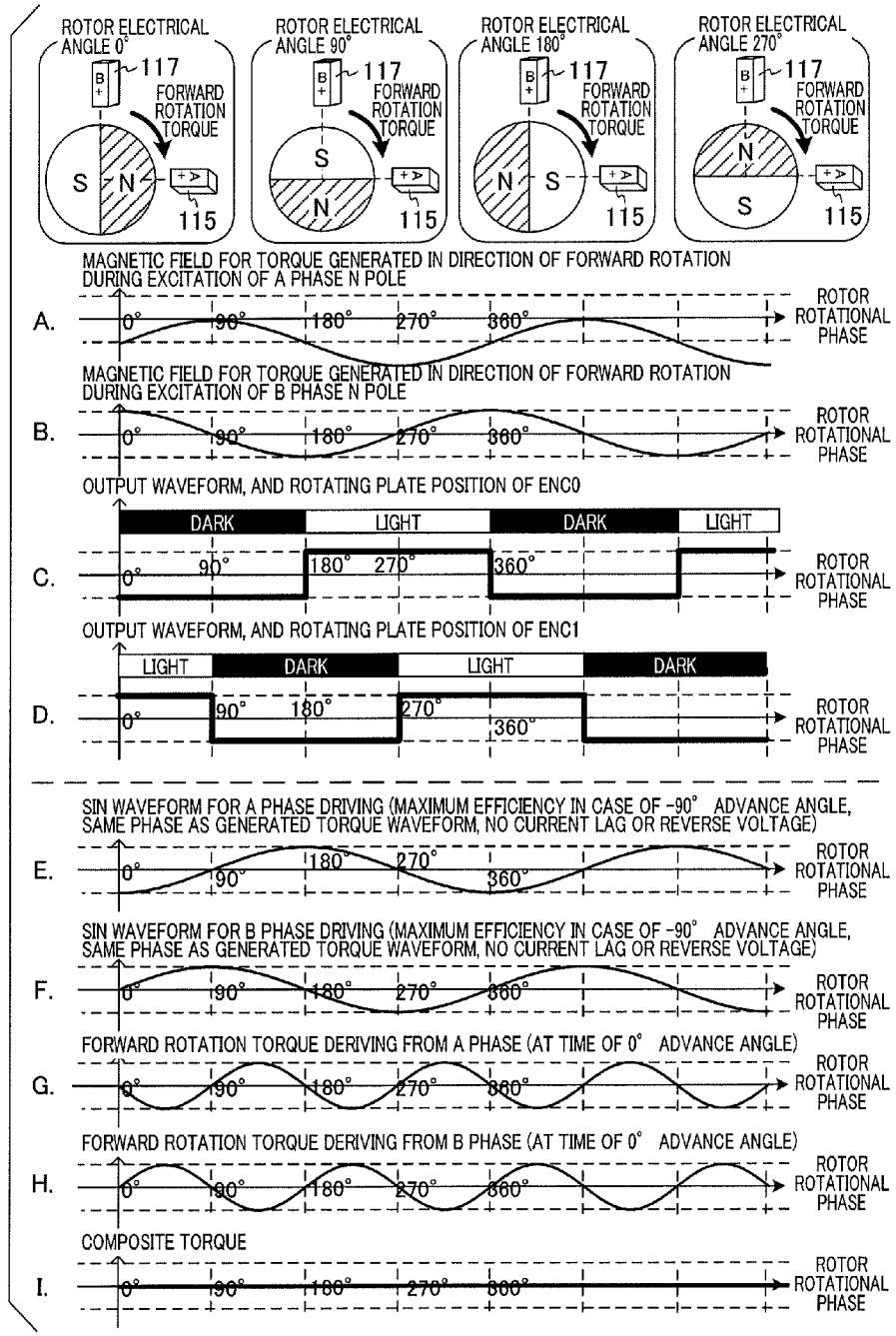
FIGS. 11A to 11I are diagrams illustrating a state where an advance angle is "−90°".

FIGS. 10 and 11 are diagrams for purposes of describing whether efficient rotary driving can be performed if a certain phase of a sinusoidal drive waveform is input to the A phase coil 113 and the B phase coil 114 when the rotor magnet 119 is at a certain rotational position. The upper portions of both FIGS. 10 and 11 schematize the stator A+ 115, the stator B+ 117, and the rotor magnet 119. The clockwise direction is defined as the direction of forward rotation, and the position of the rotor magnet 119 at the top left of the diagram is adopted as reference. That is, the state where the magnetic pole position directly underneath the stator B+ 117 is located at the boundary of change from the N pole to the S pole is treated as 0 degrees, and four conditions are depicted in which the rotor magnet is successively rotated by 90° from this state. For purposes of convenience, these conditions are respectively treated as electrical angles of 0°, 90°, 180°, and 270°.

FIGS. 10A and 11A show rotor magnet field intensity at the position of the stator A+ 115 when the stator A+ 115 is excited at the N pole, treating the value that imparts torque to the rotor magnet 119 in the direction of forward rotation as a positive value. As shown in the diagrams, when the rotor electrical angle is 0°, rotational torque is not generated for the rotor magnet 119, no matter how excitation of the stator A+ 115 is attempted. This is clear from the fact that the torque value is 0 at a position of a rotor electrical angle of 0° in FIGS. 10A and 11A. In the case of a rotor electrical angle of 90°, repulsive force is generated with respect to the N pole of the rotor magnet 119 and attractive force is generated with respect to the S pole of the rotor magnet 119 when the stator A+ 115 is excited at the N pole to thereby generate a maximal value of torque in the direction of forward rotation. In short, the torque value at the position of a rotor electrical angle of 90° in FIGS. 10A and 11A is a maximal value. FIGS. 10B and 11B represent rotor magnet field intensity at the position of the stator B+ 117, which is identical to that of FIGS. 10A and 11A except for the difference in phases, and detailed description thereof is consequently omitted.

FIGS. 10C and 11C represent the ENC0 signal and the light/dark state of the slit rotating plate 105 at the position of the ch0-PI 103. The ENC0 signal is a binarized signal of the ch0-PI 103 signal. Strictly speaking, the ENC0 signal is switched after a slight electrical delay from the switching point of the light/dark state of the slit rotating plate 105, but this is ignored in the present processing. The ENC0 signal is at High level during the light state and at Low level during the dark state. With respect to the outputs of FIGS. 10C and 11C, the slit rotating plate 105, the ch0-PI 103, and the ch1-PI 104 are arranged in the state shown in FIG. 7A. FIGS. 10D and 11D are diagrams relating to the ch1-PI 104 and the ENC1 signal, and as they are identical to FIGS. 10C and 11C, detailed description thereof is omitted.

With reference to FIGS. 10A to 10I, a description is given below of the manner of application of a drive waveform that efficiently generates rotational torque with respect to the rotor magnet 119. Torque is the application of the currents (coil currents) that respectively flow in the A phase coil 113 and the B phase coil 114 to the magnetic field curve illustrated in FIGS. 10A and 10B. As the waveforms shown in FIGS. 10A and 10B are each sinusoidal, torque is maximal when the current phases that flow in the A phase coil 113 and the B phase coil 114 respectively match the phases of the magnetic field curve of FIGS. 10A and 10B. With respect to coil current waveform, a delay is generated from the coil voltage waveform, but this delay is changed by the coil properties and the reverse voltage produced in the coil. Consequently, FIGS. 10E and 10F show the sinusoidal voltage waveforms of maximum efficiency when the A phase coil 113 and the B phase coil 114 are energized, taking the case where the voltage and current phases coincide as reference. It is clear that FIGS. 10A and 10E are in the same phase relationship, and that FIGS. 10B and 10F are in the same phase relationship. The driving state in which a voltage waveform is applied with the phase relationship shown in FIGS. 10E and 10F to the rotational position of the rotor magnet 119 is defined as a state where the advance angle is "0°". FIGS. 10G and 10H respectively show a torque curve derived from the A phase coil 113, and a torque curve deriving from the B phase coil 114. FIG. 10G is a curve which shows the result obtained by combined application of the waveform of FIG. 10A and the waveform of FIG. 10E, and FIG. 10H is a curve which shows the result obtained by combined application of the waveform of FIG. 10B and the waveform of FIG. 10F. A curve which adds together these two torque curves is the torque curve generated by the entire motor, and this is shown in FIG. 10I. In FIG. 10I, generation of a constant torque that always causes rotation can be observed.

FIGS. 11A to 11I show the rotational positions of the drive waveform phase and the rotor magnet 119 when the drive waveform is fixed at an optional phase. For example, at the rotor electrical angle of 0° in FIG. 11E, the voltage waveform applied to the A phase coil 113 is a maximum value that is negative, i.e., a maximum S pole field is generated in the stator A+. The voltage value of the B phase coil 114 shown in FIG. 11F is 0, that is, the stator B+ is in an unexcited state. At this time, the rotor magnet 119 is fixed at a position represented in the diagram of the 0° rotor electrical angle, and no rotational torque whatsoever is generated. When drive voltage is applied to the motor in the phase relationship shown in FIGS. 11E and 11F in this manner, torque is not generated in the direction of forward rotation. When the motor undergoes open driving at very low speed, the magnetization phase of the rotor magnet 119 and the phase of the drive waveform rotate in a phase relationship that is very close to that of FIG. 11. FIG. 11G shows a torque curve derived from the A phase coil 113, and FIG. 11H shows a torque curve derived from the B phase coil 114. These torque curves are mutually reverse phases, and have torque integral values of identical areas with different reference numbers. The sum of the two is shown in the curve of FIG. 11I. The torque of the entire motor is always 0. At this time, the phase of the drive waveform is in a 90° delaying relationship compared to the case of FIG. 10. Consequently, the phase relationship of the rotor magnet 119 and the drive waveform shown in FIG. 11 is defined as an advance angle of "−90°". The purpose of the present processing is always to perform the rotational driving of the motor in the phase relationship of the "0°" advance angle shown in FIG. 10. With reference to FIGS. 12 to 15, a sequential description is given below of how the state of an advance angle of 0° is obtained if a certain phase value of a drive waveform is acquired at the respective timings of rise and fall of the ENC0 signal, and rise and fall of the ENC1 signal during motor driving.

Figure 12:
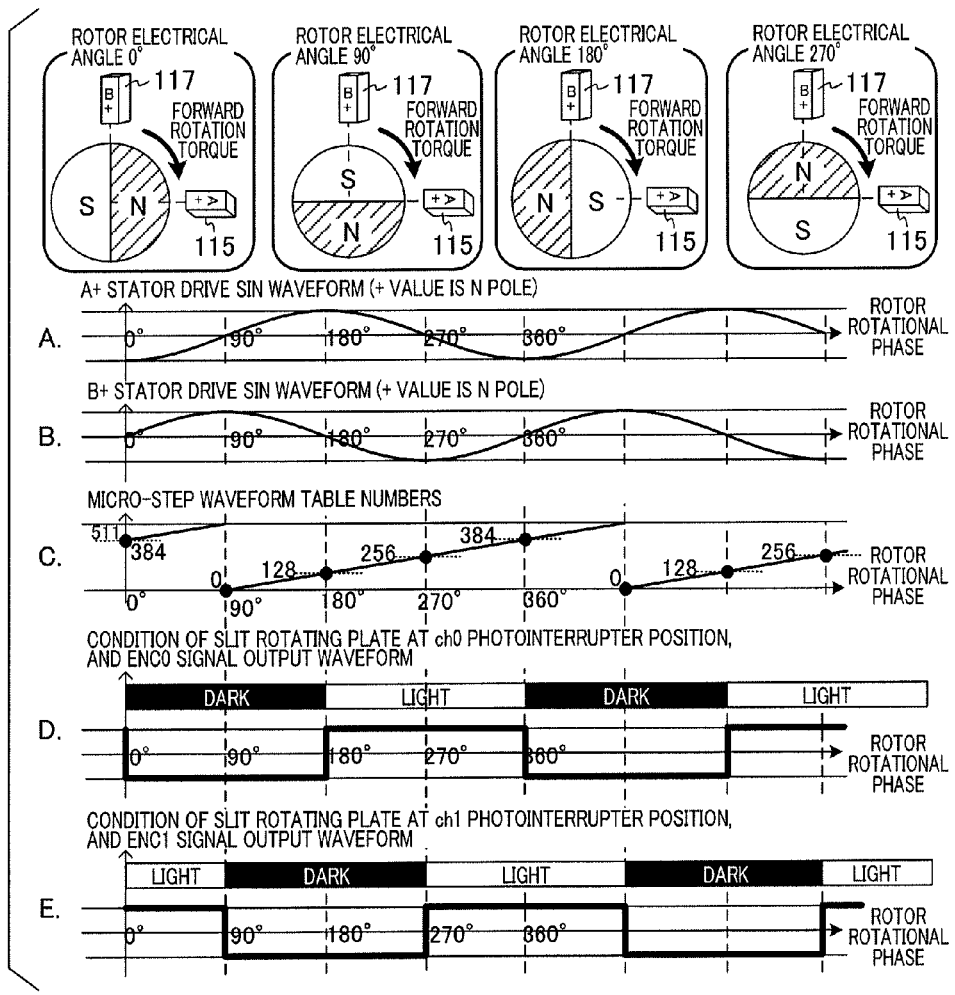
FIGS. 12A to 12E are diagrams illustrating a state where an advance angle is 0° during forward rotation.

FIG. 12 shows the relationship between the drive waveform and the ENC0 signal and the ENC1 signal when the advance angle is "−90°". FIGS. 12A and 12B respectively show voltage waveform application to the A phase coil 113 and the B phase coil 114. In FIG. 12C, table number values corresponding to the respective waveforms of FIGS. 12A and 12B are visualized and shown in a linear graph. FIGS. 12D and 12E respectively show states of the ENC0 signal and the ENC1 signal. As is clear from FIG. 12, when it is desired to maintain the state of a "−90°" advance angle during motor driving, it is sufficient if drive waveform table number 128 is acquired at the point of rise of the ENC0 signal. It is also sufficient if table number 384 is acquired at the point of fall of the ENC0 signal. Moreover, it is sufficient if table number 256 is acquired at the point when the ENC1 signal rises, and if table number 0 is acquired at the point when the ENC1 signal falls.

Figure 13:
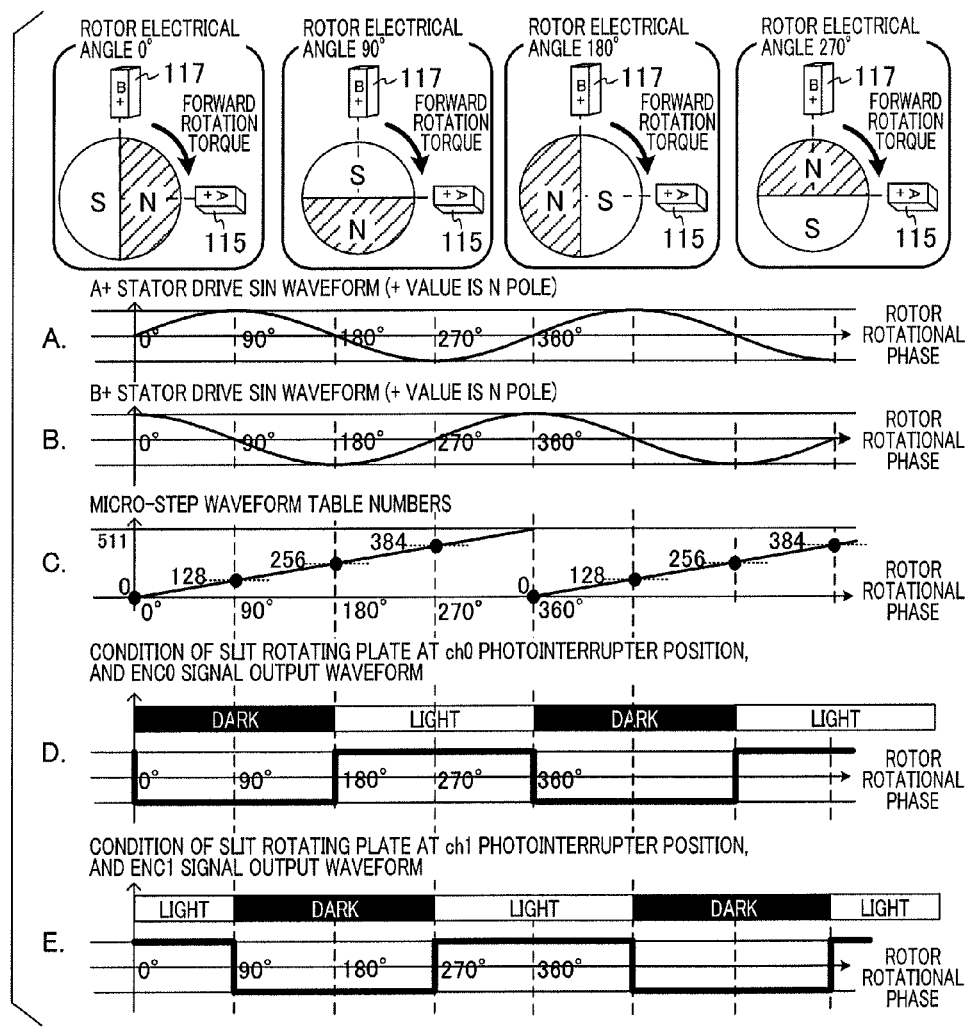
FIGS. 13A to 13E are diagrams illustrating another example of a state where an advance angle is 0° during forward rotation.

FIG. 13 is a diagram which shows a state of a 0° advance angle. It can be seen that the drive waveform is advanced by 90° more than in the case of FIG. 12. To preserve a driving state of 0° advance angle, it is sufficient to acquire the respective table numbers of 256 at the point when the ENC0 signal rises, and 0 at the point when the ENC0 signal falls. It is further sufficient to acquire the respective table numbers of 384 at the point when the ENC1 signal rises, and 128 at the point when the ENC1 signal falls.

Figure 14:
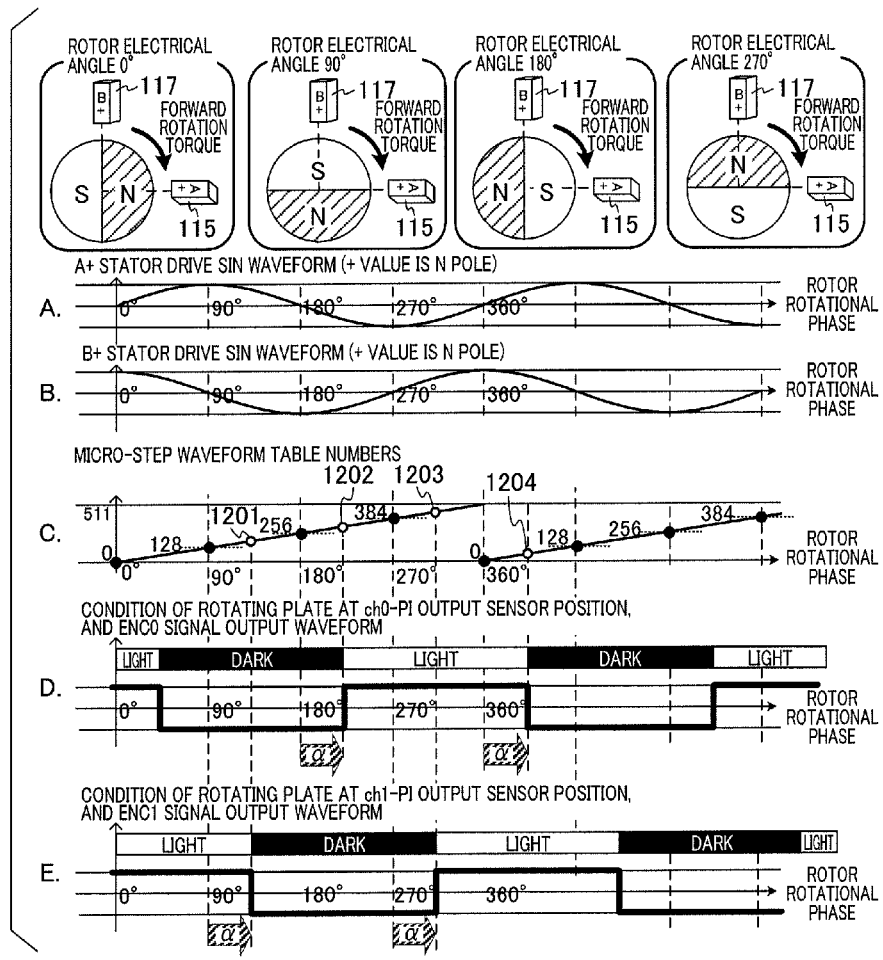
FIGS. 14A to 14E are diagrams illustrating phase deviation in a state where an advance angle is 0° during forward rotation.

The foregoing has been a description of the phase relationship of a drive waveform to ENC0 and ENC1 when a specific advance angle state is maintained. In the description to this point, the condition of FIG. 7A has been assumed, i.e., the condition where there is an exact overlap of the N pole phase of the rotor magnet 119 and the phase of the slit rotating plate 105 in a light state. FIG. 14 shows a positional relationship for the general case where attachment is performed at a position where the phase of the slit rotating plate 105 shown in FIG. 7B is displaced to the extent of α from the reference positional relationship of FIG. 7A.

As shown in FIG. 14, when the slit rotating plate 105 has an attachment position displacement amount α, the ENC0 signal and the ENC1 signal generate a phase delay of α as in the case of FIG. 7B with respect to rotation of the rotor magnet 119. At this time, in order to maintain the state of a 0° advance angle during motor driving, a relationship must exist in which table number 256+α (see 1202 of FIG. 14C) can be acquired at the point when the ENC0 signal rises. The relationship must further exist in which 0+α can be acquired at the point when the ENC0 signal falls, 384+α at the point when the ENC1 signal rises, and 128+α at the point when the ENC1 signal falls. These respectively correspond to the positions of the white points 1201, 1202, and 1204 shown in FIG. 14C.

Figure 15:
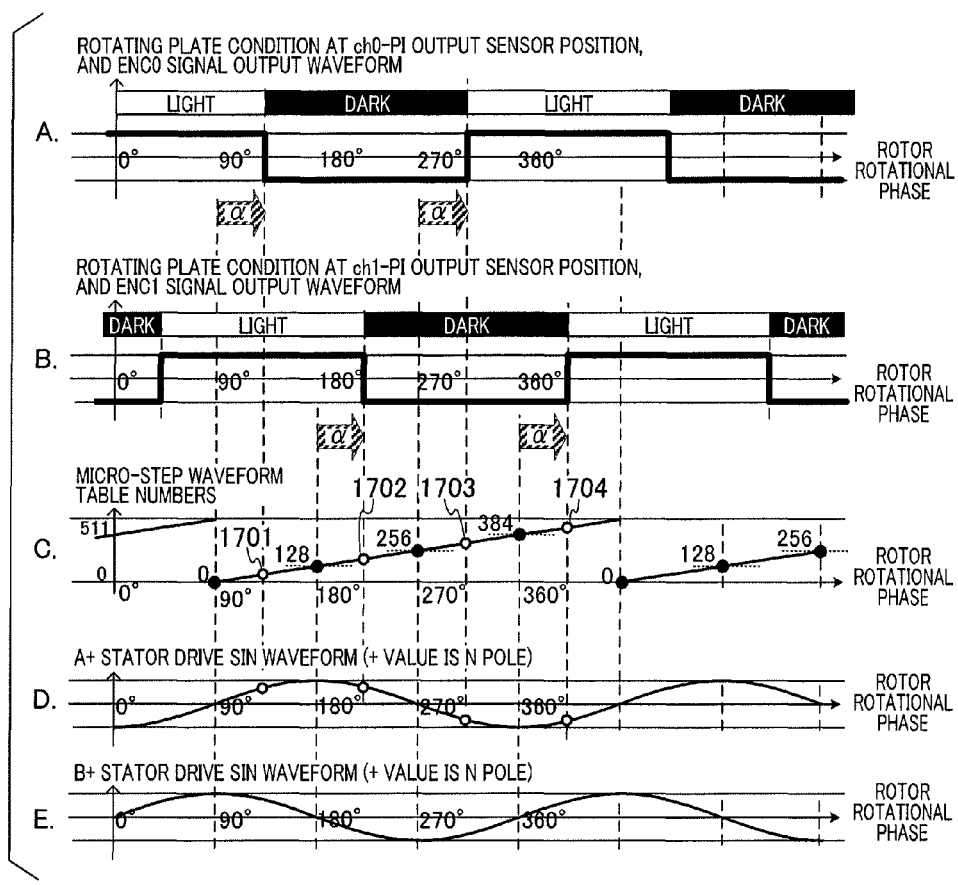
FIGS. 15A to 15E are diagrams in which the arrangements of FIGS. 14A to 14E are changed.

FIGS. 15A to 15E are diagrams in which the ENC0 signal and the ENC1 signal shown in FIG. 14 are transposed to the upper part, and rewrote. In the control which maintains a constant advance angle described below, since an operation involving a sensor signal is added to the drive waveform in a primary manner, FIG. 15 is used for ease of comprehension. FIGS. 15A and 15B respectively show an ENC0 signal and an ENC1 signal. FIG. 15C shows table numbers of a drive waveform, FIG. 15D shows a drive voltage waveform of an A phase coil 113, and FIG. 15 E shows a drive voltage waveform of a B phase coil 114.

Figure 16:
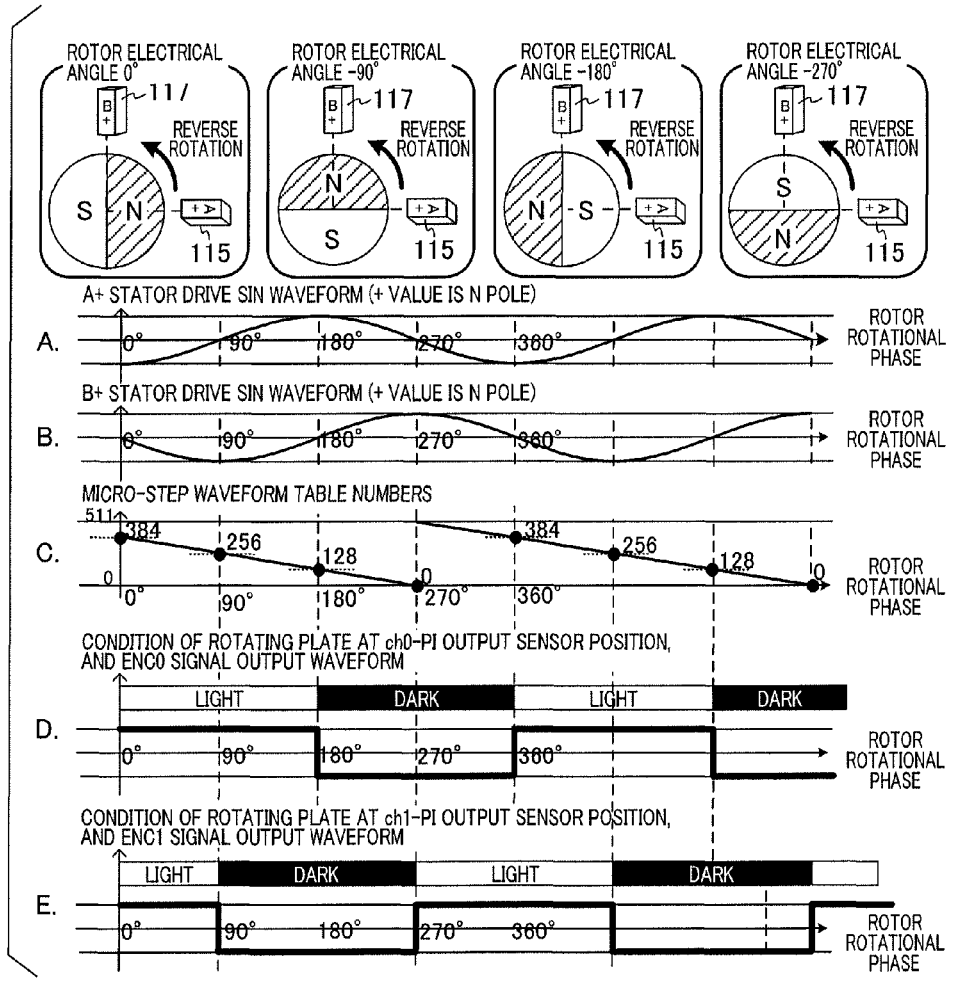
FIGS. 16A to 16E are diagrams illustrating a state where an advance angle is 0° during reverse rotation.
Figure 17:
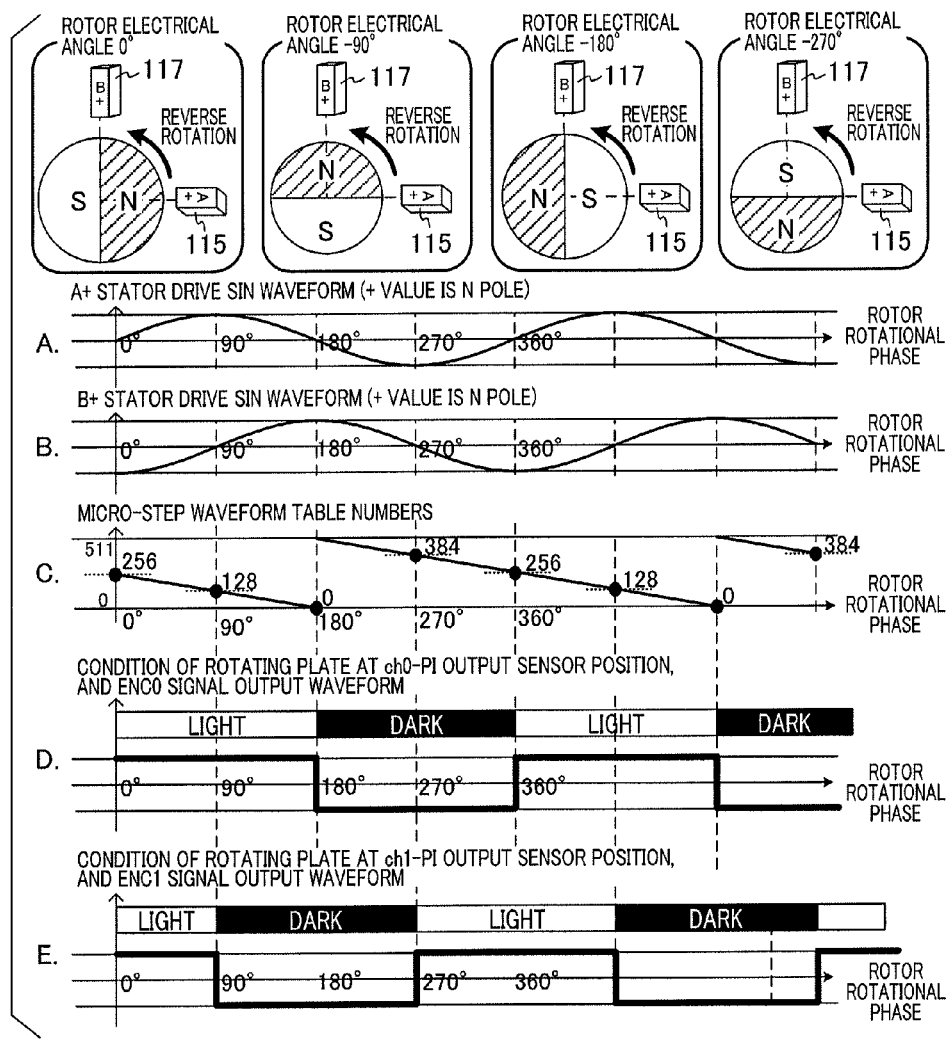
FIGS. 17A to 17E are diagrams illustrating another example of a state where an advance angle is 0° during reverse rotation.
Figure 18:
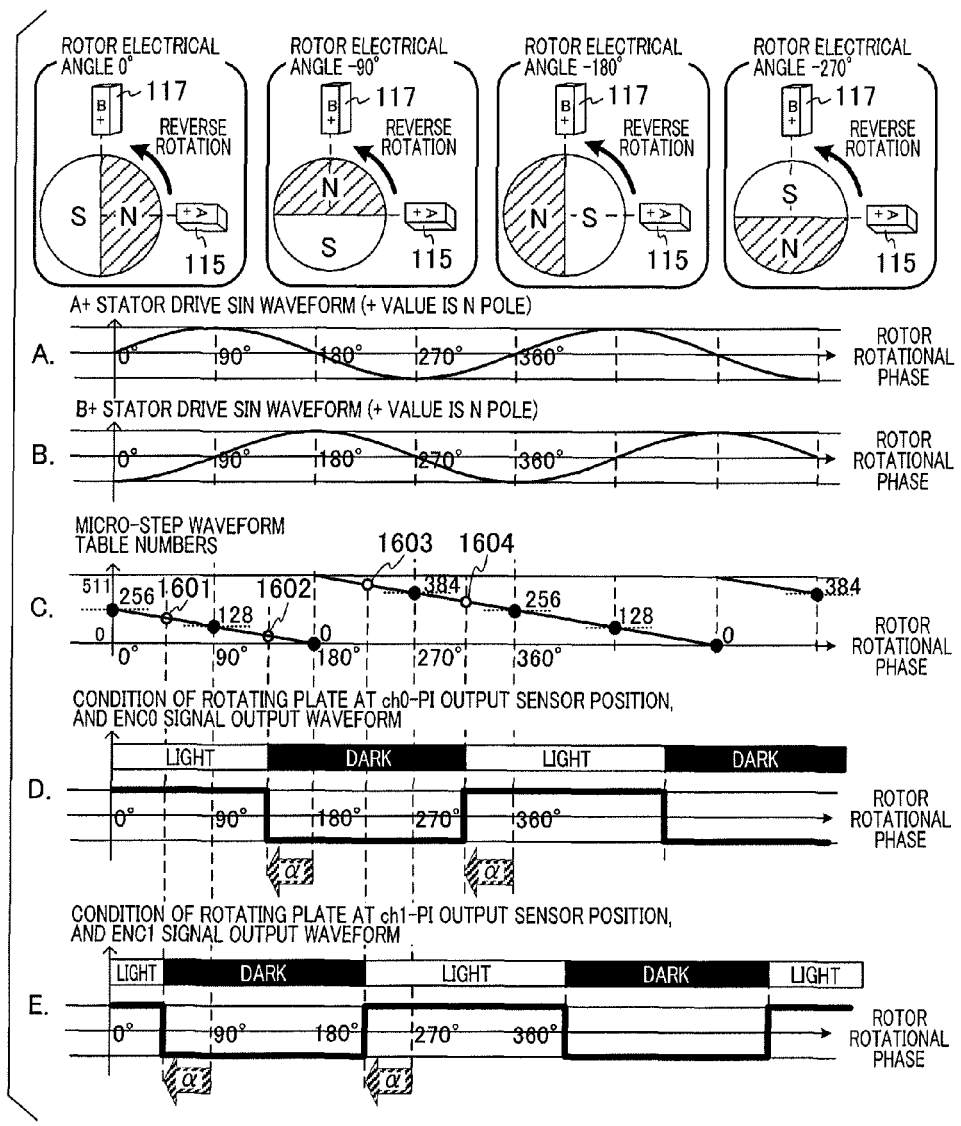
FIGS. 18A to 18E are diagrams illustrating phase deviation in a state where an advance angle is 0° during reverse rotation.
Figure 19:
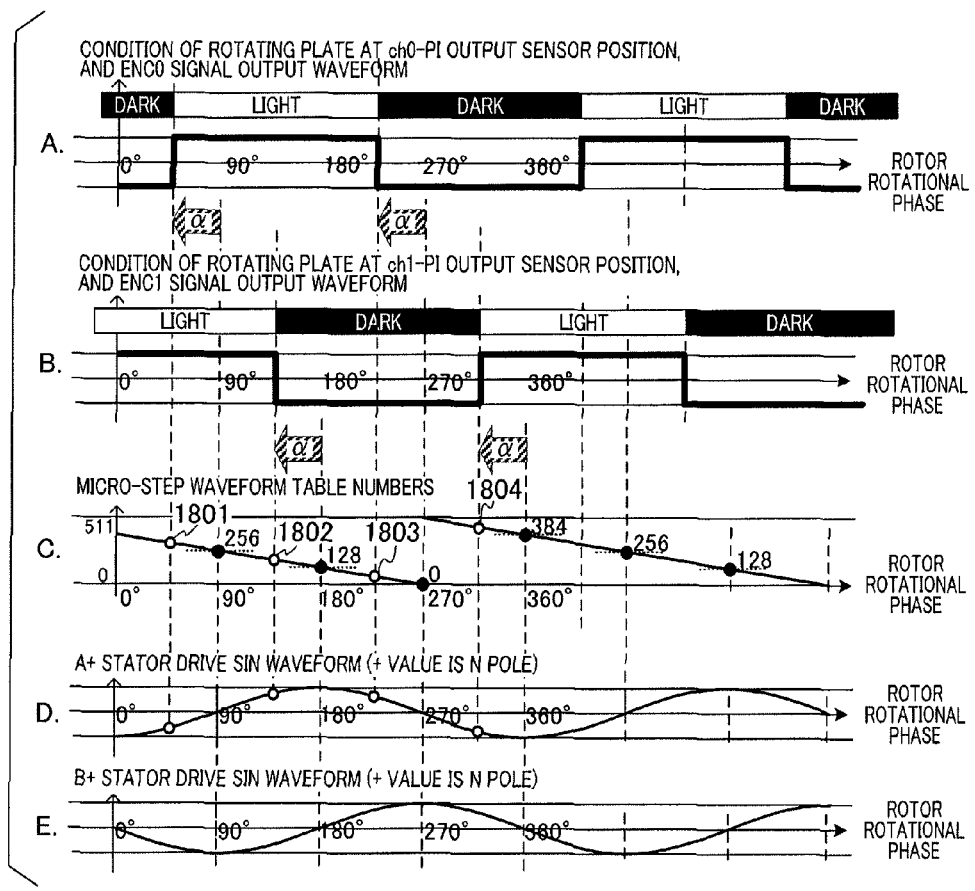
FIGS. 19A to 19E are diagrams in which the arrangements of FIGS. 18A to 18E are changed.

The foregoing has been a description of the case where motor rotation is performed in the direction of forward rotation. FIGS. 16 to 19 are diagrams for the case of reverse rotation which respectively correspond to FIGS. 12 to 15. FIGS. 16, 17, and 18 show the state of a 0° advance angle when the attachment position displacement amount of the slit rotating plate 105 from the reference positional relationship is a during reverse rotation. Detailed description is omitted with respect to portions that are redundant with the description given for FIGS. 12 to 15. As shown in FIGS. 18 and 19, the main point of difference is the feature that, in the case of reverse rotation, the phase of the ENC0 signal and the ENC1 signal is an advance by the α portion (in contrast, the α portion phase delays during forward rotation).

Figure 20:
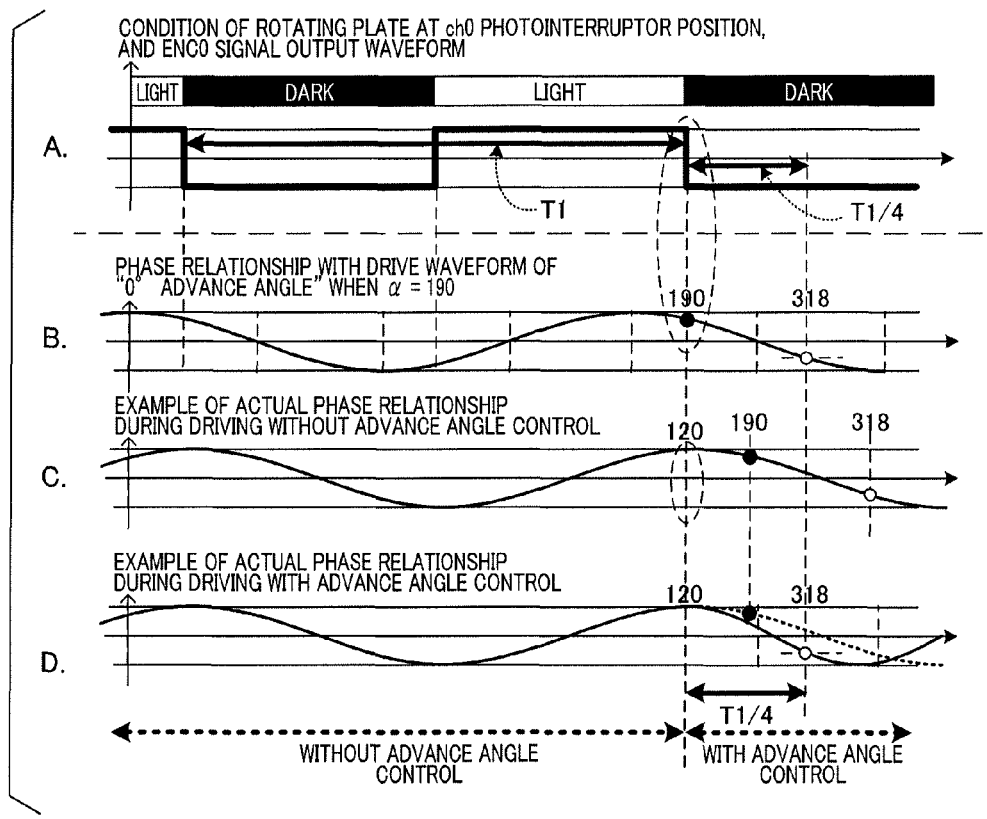
FIGS. 20A to 20D are schematic diagrams illustrating advance angle control.

Next, with reference to FIGS. 20A to 20D, a summary description is given concerning how to perform control that maintains a desired advance angle state during motor driving. The detailed processing is described below using FIG. 21. FIG. 20 shows an example of an energization waveform of the ENC0 signal and the A phase coil 113, when the phase displacement amount α of the slit rotating plate 105 is 190 (when one cycle of the sinusoidal wave is divided by 512). The upper portion shows the light/dark state of the slit rotating plate 105, and FIG. 20A shows the ENC0 signal. FIG. 20B shows an example of a energization waveform of the A phase coil 113 with respect to the ENC0 signal phase, in the case of a 0° advance angle when α=190. In FIG. 15, the drive waveform table number is 0+α in a state of a 0° advance angle obtained at the point when the ENC0 signal falls. In FIG. 20B, it is 0+190=190, which is the table number of the drive waveform that should be obtained at the point when the ENC0 signal falls. Actually, however, a state like that shown in, for example, FIG. 20C occurs. FIG. 20C illustrates a phase relationship when rotation is performed with application of a drive waveform of specific frequency to the coil, and a table number of 120 is used at the point when the ENC0 signal falls. At this time, in a state of a 0° advance angle, a drive waveform of the table numbers of 190−120=70 delays with respect to the rotor. When converted to an advance angle value, this is a delay of 70×360/512=49.2°, and the motor rotates in a state where the advance angle is "−49.2°". The advance angle condition is determined by the two factors of motor load and rotational frequency. In the present processing, an optimal rotational frequency is calculated to obtain a target advance angle condition under a specific load on the motor, and control is performed that sets a drive frequency according to the existing rotational frequency whenever a level change of an encoder signal is detected. Control which maintains a fixed state that commands an advance angle condition is referred to as "advance angle control".

In the example shown in FIG. 20C, the positional relationship is such that the table number 190 would normally be obtained at the point when the ENC0 signal falls, but actually 120 is obtained. Here, when the table number is abruptly changed from 120 to 190 in the sinusoidal wave generator 109, a harmonic is contained in the drive voltage waveform, and becomes a cause of noise and rotational irregularity. As the state of the advance angle is determined by the motor load and the rotational frequency, even if there is an abrupt change in which table numbers are skipped, the frequency itself of the drive voltage waveform does not change. Consequently, it is not possible to stably maintain the motor in a state of a 0° advance angle. In the present processing, the following processing is performed in order to achieve advance angle control while maintaining a smooth energization waveform.

Firstly, a time (cycle T1) from the point of the previous fall of the ENC0 signal to the present fall of the ENC0 signal is calculated. If there is a state of constant speed, the cycle T1 and the cycle of the energization waveform coincide. In the 0° advance angle state of FIG. 20B, the table number obtained at the point when a 1/4 cycle (T1/4) has elapsed from the point of the ENC0 signal fall is 190+128=318. At this point, a time of T1/4 has elapsed from the point when the ENC0 signal fell. In order to set a table number portion corresponding to 318−120=198 as the frequency at which advance occurs in a time of T1/4, processing is performed in which the cycle of the drive waveform is changed at the point of the ENC0 signal fall. By means of this change processing, the energization waveform shown in FIG. 20D is obtained. In FIG. 20D, the table number 120, which diverges from the value that ought to be obtained in a 0° advance angle state, is obtained at the point of the ENC0 signal fall. However, after elapse of T1/4, the rotational phase of the rotor magnet 119 and the table number representing the phase of the energization waveform coincide. In actual processing, a rise signal of the ENC1 signal is generated near the point when a time of T1/4 has elapsed from the point of the ENC0 signal fall, and the same advance angle control is performed. Thereafter, advance angle control is performed four times per one cycle of the energization waveform, and rotational driving is continued. The description has concerned the situation where the cycle of the energization waveform and the cycle T1 corresponding to an existing rotational frequency coincide, but this does not necessarily occur during acceleration or deceleration, or when there is rotational irregularity. However, even in such cases, by continuing with the advance angle control processing, stable convergence toward a state of 0° advance angle gradually occurs, and the state where the cycle T1 and the cycle of the energization waveform coincide is gradually approached.

Figure 21:
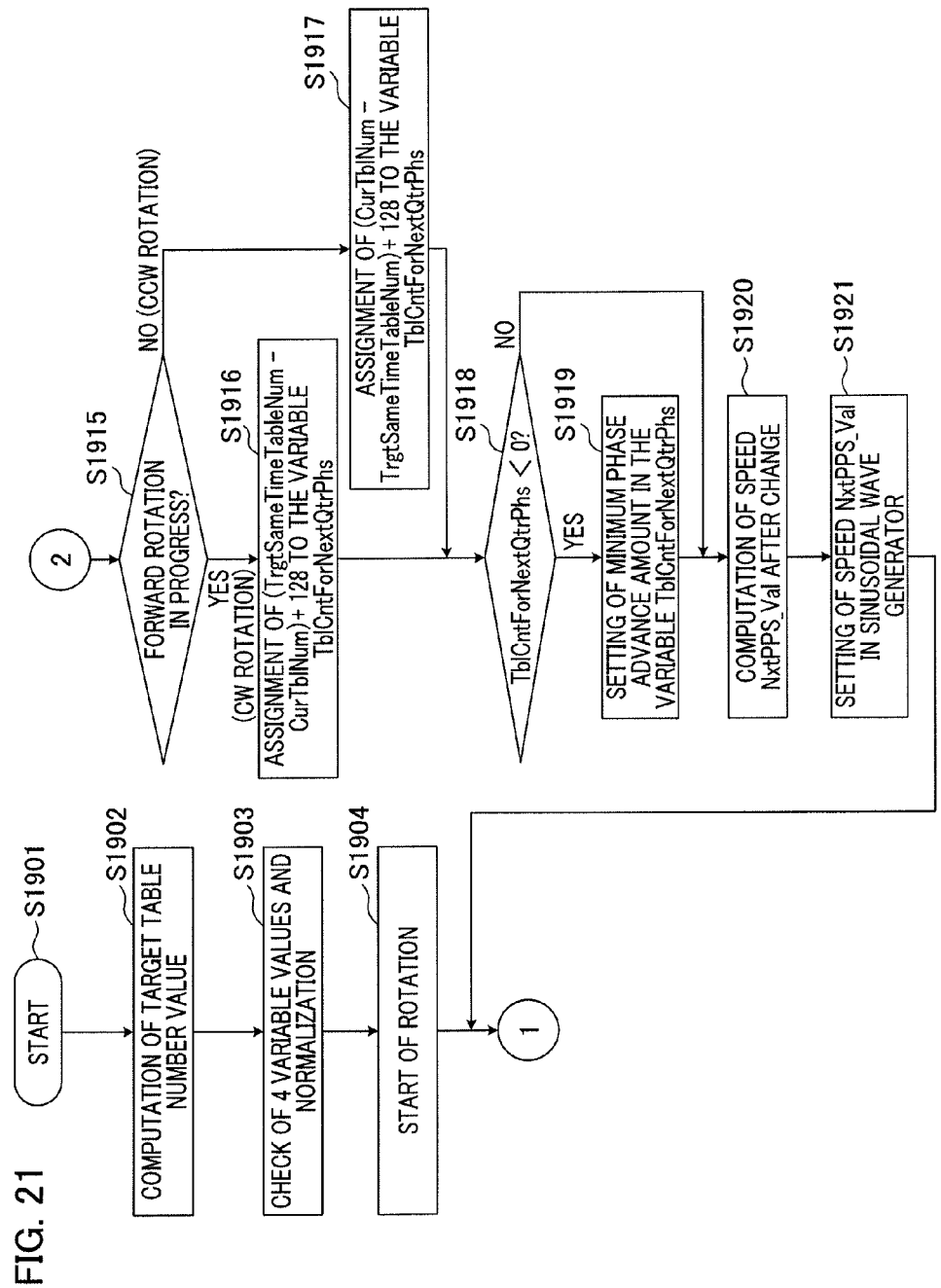
FIG. 21 is a flowchart illustrating a processing example in conjunction with FIG. 22.
Figure 22:
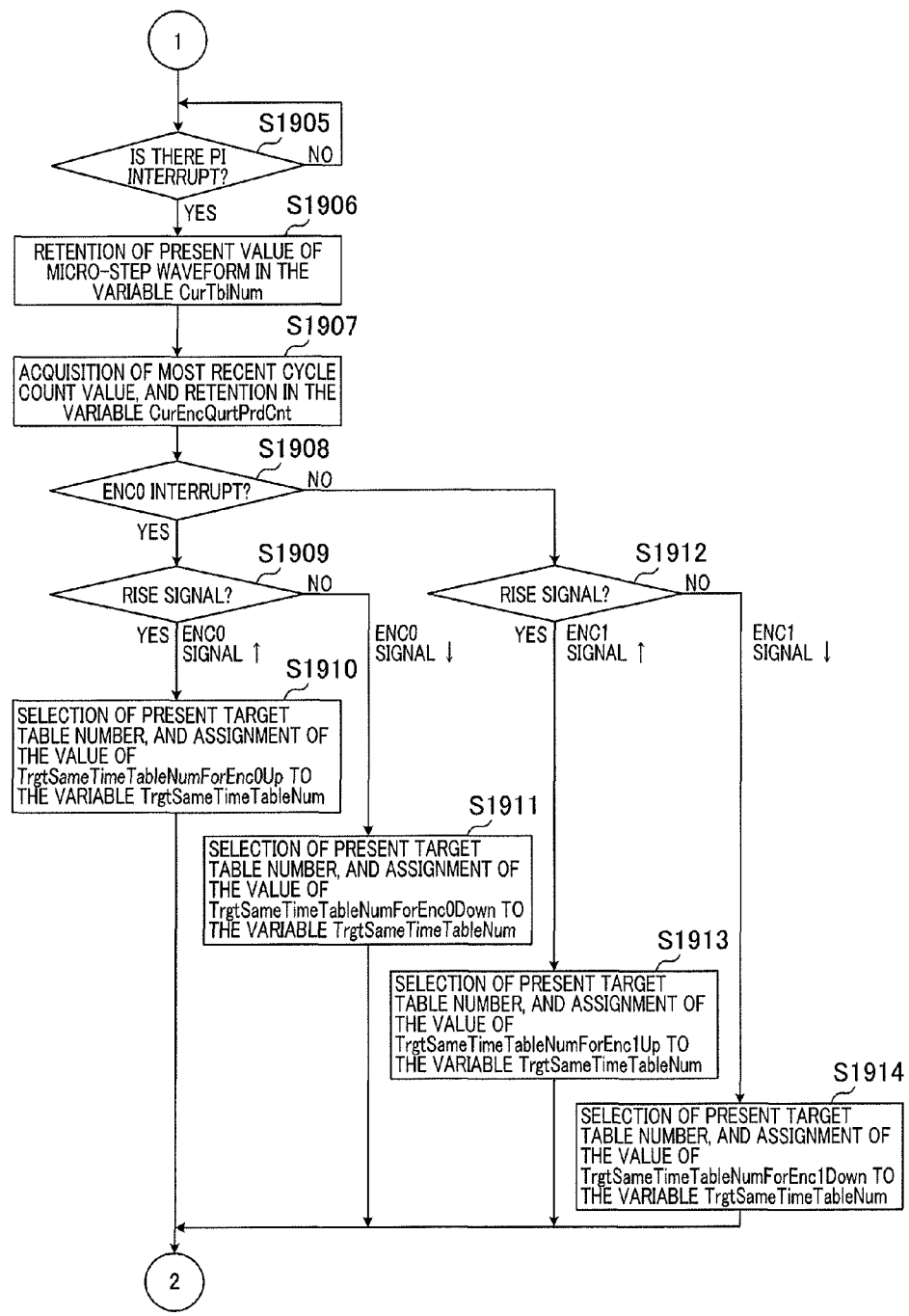
FIG. 22 is a flowchart illustrating the processing example that continues from FIG. 21.

By performing the above processing, rotational driving identical to that of a DC motor is achieved, because speed corresponding to motor load is optimized under the condition of the set advance angle, while applying the drive waveform signal of a sinusoidal waveform to the stepping motor. FIGS. 21 and 22 are flowcharts illustrating processing examples when the above-described processing is actually applied. The present processing is achieved by having the CPU 108 read and run a program from the memory.

Processing starts in S1901. In the subsequent S1902, a table number value equivalent to a target phase value is calculated at each triggering time of the ENC0 signal and the ENC0 signal based on a phase displacement amount $\alpha$ obtained in advance by an appropriate method. In this processing, as described with respect to FIGS. 15 and 19, a value that adds $\alpha$ to a default table value at each trigger of the ENC0 signal and the ENC1 signal in the case of $\alpha=0$ is respectively assigned to four variables. The respective variables are as follows.

A variable which stores the target table number value to be acquired at the time of ENC0 signal rise
TrgtSameTimeTableNumForEnc0Up=256+$\alpha$
A variable which stores the target table number value to be acquired at the time of ENC0 signal fall
TrgtSameTimeTableNumForEnc0Down=0+$\alpha$
A variable which stores the target table number value to be acquired at the time of ENC1 signal rise
TrgtSameTimeTableNumForEnc1Up=384+$\alpha$
A variable which stores the target table number value to be acquired at the time of ENC1 signal fall
TrgtSameTimeTableNumForEnc1Down=128+$\alpha$ In the subsequent S1903, the four variable values set in S1902 are checked to determine whether or not they fall within the range of 0 to 511. Processing is performed in which a value that exceeds 511 is reset by subtracting 512, and normalized to a value within 0 to 511. Driving of the sinusoidal wave generator 109 starts in S1904, and driving of the stepping motor 101 starts via the PWM generator 111 and the motor driver 112. Regardless of rotational direction, the frequency of the energization waveform is below the self-activation frequency. S1905 of FIG. 22 is processing which determines whether or not there is interrupt due to a PI signal. A PI signal is a general term for the four signals pertaining to a rise and fall of the ENC0 signal, and a rise and fall of the ENC1 signal. By means of these four signal variation triggers, the CPU 108 is subjected to interrupt via the encoder circuit 107. When PI interrupt does not occur, standby processing occurs until there is PI interrupt. When PI interrupt occurs, processing is performed in which transition to S1906 ensues, and a table number showing the present phase value of the drive waveform is acquired. The present table value (hereinafter "present value") is retained in the variable CurTblNum.

In S1907, a time from the generation time of a previous interrupt trigger that is identical to the present interrupt trigger, i.e., a latest cycle count value of the ENC0 signal and the ENC1 signal is acquired from the encoder circuit 107, and a value that is 1/4 thereof is calculated. This value is retained in the variable CurEncQurtPrdCnt. This processing corresponds to the measurement of T1 and the saving of a T1/4 value shown in FIG. 20 to the memory. In S1908, it is determined whether the interrupt trigger is due to an ENC0 signal, or due to an ENC1 signal. The processing advances to S1909 in the case of an ENC0 trigger, and to S1912 in the case of an ENC1 trigger. In S1909 and S1912, processing is performed to determine whether the respective interrupt trigger signal is a rise signal or a fall signal. When it is determined to be an ENC0 rise signal in S1909, processing advances to S1910, and when it is determined to be an ENC0 fall signal, processing advances to S1911. When it is determined to be an ENC1 rise signal in S1912, processing advances to S1913, and when it is determined to be in ENC1 fall signal, processing advances to S1914.

In S1910, S1911, S1913, and S1914, an optimal table number (target table number) to be acquired at a present timing if there is a 0° advance angle is respectively selected. Specifically, in S1910, the value of the variable TrgtSameTimeTableNumForEncOUP is assigned to the variable TrgtSameTimeTableNum. Similarly, in S1911, the value of the variable TrgtSameTimeTableNumForEnc0Down is assigned to the variable TrgtSameTimeTableNum. In S1913, the value of the variable TrgtSameTimeTableNumForEnc1Up is assigned to the variable TrgtSameTimeTableNum. In S1914, the value of the variable TrgtSameTimeTableNumForEnc1Down is assigned to the variable TrgtSameTimeTableNum. Processing then advances to S1915 of FIG. 21.

Figure 23:
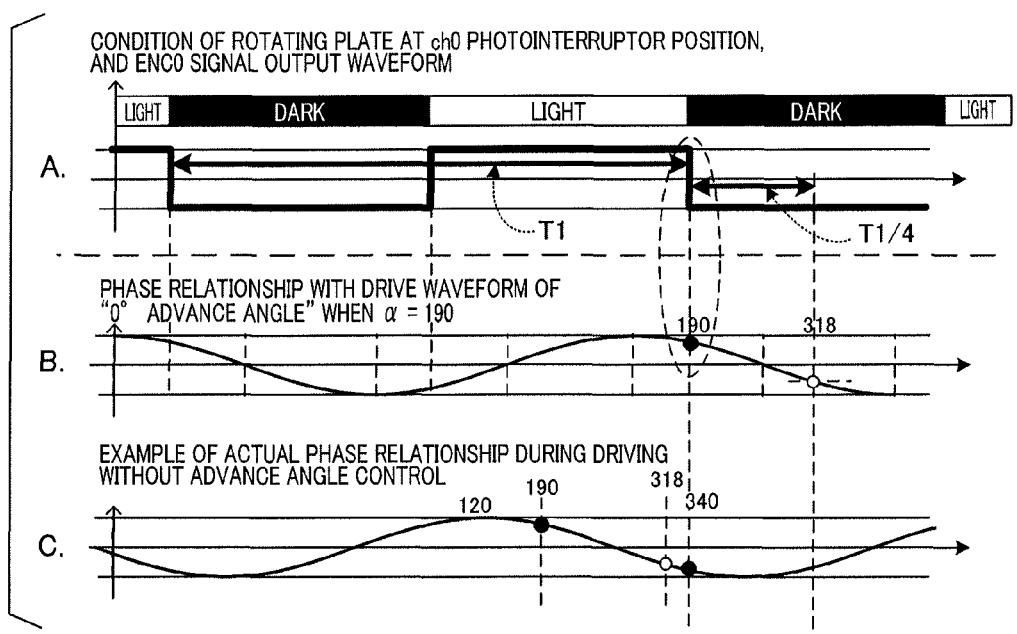
FIG. 23 is a diagram illustrating an unstable rotational state.

Processing in S1915 is performed which determines whether the present rotational direction is forward rotation (CW) or reverse rotation (CCW). Processing advances to S1916 in the case of forward rotation, and to S1917 in the case of reverse rotation. In S1916 and S1917, processing is performed which calculates a table number variation amount that is supposed to proceed from the present time until a point after elapse of T1/4 time. This is obtained by adding a differential value, which is obtained from a table number value that is supposed to be acquired at the present time and a table number value that is actually acquired, to the table number portion 128 corresponding to a 1/4 cycle. In S1916, (TrgtSameTimeTableNum−CurTblNum)+128 is calculated, and the resultant value is assigned to TblCntForNextQtrPhs. In S1917, (CurTblNum−TrgtSameTimeTableNum)+128 is calculated, and the resultant value is assigned to TblCntForNextQtrPhs. As the orientation with which table numbers proceed is reversed between the direction of forward rotation and the direction of reverse rotation, the sequence of subtraction in the parentheses is reversed. In the subsequent S1918, determination processing is performed which checks whether the table number variation amount that is supposed to proceed from the present point until a point after elapse of T1/4 time is a negative value. Processing advances to S1919 when the value of the variable TblCntForNextQtrPhs is negative, and to S1920 when it is zero or more. The case where the value of the variable TblCntForNextQtrPhs is negative is described with reference to FIGS. 23A to 23C. FIG. 23A shows an output waveform of an ENC0 signal and a light/dark phase of the slit rotating plate 105. FIG. 23B shows a drive waveform in a state where the advance angle is 0°, and FIG. 23C shows a drive waveform when advance angle control is not performed.

In FIG. 23C, the table number variation amount that is supposed to proceed from the present time until a point after the T1/4 time is a negative value. In this case, a value of 340 is acquired at the point when the ENC0 signal falls. Consequently, compared to the table number 318 that is supposed to be acquired at the point after elapse of the T1/4 time, a variation amount of 318−340=−22 (negative value) is obtained. In order to avoid this, in S1919, a predetermined minimal phase advance amount is set in the variable TblCntForNextQtrPhs as the table number variation amount that is supposed to proceed within the next T1/4 transition time. This situation does not occur if the state of the advance angle is not −90° or less, and is inhibited in forward rotational operation, but it may occur when abnormal loads are imposed on the motor, or in cases of large load irregularities or rotational irregularities.

In the subsequent S1920, a speed NxtPPS_Val of the drive voltage waveform to be set next is calculated from the table number variation amount that is supposed to proceed within the next T1/4 time, the count value equivalent to the T1/4 calculated in S1907, and conversion variables for performing conversion to an actual rotational speed. The value of a conversion variable Conversion_Rate for performing conversion to rotational speed is already known, and a post-change speed NxtPPS_Val is calculated from the following formula.

$$NxtPPS\_Val = (TblCntForNextQtrPhs/CurEncQurtPrdCnt) \times Conversion\_Rate \quad \text{(Formula 1)}$$

In S1921, after setting the speed value calculated in S1920 in the sinusoidal wave generator 109, processing advances to S1905. From the above, it is possible to perform rotational control of the stepping motor while maintaining the designated positional relationship of the drive voltage waveform and the magnetization phase of the rotor magnet 119. In S1919 of FIG. 21, when the table number variation amount that is supposed to proceed within the T1/4 time from the present point is a negative value, the predetermined variation amount is reset, and the fixed speed that was predetermined in S1921 may also be set. By means of the above processing, control is achieved which optimizes the drive waveform phase according to the rotational position of the rotor using a sinusoidal drive voltage waveform.

(Control at 1/2 Cycle)

Figure 24:
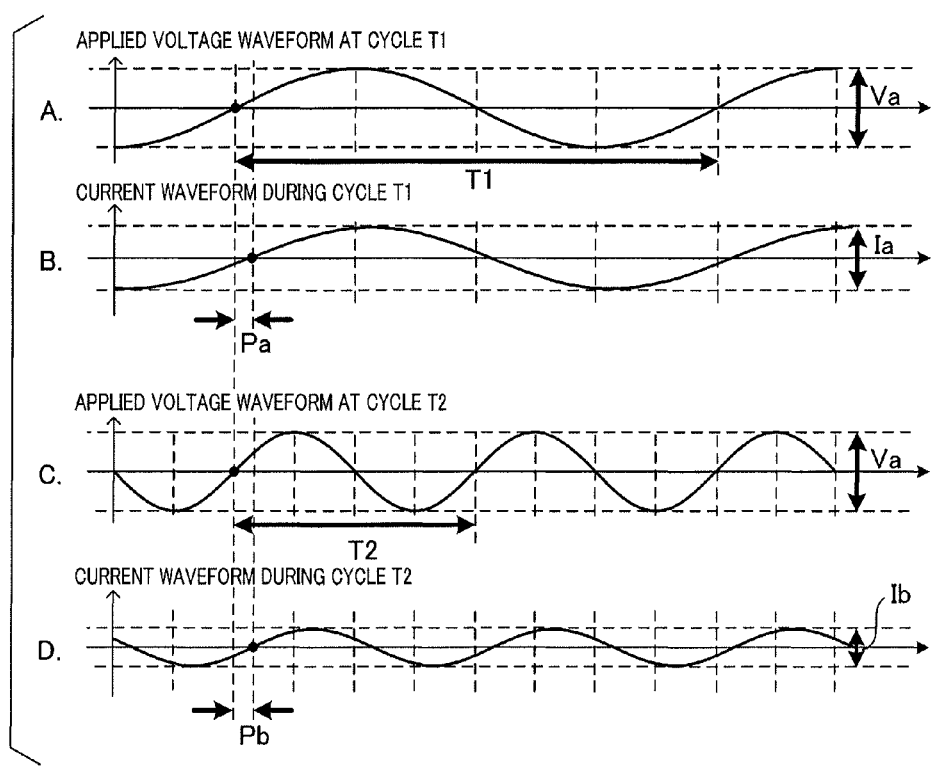
FIGS. 24A to 24D are diagrams illustrating current delay, for purposes of describing the correction processing of the present invention at 1/2 cycle in conjunction with FIGS. 25 28.

FIGS. 24 and 25 are explanatory diagrams relating to advance angle operation. FIG. 24A shows an applied voltage waveform during low-speed rotation, and FIG. 24B shows a coil current waveform at that time. FIG. 24C shows an applied voltage waveform during high-speed rotation, and FIG. 24D shows a coil current waveform at that time. In FIGS. 24A and 24C, the gains of the imparted voltage waveforms are both Va. In contrast, the gains of the current waveforms in FIGS. 24B and 24D respectively Ia and Ib, and are in the relationship of Ia>Ib.

With respect to motor structure, sustaining the effects of the delay component of coil current and the back electromotive force of the motor, the current that flows in the coil with respect to an actually imparted voltage waveform is not a value obtained by dividing the voltage waveform by a resistance value. A phase delay occurs according to speed, and the amplitude gain of the current waveform decreases as speed increases. As shown in FIG. 24, the phase delay of the current waveform is Pa in the case of a voltage waveform where the measured cycle is T1, and the phase delay of the current waveform is Pb in the case of a voltage waveform where the measured cycle is T2. As the cycle shortens from T1 to T2, the ratio of Pb relative to a cycle T2 is larger. Thus, a current delay component that may be largely ignored at times of low speed is a factor that cannot be ignored at times of high speed driving.

Figure 25A:
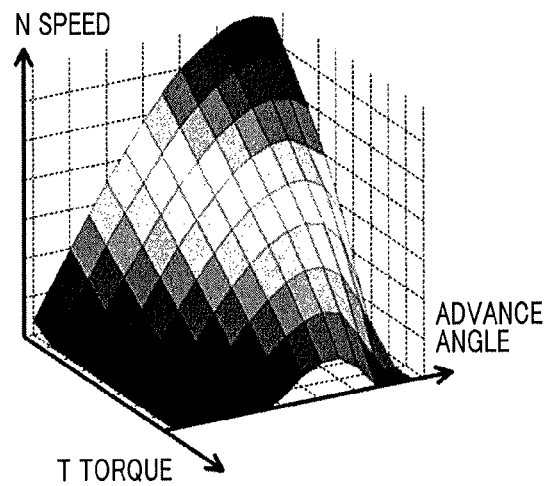
FIGS. 25A to 25C are diagrams illustrating the relationship of torque, speed, and advance angle.
Figure 25B:
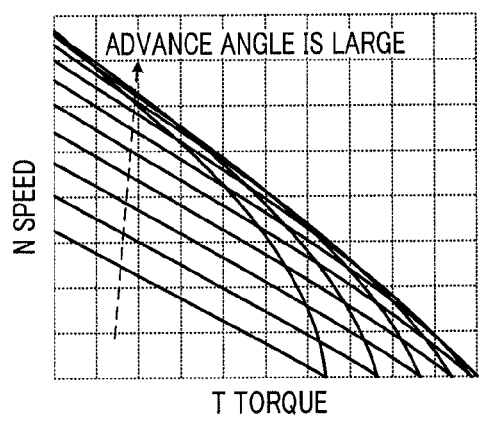
Figure 25C:
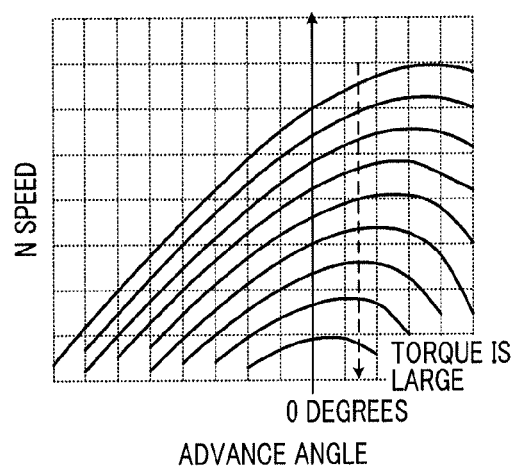

In the above-described processing, control was described in which a motor is rotated at a voltage phase that is efficient for the rotor magnet 119, on the assumption that a phase displacement amount α of the slit rotating plate 105 and the rotor magnet 119 is known in advance. However, when motor speed enters a high-speed region, as the factor that actually generates torque is the phase of the current, it is necessary to compensate for the delay in current relative to the voltage waveform. FIGS. 25A to 25C are diagrams illustrating the relationships of torque T, speed N, and advance angle in a motor. FIG. 25A puts the relationships of the three elements of torque, advance angle, and speed into three-dimensional graph form. FIG. 25B is a graph which views FIG. 25A on the torque-speed plane. As the advance angle increases at equal intervals, the solid-line graph moves in the direction shown by the arrow of the broken line in FIG. 25B. In FIG. 25B, both torque and speed rise as the advance angle value increases, but torque and speed change in a trade-off relationship from a certain saturation point. In a high advance angle region, high speed can be maintained at low torque, but an extreme decrease in speed occurs when torque is high. FIG. 25C is a graph which views FIG. 25A on the advance angle-speed plane. As torque increases at equal intervals, the solid-line graph moves in the direction shown by the arrow of the broken line in FIG. 25C. In FIG. 25C, there is the characteristic that speed increases as the advance angle rises, but that speed decreases when the advance angle increases at a certain peak boundary. The speed peak has the property that movement into a low advance angle region advances as torque increases.

As may be understood from the foregoing description of FIGS. 24 and 25, it is necessary to perform advance angle control for purposes of maintaining an appropriate phase relationship of the drive waveform and the rotor magnet 119 according to a target rotational frequency and an imparted torque load. In light of this, with reference to the flowcharts of FIGS. 26 and 27, a description is given of control for maintaining a state of the drive voltage waveform phase and the magnetization phase of the rotor magnet 119 where a change is made from a 0° advance angle state to an optional advance angle state. As the processing from S2301 to S2303 of FIG. 26 is identical to the processing from S1901 to S1903 of FIG. 21 in the above-described processing, detailed description thereof is omitted, and the differences are described.

Figure 27:
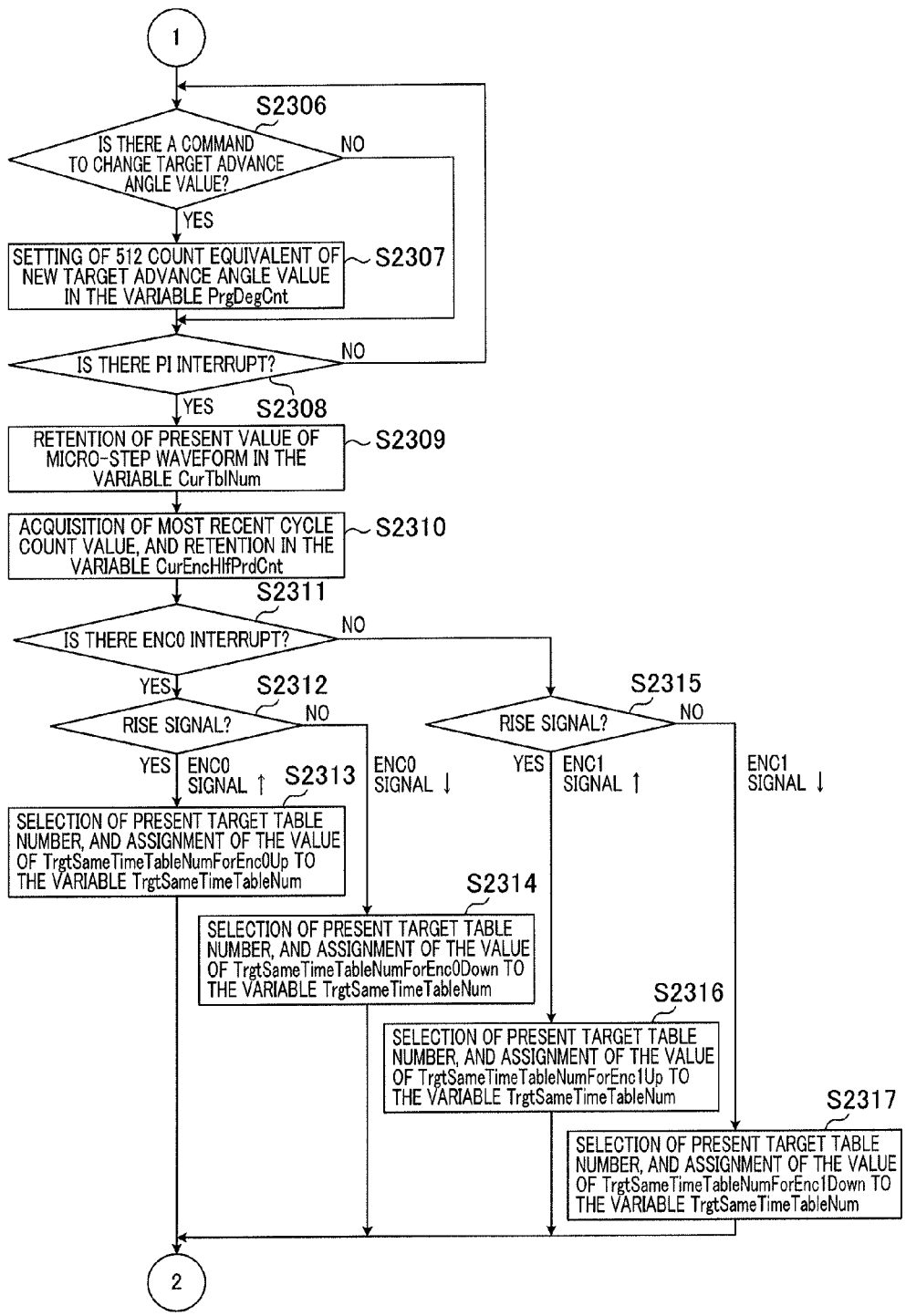
FIG. 27 is a flowchart illustrating the processing example that continues from FIG. 26.

In S2304, a request value is set which indicates a state obtained by changing the advance angle to a certain extent from the state of 0° advance angle. When the phase of the drive voltage waveform is in advance of the magnetization phase of the rotor magnet 119, the target advance angle adopts a positive value, and the 512 count equivalent of this value is set in the variable PrgDegCnt. On the other hand, when the phase of the drive voltage waveform delays relative to the magnetization phase of the rotor magnet 119, the target advance angle adopts a negative value, and the 512 count equivalent of that value is set in the variable PrgDegCnt. In the subsequent S2305, operation of the sinusoidal wave generator 109 starts, and driving of the stepping motor 101 starts via the PWM generator 111 and the motor driver 112. Regardless of rotational direction, the frequency of the energization waveform is below the self-activation frequency. The subsequent S2306 of FIG. 27 is processing which determines whether or not a change command for a target advance angle value has been issued from an external device (such as a control device or a host equipment). When a change command has been issued, processing advances to S2307, and the 512 count equivalent of the new target advance angle value is set in the variable PrgDegCnt. When a change command has not been issued, processing advances directly to S2308. As the processing of S2308 and S2309 is identical to the processing of S1905 and S1906 of FIG. 22, detailed description thereof is omitted.

In S2310, processing is performed in which elapsed time from a time of generation of a previous interrupt trigger that is identical to the present interrupt trigger, i.e., the latest cycle count value of the ENC0 signal and the ENC1 signal is acquired from the encoder circuit 107. Processing is performed in which a value that is one-half of this cycle count value (measured value) is calculated, and retained in the variable CurEncHlfPrdCnt. This is equivalent to saving the T1/2 value to the memory. As the processing from S2311 to S2317 is identical to the processing from S1908 to S1914 of FIG. 22, detailed description thereof is omitted.

Figure 26:
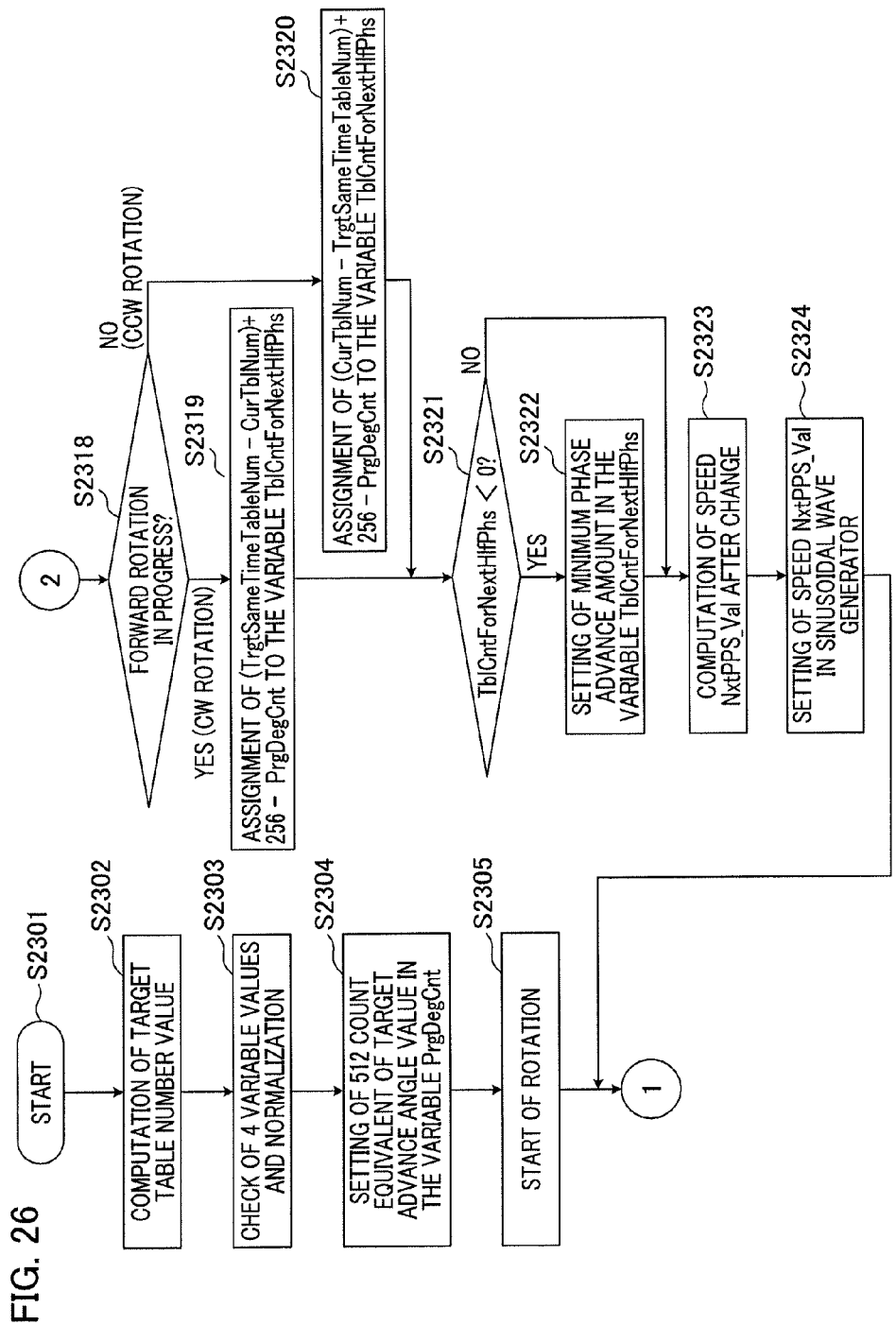
FIG. 26 is a flowchart illustrating a processing example in conjunction with FIG. 27.

S2318 of FIG. 26 is processing which discriminates whether the present drive direction is the direction of forward rotation of the direction of reverse rotation. Processing advances to S2319 in the case of forward rotation, and to S2320 in the case of reverse rotation. In S2319 and S2320, a table number variation amount is calculated that is supposed to proceed from the present point until a point after elapse of the T1/2 time. A differential value of the table number value that is supposed to be acquired at the present point and the table number value that is actually acquired is added to the 256 table number portion corresponding to the 1/2 cycle. Specifically, in S2319, (TrgtSameTimeTableNum−CurTblNum)+256−PrgDegCnt is calculated, and the resultant value is assigned to the variable value TblCntForNextHlfPhs. Moreover, in S2320, (CurTblNum−TrgtSameTimeTableNum)+256−PrgDegCnt is calculated, and the resultant value is assigned to the variable value TblCntForNextHlfPhs. As the orientation with which table numbers proceed is reversed between the direction of forward rotation and the direction of reverse rotation, the sequence of subtraction in the parentheses is reversed. The reason that, in contrast to the case of the above-described processing, setting is performed so that a table number value corresponding to the target phase value is obtained after elapse of the T1/2 time is because there may be cases where the target advance angle value changes due to S2307 of FIG. 27. In such cases, the advance angle state may greatly change from the present advance angle state even in a single processing, and processing is performed to lengthen transition time in order to preserve leeway. As the processing from the subsequent S2321 to S2324 is identical to the processing from S1918 to S1921 of FIG. 21, detailed description thereof is omitted. The speed calculation formula used in S2323 is as follows.

$$\mathrm{NxtPPS\_Val}=(\mathrm{TblCntForNextHlfPhs}/\mathrm{CurEncHlfPrdCnt})\times\mathrm{Conversion\_Rate} \quad \text{(Formula 2)}$$

By performing the processing described above, it is possible to efficiently rotate the stepping motor in an optional advance angle state. Processing is performed in which the transition time that is set at the 1/4 cycle in the above-described processing is set at the 1/2 cycle in this processing, and speed is changed so that the target advance angle state is obtained after elapse of this time. However, one is not limited thereto, and the transition time from the present point until the target advance angle state, i.e., the time corresponding to the phase value for adjustment can be optionally set. Taking into account the time taken until measurement and calculation of the drive waveform cycle, a transition time is calculated that includes the delay time required for calculation. In the above-described processing, a stepping motor was exemplified as the drive subject, but the present invention can be applied to various types of motors such as brushless DC motors.

Figure 28:
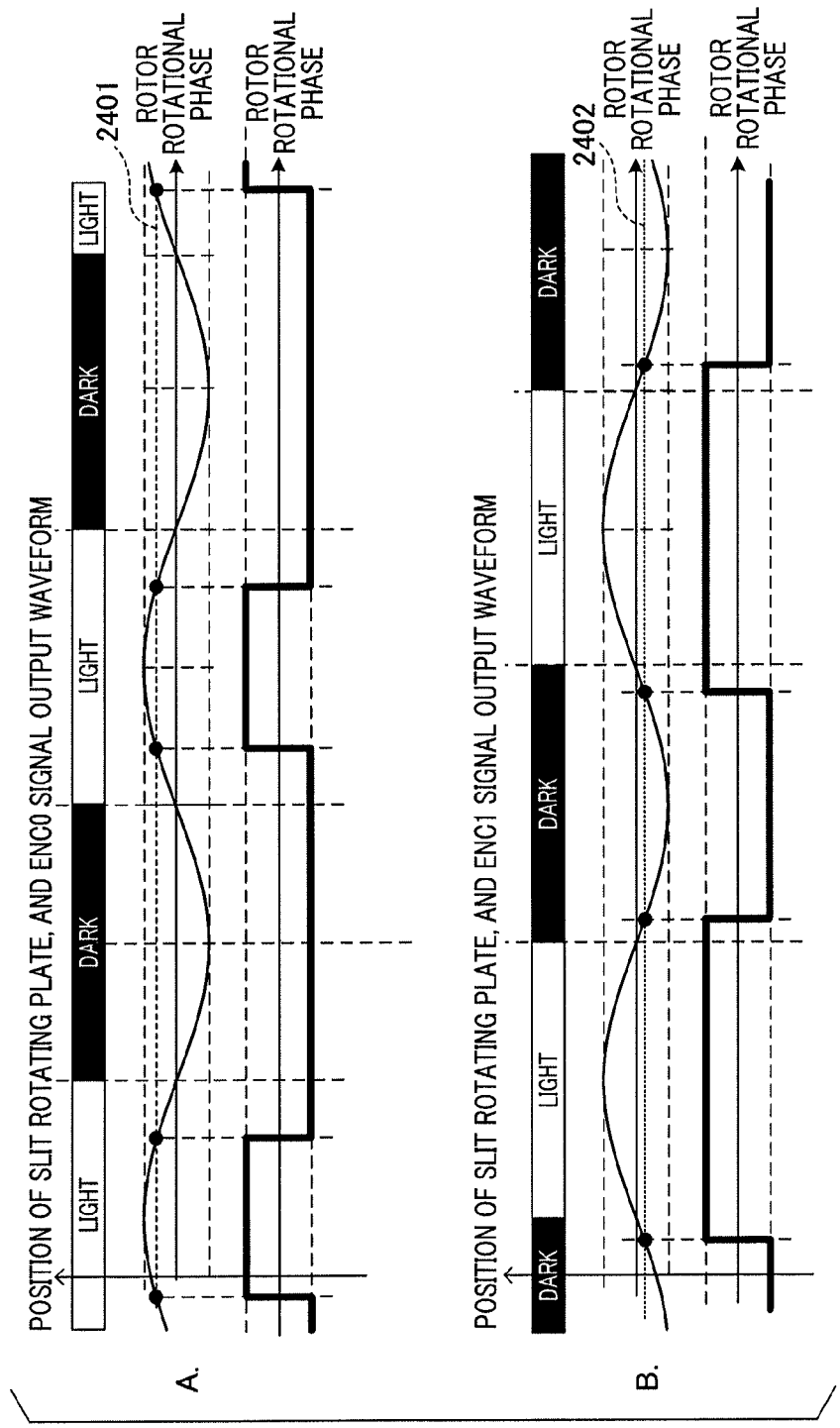
FIGS. 28A and 28B are diagrams illustrating the case where output adjustment of position detection is not appropriately performed.

The description has been performed on the assumption that the sensor output by PI is 50% of the DUTY ratio at steady rotation, but it is also feasible even with a DUTY value that deviates from a value of 50%. For example, FIG. 28 shows a case which relates to threshold values 2401 and 2402 that serve to binarize PI output, and which does not perform adjustment to a position where the duty ratio is 50%. This is a case where the high-level width of the ENC0 signal is narrower than the light period of the slit rotating plate 105, and the high-level width of the ENC1 signal is wider than the light period of the slit rotating plate 105. In the case of the binary outputs shown in FIGS. 28A and 28B, adjustment processing is performed in which table numbers are separately set in advance for the drive waveforms to be acquired at the respective points of ENC0 signal rise and fall, and ENC1 signal rise and fall. By this means, it is possible to omit an analog adjustment step pertaining to a PI threshold value.

In the above-described processing, a configuration example is described in which a slit rotating plate that is a detection subject is attached to optically perform position detection, but one is not limited thereto, and position detection may also be performed using a magnetic sensor by attaching a magnet to the motor shaft. Processing may be also acceptable in which position detection is performed by installing a magnetic sensor at a position where the magnetization phase of the rotor magnet is directly sensed.

(Processing for Adjustment of Phase Displacement)

With reference to the flowcharts of FIGS. 29 to 34, processing is described in detail for the case where phase displacement is adjusted by specifying a displacement amount relative to an actual motor, employing the principles for specification of an attachment displacement amount α described using FIGS. 8 and 9. Processing from the phase onward is implemented by having the CPU 108 read and run a program from the memory.

Figure 29:
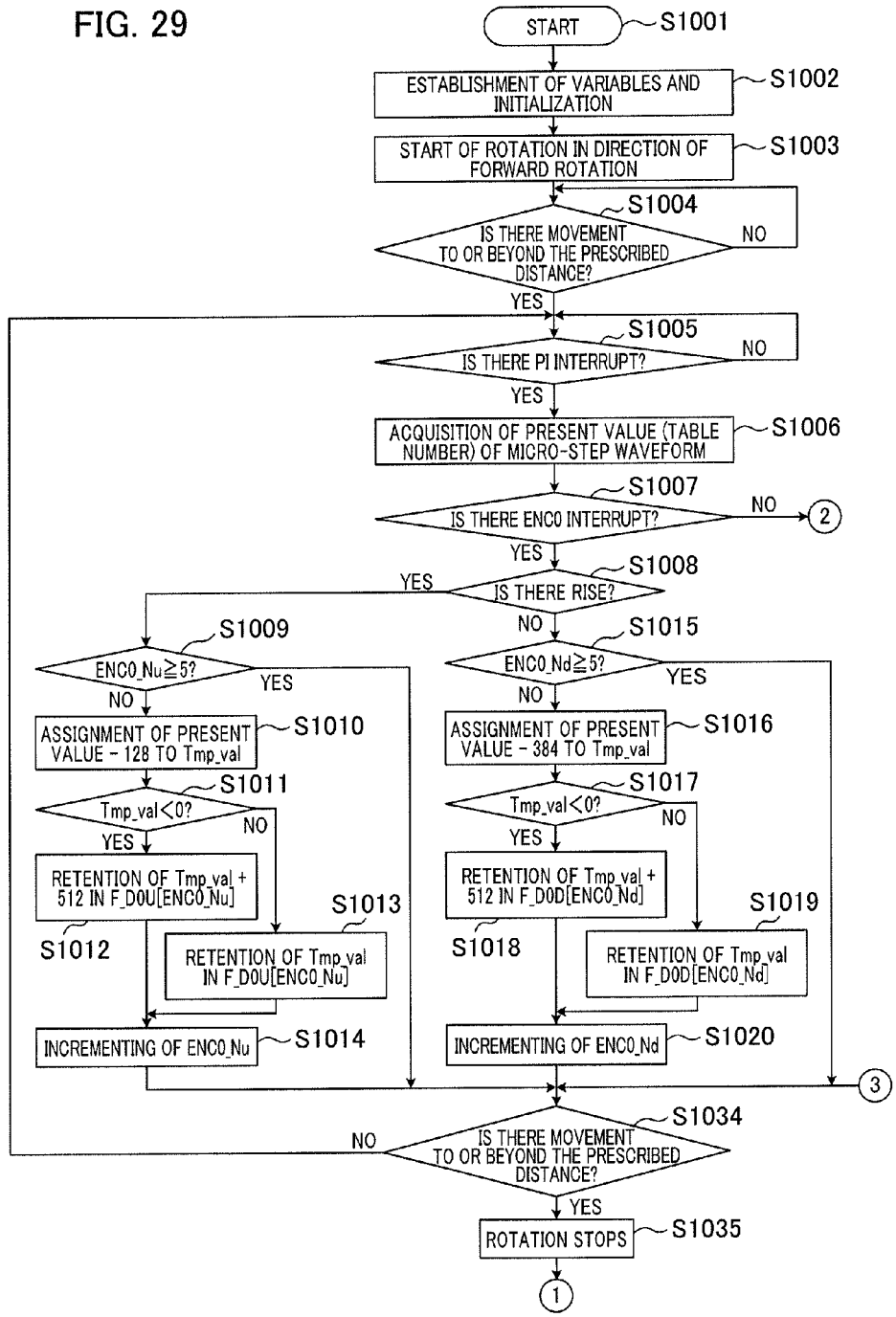
FIG. 29 is a flowchart illustrating a processing example during a phase deviation adjustment processing in conjunction with FIGS. 30 to 34.
Figure 30:
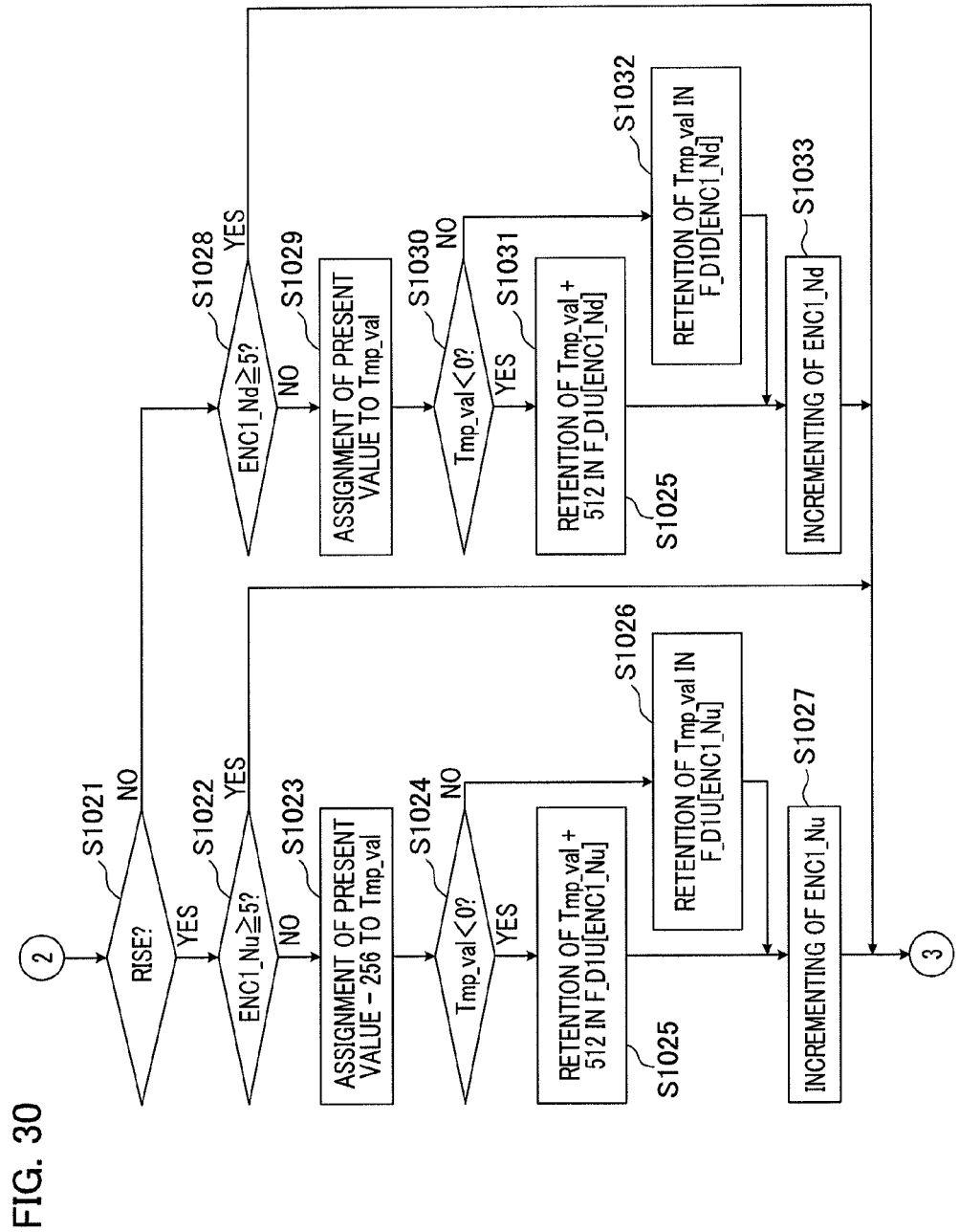
FIG. 30 is a flowchart illustrating a processing example related to FIG. 29.

Processing starts in S1001 of FIG. 29, and processing to establish and initialize the variables that are used in processing is performed in S1002. Each timing of rise and fall of the ENC0 signal and the ENC1 signal respectively occurs five times per motor rotation, and there are the two patterns of forward rotation and reverse rotation. As it is necessary to retain the table number value of the micro-step waveform at these signal change times, variables for establishment of a total of 40 table numbers are prepared. As each timing of rise and fall of the ENC0 signal and the ENC1 signal respectively occurs five times per rotation, four index numbers are prepared for purposes of recording which rotational position data is acquired at the time of data acquisition. These values are cleared to zero by initialization. For purposes of descriptive convenience, the respective variables are defined below as follows.

Index Variables (4 Variables) for Data Acquisition Numbers

Variable which shows a data acquisition number at the point of ENC{X} signal rise: ENC{X}_Nu Variable which shows a data acquisition number at the point of ENC{X} signal fall: ENC{X}_Nd Here, X=0, 1; and ENC0 corresponds to the ENC0 signal, and ENC1 corresponds to the ENC1 signal.

Data Variables (20 Variables) Used During Forward Rotation

Data variable at the point of ENC{X} signal rise: F_D{X}U[4]

Data variable at the point of ENC{X} signal fall: F_D{X}D[4]

These are all array variables, and the index number adopts any one of 0 to 4. Five variables are established which respectively pertain to the two types of X=0,1 and the two types of rise and fall, i.e., a total of 20 variables. With respect to reverse rotation, they are as shown below.

Data Variables (20 Variables) Used During Reverse Rotation

Data variable at the point of ENC{X} signal rise: R_D{X}U[4]

Data variable at the point of ENC{X} signal fall: R_D{X}D[4]

Only the prefix of the variable is replaced with R_, and 20 variables are established as above. An initialization value is set with respect to these data variables by initialization in S1002, and ENC0_Nu, ENC0_Nd, ENC1_Nu, and ENC1_Nd are each initialized to 0.

In the subsequent S1003, a drive signal for the direction of forward rotation is output to the motor at a predetermined rotational speed, and motor rotation starts. The subsequent S1004 is processing which determines whether or not travel has occurred at or beyond a predetermined distance, prior to acquisition of phase data for position identification. The determination processing of S1004 has been provided, because rotor rotation may be unstable immediately after motor start-up. When it is determined by position detection that travel processing has been performed at or beyond the fixed distance by motor rotation in S1004, transition to S1005 occurs, but the determination processing of S1004 is repeated when travel distance does not meet the fixed distance.

In S1005, the CPU 108 determines whether or not a level change has occurred in the ENC0 signal and the ENC1 signal, and determines whether or not interruption has been applied. When a level change has occurred in these signals, transition to S1006 occurs, but standby processing is performed in S1005 when signal level change has not occurred.

In S1006, the present table number (hereinafter "present value") is acquired with respect to the sinusoidal waveform (multi-value waveform) for driving that is output, and is temporarily retained in the variable value. In S1007, it is determined whether the triggering signal that has generated the interrupt relative to the CPU 108 derives from the ENC0 signal or the ENC1 signal. When it is determined that the interrupt derives from the ENC0 signal, processing advances to S1008, and in the case of interrupt deriving from the ENC1 signal, processing advances to S1021 of FIG. 30. In S1008, it is determined whether or not the change in the ENC0 signal was a rise, and in S1021 of FIG. 30, it is determined whether or not the change in the ENC1 signal was a rise.

Firstly, the case is described where a rise of the ENC0 signal is detected in S1008. In the subsequent S1009, processing is performed to determine whether the data acquisition number at the rise of the ENC0 signal, i.e., the value of ENC0_Nu is 5 or more. When the value of ENC0_Nu is 5 or more, transition to S1034 occurs. On the other hand, if the value of ENC0_Nu is less than 5, transition to S1010 occurs.

In S1010, processing is performed in which 128 is subtracted from the present value retained in S1006. The value 128 is the table number that is acquired when the slit rotating plate 105 is attached at the reference position, and where there is no following delay of the rotor or electrical delay of the signals. That is, a differential with the actually acquired present value is calculated using table number 128 as reference. This processing is described with reference to FIGS. 35 and 36.

Figure 35:
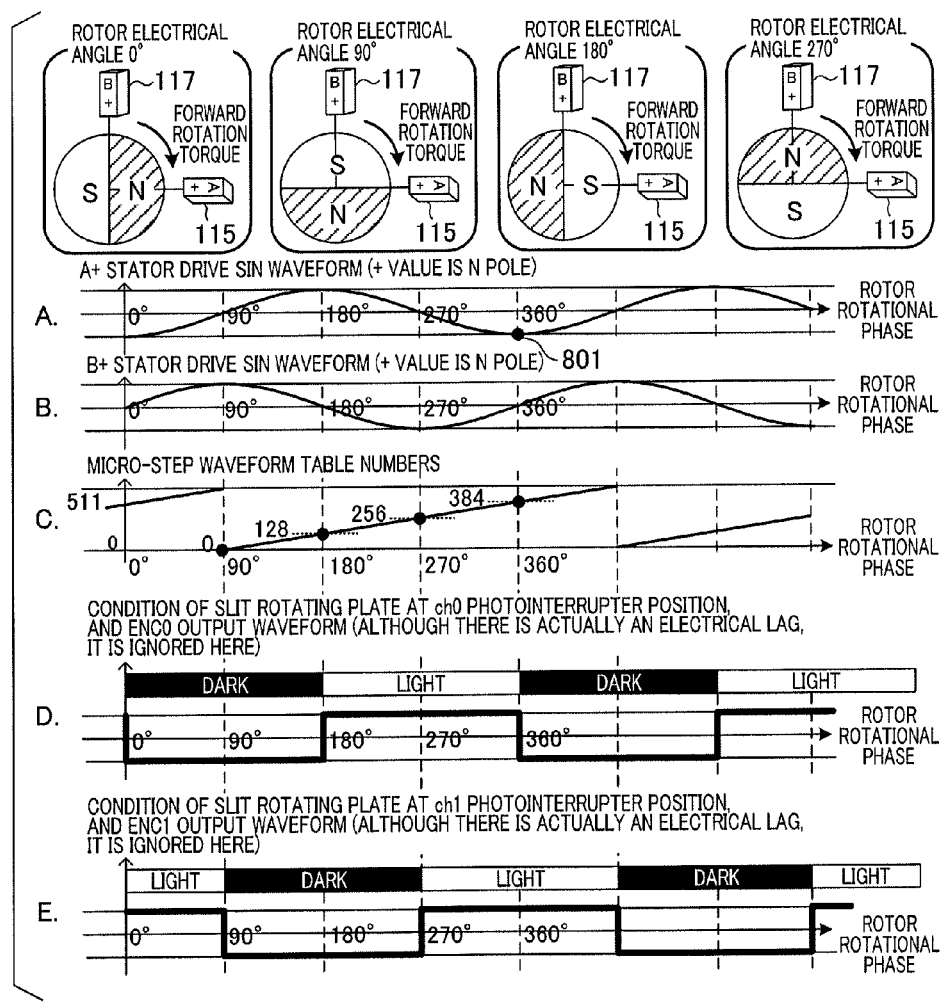
FIGS. 35A to 35E are diagrams illustrating relationships of reference position between a sensor and a rotor.
Figure 36:
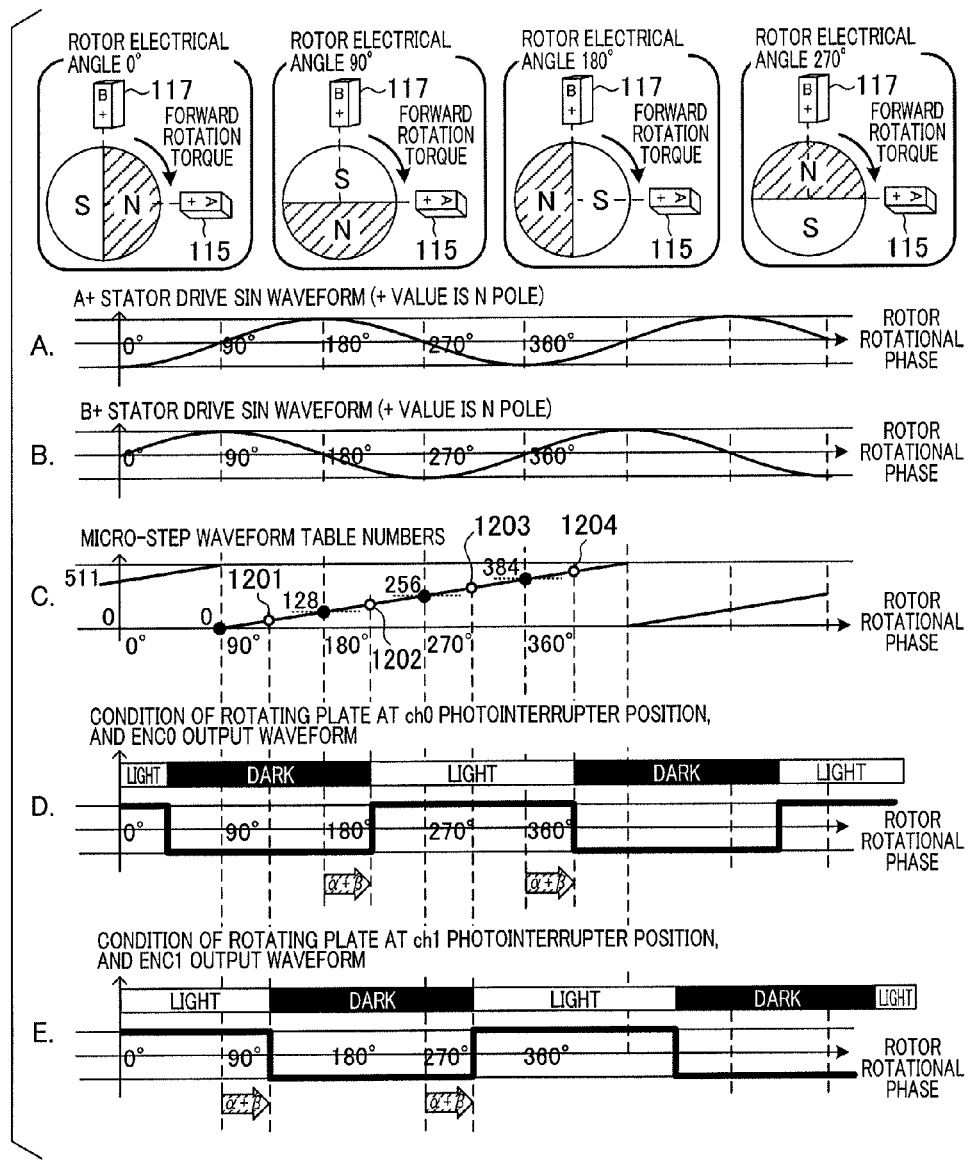
FIGS. 36A to 36E are diagrams illustrating phase deviation from the relationships of reference position between a sensor and a rotor.

In FIGS. 35 and 36, the upper portion illustrates rotational states extending from 0° to 270° at increments of a 90° electrical angle. FIGS. 35A, 35B, 36A, and 36B respectively show excitation waveform examples pertaining to the stator A+ and the stator B+. FIGS. 35C and 36C show table numbers of a micro-step waveform. FIGS. 35D and 36D show output waveform examples of the ENC0 signal at the detected position of the ch0-PI 103, and FIGS. 35E and 36E show output waveform examples of the ENC1 signal at the detected position of the ch1-PI 104.

FIG. 35 shows relationships of a rotor and output signals when the slit rotating plate 105 is attached at the reference position, and there is no following delay of the rotor or electrical delay of the signals. At this time, the table number acquired at the point of ENC0 signal rise is 128. In contrast, in reality, the slit rotating plate 105 is not attached at the reference position, and there is following delay of the rotor and electrical delay of the signals, as in FIG. 36. Consequently, the timing of ENC0 signal rise appears at the position at the point of the 1202 (between table numbers 128 and 256 ). By subtracting 128 from the table number at this position, it is possible to obtain a composite value of the delay component β 901 and the displacement amount α 902 described in FIG. 9.

In S1010 of FIG. 29, the value resulting from subtraction is assigned to a temporary variable (recorded as Tmp_val), and in S1011, it is determined whether or not Tmp_val is less than 0. Processing advances to S1013 when Tmp_val≥0, and to S1012 when Tmp_val<0. In S1013, the Tmp_val value is retained in the data variable F_D0U[ENC0_Nu]. In S1012, the value obtained by adding 512 to the Tmp_val value is retained in the data variable F_D0U[ENC0_Nu]. This is in order to normalize the table number to the 0-511 values. When the Tmp_val value is assigned to the data variable F_D0U[ENC0_Nu], it is stored in the variable region in association with ENC0_Nu that shows the present data acquisition number. In the present specification, for purposes of explanatory convenience, ENC0_Nu is denoted as an array index number.

In the subsequent S1014, increment processing is performed in which 1 is added to the value of ENC0_Nu, and transition to S1034 occurs. In S1034, it is determined whether or not the motor has rotated beyond the predetermined travel distance for data acquisition. When the motor has not rotated across the rotational angle amount corresponding to the prescribed travel distance, processing is continued by returning to S1005. When the motor has rotated across the rotational angle amount corresponding to the prescribed travel distance, transition to S1035 occurs, and the CPU 108 stops motor rotation.

The processing from S1015 to S1020 is processing that is performed at a time of ENC0 signal fall, and as it is processing that is identical to that of S1009 to S1014, detailed description thereof is omitted, and only the differences are described. The subject of S1015 and S1020 is the ENC0_Nd value, and the value which is subtracted from the present value in S1016 is 384. The data variable which is used in S1018 and S1019 is F_D0D[ENC0_Nd].

When interrupt is applied by the ENC1 signal in S1007, the processing from S1021 to S1033 (see FIG. 30) is performed. The processing of S1022 to S1027 that diverges from S1021 is processing that is performed at a time of ENC1 signal rise, and as it is identical to the processing from S1009 to S1014, detailed description thereof is omitted, and the differences are described. The subject of S1022 and S1027 is the ENC0_Nu value, and the value that is subtracted from the present value in S1023 is 256. The data variable used in S1025 and S1026 is F_D1U[ENC1_Nu]. Advancement occurs from S1027 to S1034 of FIG. 29. The processing from S1028 to S1033 is processing which is performed at a time of ENC1 signal fall, and as it is processing that is identical to that of S1009 to S1014, detailed description thereof is omitted, and only the differences are described. The subject of S1028 and S1033 is the ENC1_Nd value, and the present value is assigned to Tmp_val in S1029. The data variable used in S1031 and S1032 is F_D1D[ENC1_Nd]. Advancement occurs from S1033 to S1034 of FIG. 34.

Figure 31:
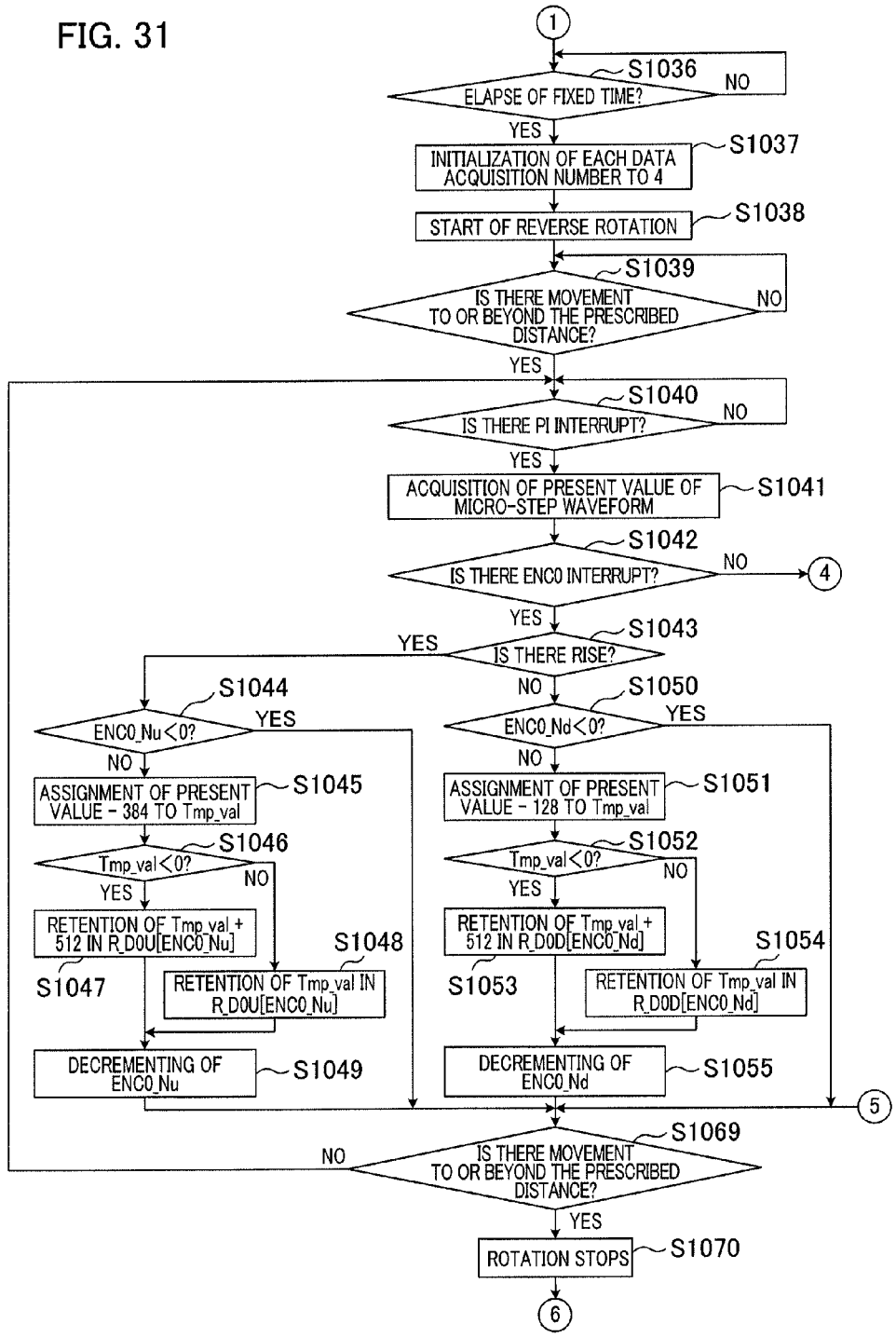
FIG. 31 is a flowchart illustrating the processing example that continues from FIG. 29.
Figure 32:
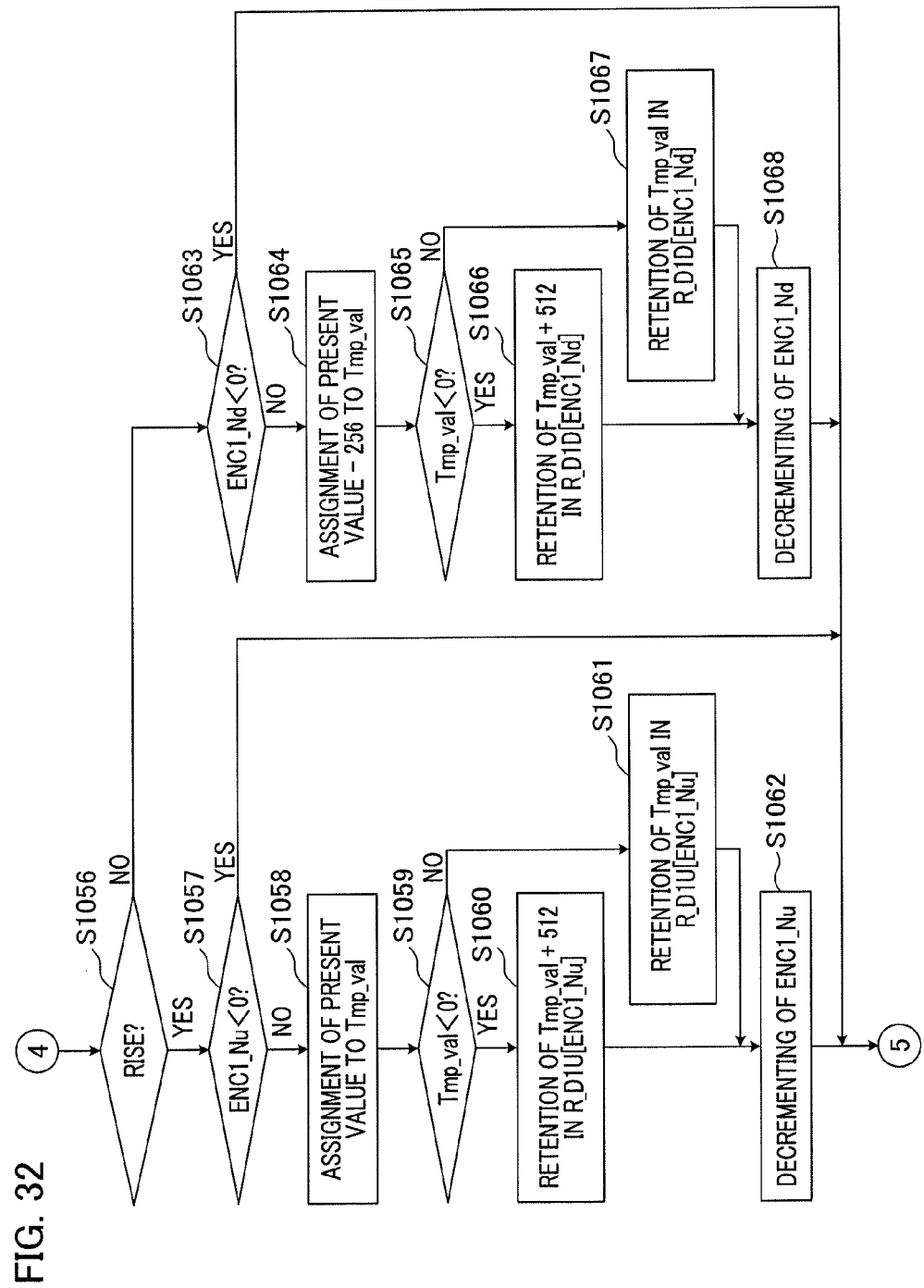
FIG. 32 is a flowchart illustrating a processing example related to FIG. 31.

S1036 of FIG. 31 is processing which determines whether or not a predetermined stationary time has elapsed from the point where the motor has been stopped during forward rotation. When the stationary time has not elapsed, standby occurs until the pertinent time has elapsed, and when the stationary time has elapsed, transition to S1037 occurs.

The values of ENC0_Nu, ENC0_Nd, ENC1_Nu, and ENC1_Nd already established in S1037 are all initialized to 4, and are decremented in the following processing (see S1049, S1055, S1062, and S1068). By doing this, it can be grasped which physical location has occurred within the 5 times that data of the same index number is generated in a single motor rotation during forward rotation and reverse rotation. In the subsequent S1038, the motor starts reverse rotation. Rotational frequency at this time is the same rotational frequency as during forward rotation. Thereafter, as the processing of S1039 to S1070 is processing that is approximately identical to that of S1004 to S1035, detailed description thereof is omitted. The main difference is that, with respect to signal change that is generated in the same rotational phase of the ENC0 signal and the ENC1 signal, the relationships of rise and fall during forward rotation and during reverse rotation are reversed. Consequently, when a table number is processed from the reference position during ENC0 signal rise, 128 is subtracted from the present value during forward rotation, and 384 is subtracted from the present value during reverse rotation (see S1045). Similarly, 128 is subtracted from the present value in S1051. In the case also of the ENC1 signal (see S1056 to S1068 of FIG. 32), processing is similarly performed in which the opposite values are used during forward rotation and reverse rotation, because a value which is displaced by 180° in the sinusoidal wave is used as the reference value with respect to the table number value. That is, the subtraction value in S1058 is 0, and the subtraction value in S1064 is 256.

Figure 33:
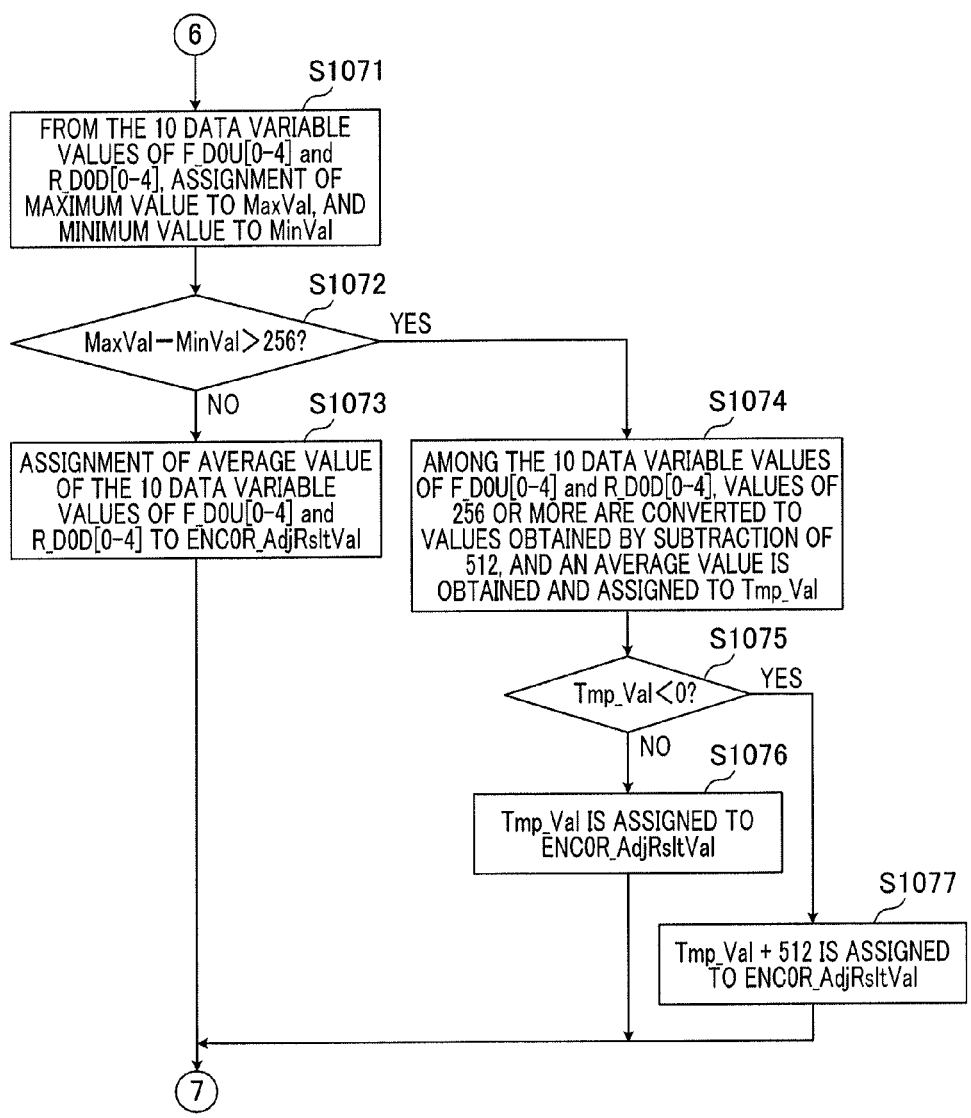
FIG. 33 is a flowchart illustrating the processing example that continues from FIG. 31.
Figure 34:
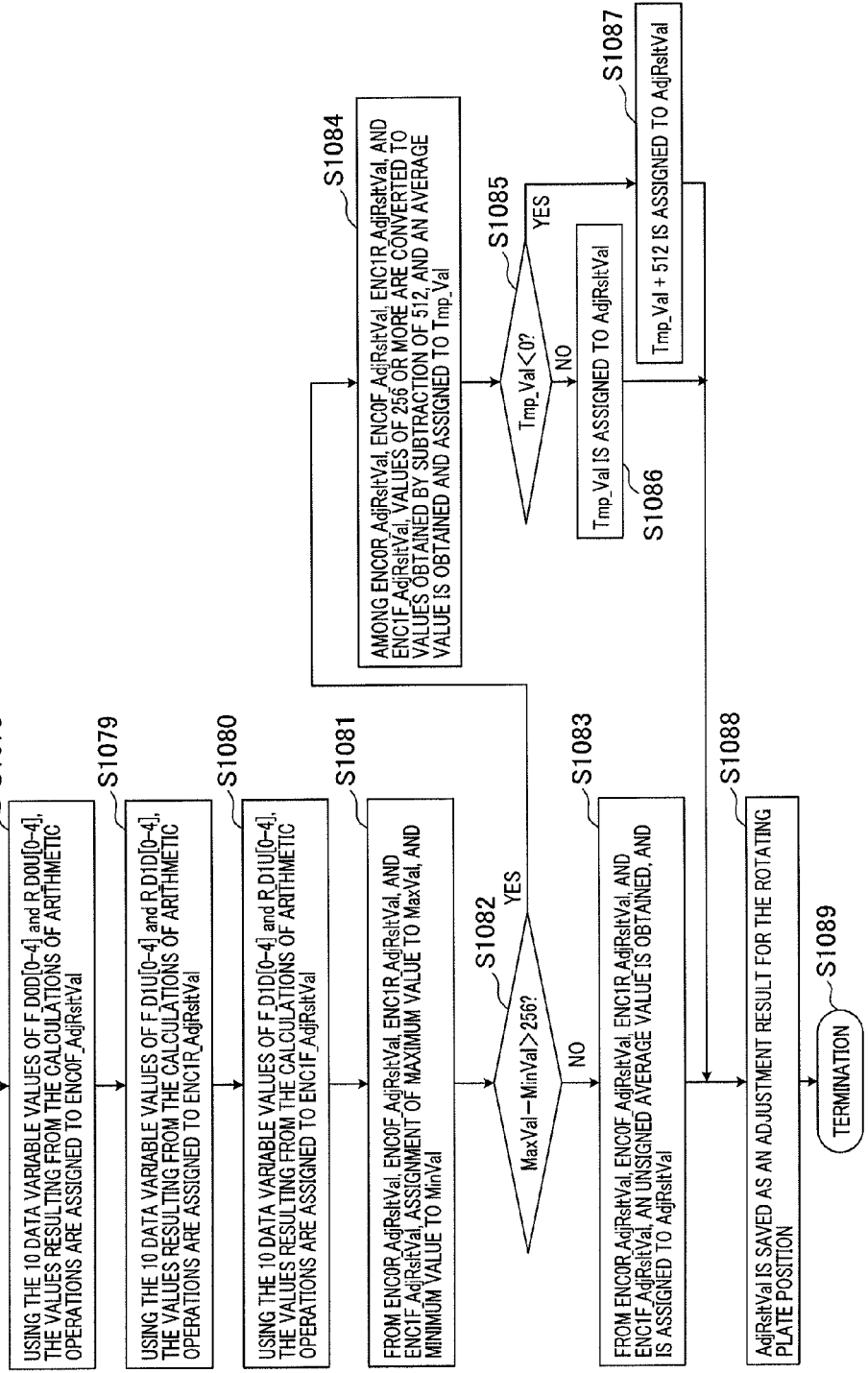
FIG. 34 is a flowchart illustrating the processing example that continues from FIG. 33.
Figure 37:
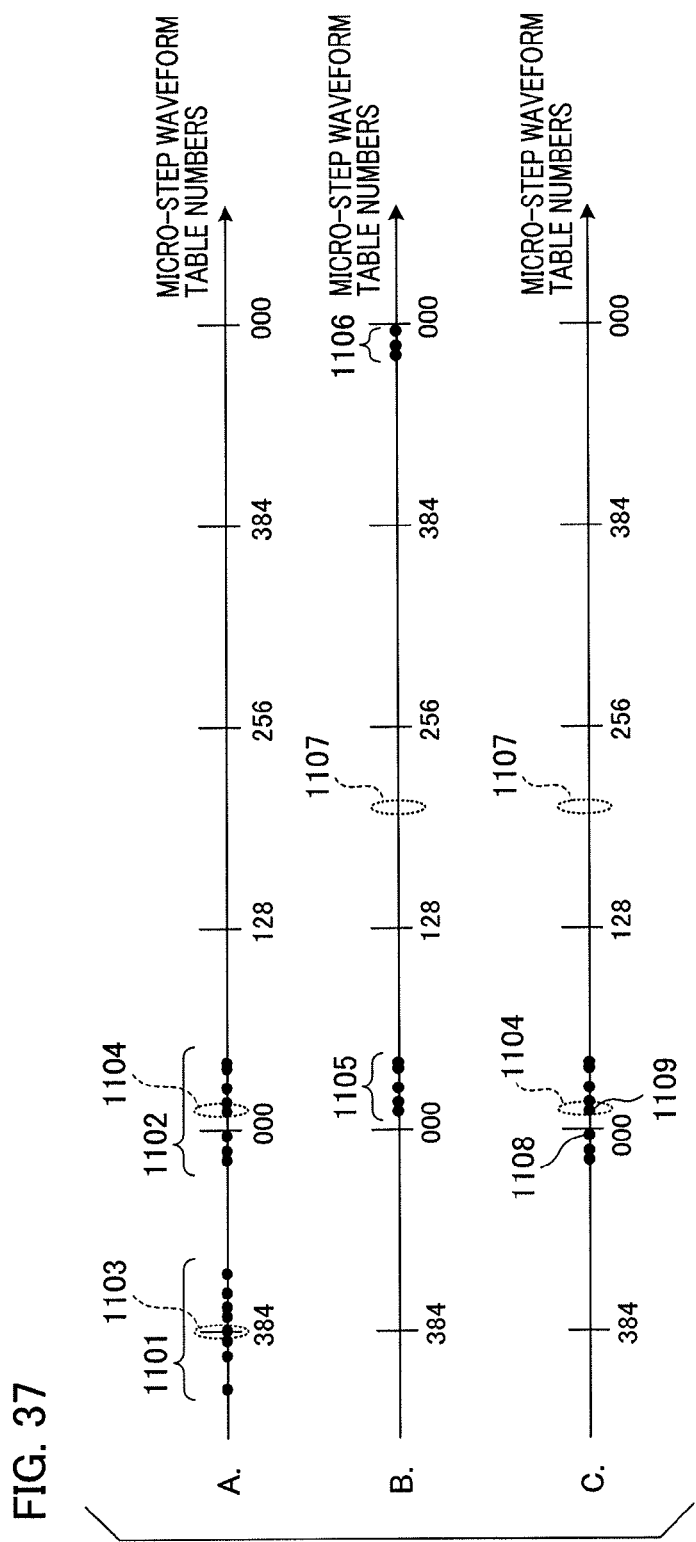
FIGS. 37A to 37C are diagrams illustrating calculation processing of a phase averaged value.

Next, a description is given of the processing from S1071 onward of FIG. 33. In S1071, a maximum value and a minimum value are calculated from among the data variables F_D0U[ENC0_Nu] and F_D0D[ENC0_Nd] used in forward rotation, i.e., from among all of the values retained in each of the five variables. The maximum value is assigned to the variable MaxVal, and the minimum value is assigned to the variable MinVal. The subsequent S1072 is processing which compares the value of the differential MaxVal−MinVal to 256, and which determines whether or not the differential value is greater than 256. Transition to S1074 occurs when the differential value is greater than 256, and transition to S1073 occurs when the differential value is 256 or less. Prior to describing S1073 to S1077 of FIG. 33, the necessity of performing this series of processing steps is described with reference to FIG. 37. FIGS. 37A to 37C show distribution examples of the data variables F_D0U [ENC0_Nu] and F_D0D[ENC0_Nd] in point groups.

In FIG. 37A, sample data groups 1101 and 1102 respectively represent 10 data groups of F_D0U[ENC0_Nu] and F_D0D[ENC0_Nd]. In the case of the distribution shown in sample data group 1101, an average value of phase values is obtained by taking all of the average values (see 1103). However, in the distribution shown in sample data group 1102, the data group is distributed across a site that is a gap of the table numbers 511 and 0. Consequently, with respect to sample data group 1102, average value calculation is performed in a format that is segmented into the two groups of sample data group 1105 and sample data group 1106 shown in FIG. 37B. As a result, rather than an average value that would normally be in the vicinity of 0 (see 1104 of FIG. 37A), an average value is calculated that is between 128 and 256 (see 1107 of FIG. 37B).

Thus, it is necessary to perform appropriate processing in cases where the sample data group is distributed with values in the vicinity of 511 and 0. Consequently, discrimination of processing cases is performed by obtaining a minimum value (see 1109 of FIG. 37C) and a maximum value (see 1108 of FIG. 37C) of the sample data group 1102, and determining a differential value thereof. When this differential value exceeds 256, i.e., in the case of a difference of 180 or more in the phase pertaining to the sample data value, it is determined that the sample data group extends across the boundary of 511 and 0. In such cases, a desired value is obtained by the processing of the below-described S1074 to S1077. Due to the mechanical configuration of the motor and the speed used in adjustment, it is impossible to obtain a value at which the difference of the maximum value and the minimum value is 256 or more, but the sample data group does not extend across the boundary of 511 and 0. Even supposing that such a thing were possible, it would seem that the state of motor rotation would be unstable, or that problems would occur in the electric circuits. Consequently, this case is processed as an adjustment error. Based on the foregoing description, the processing from S1073 onward of FIG. 33 is described.

In S1073, an average value of a total of 10 pieces of data pertaining to F_D0U[ENC0_Nu] and R_D0D[ENC0_Nd] is calculated, and the result is assigned to the variable ENC0R_AdjRsltVal. In S1074, an average value is calculated by treating values of 256 or more among the total of 10 pieces of data pertaining to F_D0U[ENC0_Nu] and R_D0D [ENC0_Nd] as values from which 512 is subtracted, and the result is assigned to the temporary variable Tmp_Val. In the subsequent S1075, it is determined whether or not the value of Tmp_Val is less than 0. Transition to S1076 occurs when the value of Tmp_Val is 0 or more, and transition to S1077 occurs when the value of Tmp_Val is less than 0. In S1076, the value of Tmp_Val is assigned to the variable ENC0R_AdjRsltVal. In S1077, a value obtained by adding 512 to the value of Tmp_Val is assigned to ENC0R_AdjRsltVal. After S1076 and S1077, processing advances to S1078 of FIG. 34.

In S1078, the same processing as that of S1071 to S1077 is performed using a total of 10 pieces of data according to F_D0D[ENC0_Nd] and RD0U[ENC0_Nu]. The result (average value) is assigned to ENC0F_AdjRsltVal. In the subsequent S1079, the same processing as that of 1071 to 1077 is performed using a total of 10 pieces of data according to F_D1U[ENC1_Nu] and R_D1D[ENC1_Nd]. The resultant value (average value) is assigned to ENC1R_AdjRsltVal. In the subsequent S1080, the same processing as that of S1071 to S1077 is performed using a total of 10 pieces of data according to F_D1D[ENC1_Nd] and R_D1U[ENC1_Nu]. The result (average value) is assigned to ENC1F_AdjRsltVal.

In the processing of S1081 to S1087, the four values of ENC0R_AdjRsltVal, ENC0F_AdjRsltVal, ENC1R_AdjRsltVal, and ENC1F_AdjRsltVal are used. The same processing is that of S1071 to S1077 is performed. The resultant value (an average value without reference numeral) is assigned to the variable AdjRsltVal. In the subsequent S1088, the calculated value of AdjRsltVal is retained in the memory as the resultant value of the adjustment position. An operation is performed in which an adjustment value of phase displacement is set based on the value of AdjRsltVal. After this operation, during motor driving, appropriate drive control is performed according to correction based on the saved phase displacement amount. As the value of AdjRsltVal is a value corresponding to the phase displacement amount α of the slit rotating plate 105, and as it is a value obtained by dividing a 360° portion of the electrical angle by 512 at the step of S1083, it may also be converted into degree units as necessary, and saved in the memory. All processing ends in S1089.

In this processing, a phase displacement amount of the output of the encoder sensor provided in the motor can be simply detected in a short time merely by performing detection processing by driving the motor only a prescribed amount in a first direction and an opposite second direction with open control. With respect to motor adjustment operation based on the phase displacement amount α, as there is no need to connect the motor to an adjustment jig or the like, it may be performed by the motor unit alone, and may be carried out even after the motor has been incorporated into an apparatus. In a state of incorporation into an apparatus, when the apparatus is in normal use, this processing can be performed in parallel with other processing, thereby enabling adjustment by detection of the phase displacement amount of the output of the encoder sensor through variation over time.

Figure 38:
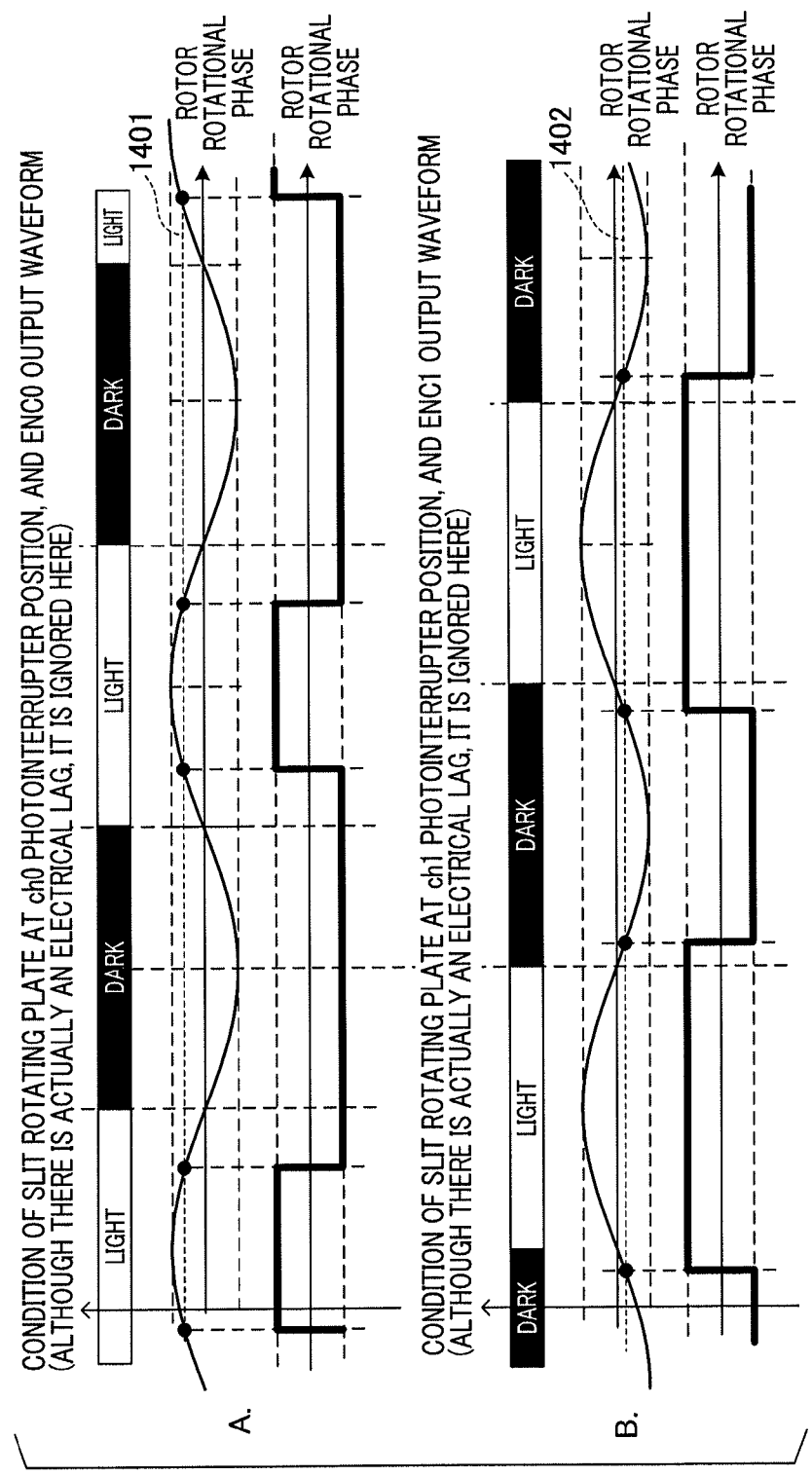
FIGS. 38A and 38B are diagrams illustrating a state where sensor output adjustment is insufficient.

As shown in FIG. 38, even when a binarized threshold value 1401 of the ENC0 signal or a binarized threshold value 1402 of the ENC1 signal is not appropriately adjusted, a phase displacement amount α can be accurately calculated by calculating an average value at the respective timings of rise and fall. This is the case where the high level width of the ENC0 signal illustrated in FIG. 38 is narrower than the light period of the slit rotating plate 105, and the high level width of the ENC1 signal is wider than the light period of the slit rotating plate 105.

In this processing, a position detection unit using a photointerrupter and a slit rotating plate is adopted, but implementation may also be magnetically performed by a detection unit which attaches an encoder magnet to a rotor shaft as a detection subject, and which uses a magnetic sensor such as a hole sensor. Or there may be a configuration in which the magnetic force of a rotor magnet is directly detected by a magnetic sensor without a detection unit.

In this processing, a system is implemented in which phase data of a drive waveform of an excitation coil is acquired at times of sensor output change, but one is not limited thereto, and, for example, it may also be implemented by performing measurement of time using a hardware timer capable of detailed time measurement. In such cases, detailed calculation of phase values using a prevailing drive waveform cycle is performed by outputting an interrupt signal from a sinusoidal wave generation device at a specific timing of drive waveform output, and by performing time measurement at the pertinent timing and at the interrupt timing of sensor output change.

Furthermore, two photointerrupters were used in this processing, but it is a matter of course that implementation is also feasible in the case of a single sensor. Moreover, a configuration was adopted in which the positional relationship of the stator and the photointerrupter is mechanically determined, but implementation is also feasible even with a configuration in which the positional relationship of the two is not determined. In such a case, it is sufficient if processing adjustment can be performed by supposing existence of the positional relationship of FIG. 3A. The content that is to be essentially detected is information relating to how a sensor output waveform changes when the rotor magnet 119 is at whichever given positional relationship relative to a stator. Consequently, hypothetically assuming that the positional relationship of the stator and the photointerrupter is as shown in FIG. 3A, consistency is achieved if it is possible to recognize that the phases of the slit rotating plate 105 and the rotor magnet 119 are displaced to the extent of a detected α value. In this case, physically, the phase displacement amount of the slit rotating plate 105 and the rotor magnet 119 is not α. However, if use is performed on the assumption of treating a photointerrupter position as being at the position of FIG. 3A, there is no problem with considering that the phase displacement amount of the slit rotating plate 105 and the rotor magnet 119 is α.

An essential feature is that a sensor output position can be adjusted if it can be detected whether a sensor output waveform has changed when the rotor magnet 119 is at whichever given positional relationship relative to the stator. According to the above principle, when measurement is performed on the assumption that the positional relationship of the stator and the photointerrupter is mechanically determined, a phase displacement amount is absorbed by α even if there is displacement in the mechanical position of the photointerrupter. Consequently, there is the advantage that mechanical position displacement can be ignored.

With respect to this processing, the description assumes that the cycle of the drive waveform and the cycle of the sensor output are identical, but implementation is also feasible even if there is a multiplicative relationship where the cycle of the sensor output is twofold, threefold, or more of the drive waveform. The case of a twofold output sensor is shown in FIGS. 39A to 39E. In this case, there is a new situation, and its method of solution is described below.

Figure 39:
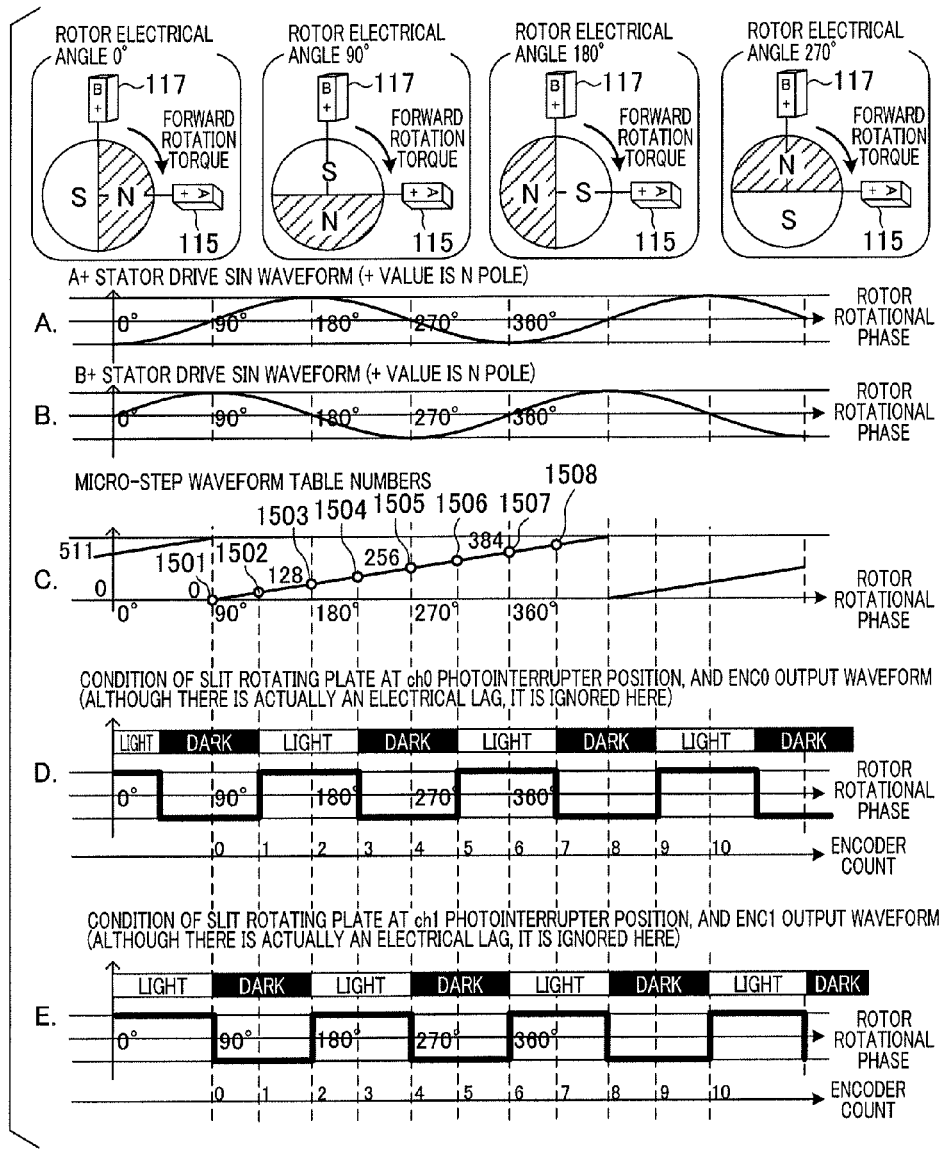
FIGS. 39A to 39E are diagrams illustrating the case where a double multiplication sensor is used.

The upper part of FIG. 39 shows examples where the rotational state extends from 0° to 270° at increments of a 90° electrical angle. FIGS. 39A and 39B respectively show excitation waveforms relative to the stator A+ 115 and the stator B+ 117. FIG. 39C shows table numbers pertaining to the drive waveform signals (micro-step waveforms) of an excited coil. FIGS. 39D and 39E show timings of the respective sensor outputs. The ENC0 signal and the ENC1 signal are counted by the encoder circuit. Encoder count values are respectively shown at the lower parts of FIGS. 39D and 39E.

With processing that uses multiplicative output, it is impossible to distinguish output at the point of an ENC0 signal rise in the cases of, for example, an encoder count value of 1, and an encoder count value of 5. Consequently, it is necessary to perform processing by linking signal output to the encoder count value. In the case of the example shown in FIG. 39, encoder output is performed 8 times within a period in which the electrical angle advances 360°. Consequently, the result of a remainder operation of an encoder count value of 8 is used. For example, at the time of interrupts at the points of two ENC0 signal rises, when a remainder operation of the encoder count is performed at that point, the result of a remainder operation of the ENC0 signal rise interrupt when a table number value (see 1502 of FIG. 39C) is acquired is 1. When a table number value (see 1506 of FIG. 39C) is acquired, the result of a remainder operation of the ENC0 signal rise interrupt is 5. This same result would also be obtained when travel is performed at the next 360° electrical angle portion. In this manner, a result of table number value acquisition that could not be distinguished with information pertaining to output source, rise, and fall can be solved by association with the result of a remainder operation obtained by dividing an encoder count value by a sensor timing frequency that is output at the time of travel covering 360° of electrical angle.

In this processing, for purposes of convenience in order to facilitate comprehension of the description, the primary focus of description was detection of an attachment position displacement amount of the slit rotating plate 105 relative to the rotor magnet 119. However, one is not limited thereto, and use may also be performed by calculating adjustment values by type of sensor trigger in the sensor output states illustrated in FIG. 38. In this case, the four values of ENC0R_AdjRsltVal, ENC0F_AdjRsltVal, ENC1R_AdjRsltVal, and ENC1F_AdjRsltVal shown in FIG. 34 constitute the final result. When adjustment processing is performed using this result, there is discrete use of four adjustment result values by trigger of the sensor that performed detection, rather than of average values. By this means, the advantage is obtained that it is possible to omit the adjustment operations of the binarized threshold values 1401 and 1402 shown in FIG. 38.

In this processing, the total number of pieces of data corresponding to sensor output signals in a single motor rotation is 20, and the adjustment result is obtained using an average value thereof. However, one is not limited thereto, and it is also acceptable to perform management by linking the result of a remainder operation obtained by dividing an encoder count value at the time of sensor signal change by 20 with an adjustment result obtained at that timing. In FIG. 29, a method is described in which index numbers respectively shown by ENC0_Nu, ENC0_Nd, ENC1_Nu, and ENC1_Nd are prepared, and the data pertaining to whichever rotational position exists at the time of data acquisition is recorded by assignment to the respective data variable value. By obtaining adjustment results that pair together data for forward rotation and data for reverse rotation having the same index numbers, adjustment processing can be carried out that detects and absorbs all minute phase irregularities between the slit rotating plate 105 and the rotor magnet 119.
(Count Value Correction Processing)

Figure 40:
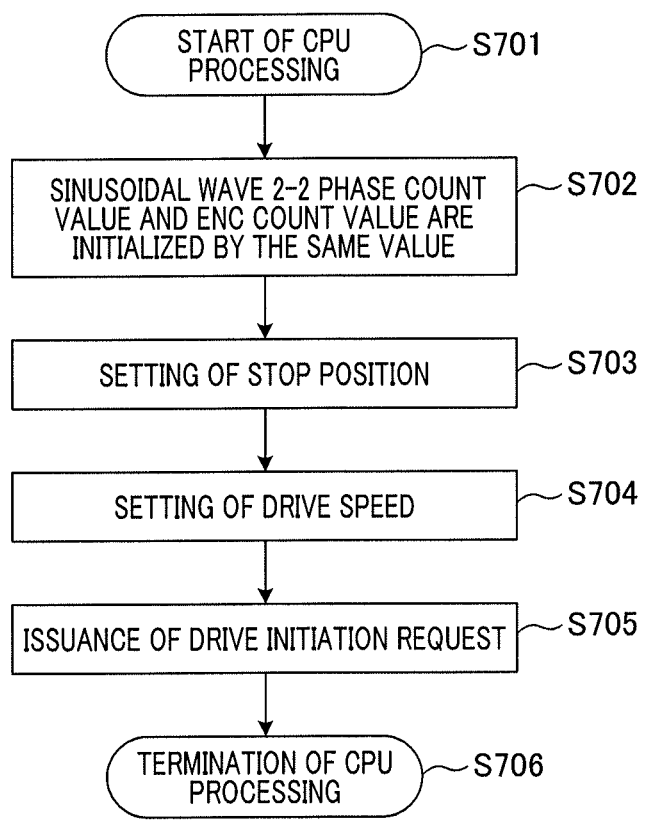
FIG. 40 is a flowchart illustrating an example of processing by CPU.
Figure 42:
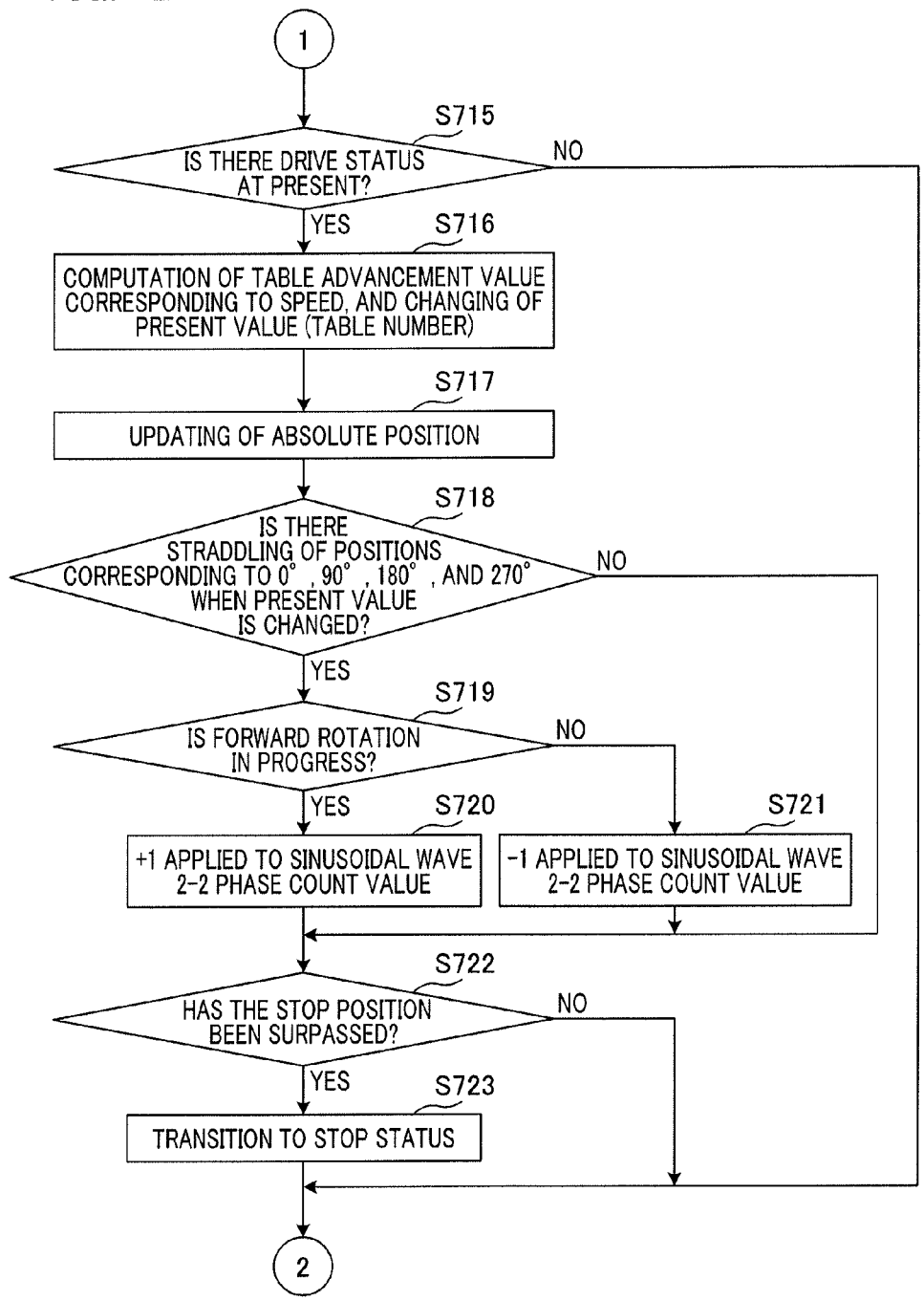
FIG. 42 is a flowchart illustrating the processing example that continues from FIG. 41.

Next, with reference to the flowcharts shown in FIGS. 40 and 42, count value correction processing is described. FIG. 40 is a flowchart illustrating command issuance processing relative to the sinusoidal wave generator 109 by the CPU 108. Processing starts in S701, and processing is performed in S702 in which a sinusoidal wave 2-2 phase count value and an ENC count value are initialized by the same value.

An ENC count value is a value (first count value) that is added or subtracted according to a change in the ENC0 signal and the ENC1 signal. In a state where the ENC0 signal leads the ENC1 signal, i.e., when level change occurs in the ENC0 signal and the ENC1 signal during driving in the direction of forward rotation, 1 is added to the count value. When the ENC1 signal leads the ENC0 signal during reverse rotation, 1 is subtracted from the count value.

Figure 43:
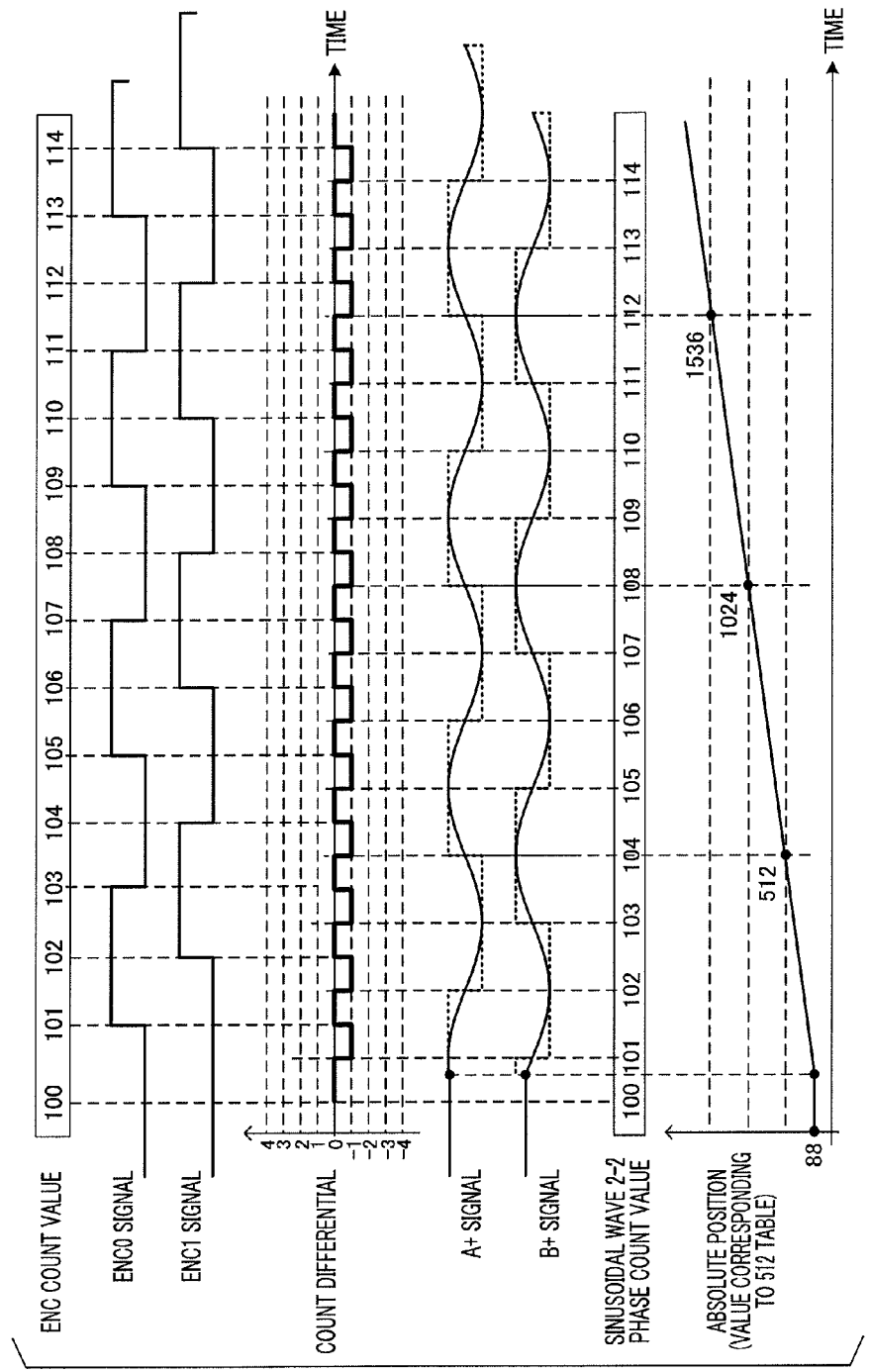
FIG. 43 is a diagram illustrating an example of correction processing.

A sinusoidal wave 2-2 phase count value is a value (second count value) that is counted in the sinusoidal wave generator 109 at every 90 degree advancement of a sinusoidal wave phase. That is, a counting operation is performed at every phase in which a sinusoidal wave signal passes a zero-cross point. When a sinusoidal wave table number value for which a present table number corresponds to any one of 0°, 90°, 180°, or 270° during forward rotation is surpassed, 1 is added to the count value. When a sinusoidal wave table number value for which a present table number corresponds to any one of 0°, 90°, 180°, or 270° during reverse rotation is surpassed, 1 is subtracted from the count value. In the present processing, as shown in FIG. 43, the sinusoidal wave 2-2 phase count value and the ENC count value are initialized by 100. FIG. 43 shows an example of correction processing, exemplifying a sinusoidal wave 2-2 phase count value, an ENC count value, and a count differential of the two. The A+ signal and the B+ signal respectively indicate drive waveform signals pertaining to the stators A+ and B+.

The CPU 108 sets a stop position of rotational operation in the subsequent S703, and sets a drive speed in S704. A sinusoidal wave signal with a frequency corresponding to this drive speed is output from the sinusoidal wave generator 109 to the PWM generator 111. From the results of comparison of the present position and the stop position that was set in S703, it is determined whether the stepping motor 101 is rotating in the direction of forward rotation or the direction of reverse rotation. A drive initiation request command is issued by the CPU 108 in S705, and processing terminates at 706.

Figure 41:
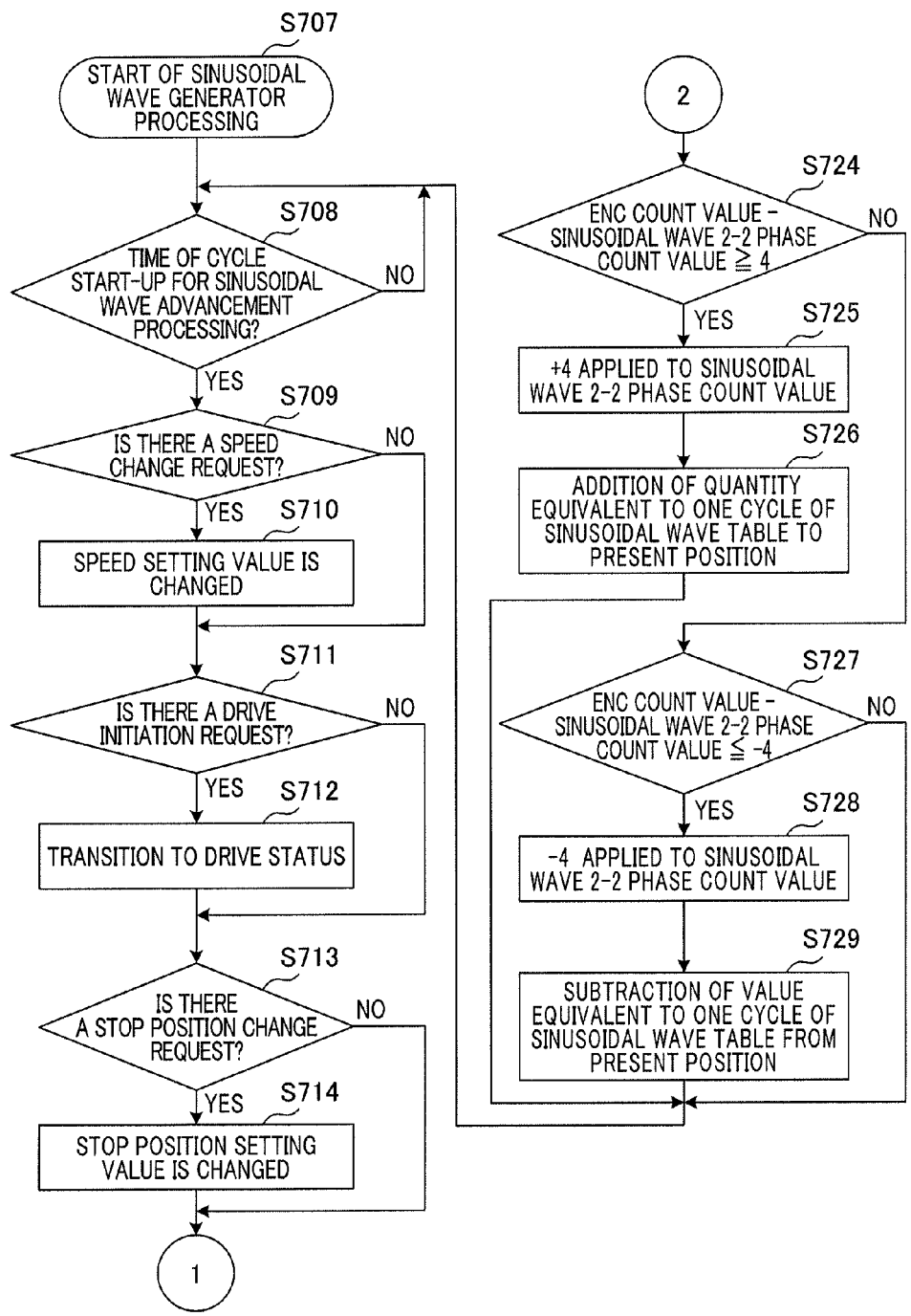
FIG. 41 is a flowchart illustrating a processing example according to a sinusoidal wave generator in conjunction with FIG. 42.

FIGS. 41 and 42 are flowcharts illustrating processing examples of the sinusoidal wave generator 109 that operates upon receiving a command from the CPU 108. Processing starts in S707. In S708, it is determined whether or not a prescribed time has elapsed from the point when fixed cycle processing of the sinusoidal wave generator 109 was last performed. If the prescribed time has elapsed, transition occurs to S709, and if the prescribed time has not elapsed, standby processing occurs in which the determination processing of S708 is repeated. S709 is processing which determines whether a speed change request has been received from the CPU 108. Processing advances to S710 when a speed change request is received from the CPU 108, whereupon data indicating the requested speed is stored in a corresponding variable in the sinusoidal wave generator 109, and the speed setting value is changed. On the other hand, transition occurs to S711 if there is no speed change request.

In S711, the sinusoidal wave generator 109 determines whether or not a drive initiation request has been received from the CPU 108. When a drive initiation request is received, processing advances to S712, and the sinusoidal wave generator 109 changes the internal status to the drive status. For example, a value such as a variable or flag indicating the internal status is changed. Processing advances to S713 when there is no drive initiation request from the CPU 108. In S713, the sinusoidal wave generator 109 determines whether or not a stop position change request has been received from the CPU 108. When the sinusoidal wave generator 109 receives a stop position change request from the CPU 108, processing advances to S714, the data of the requested stop position is stored in a corresponding variable in the sinusoidal wave generator 109, the stop position setting value was changed, and processing advances to S715 of FIG. 42. When there is no stop position change request, transition occurs to S715 of FIG. 42.

In S715, the sinusoidal wave generator 109 determines whether or not the present internal status is a drive status. Processing advances to S716 when the present status is a drive status, and transition occurs to S724 of FIG. 41 when there is no drive status. In S716, processing is performed in which a sinusoidal wave phase amount is calculated that is supposed to advance in accordance with the presently set speed, and the start-up cycle of the sinusoidal wave generator 109, and the sinusoidal wave table value that is output to the PWM generator 111 is changed. At this time, the table value is added to the output during forward rotation, and subtraction processing is performed during reverse rotation. As the scope of the table numbers illustrated in this processing runs from 0 to 511, when the additive result in forward rotation is a value of 512 or more, normalization processing is performed, and a table number value is set so that a return to 0 occurs, and a continuous sinusoidal wave is output. In the case of reverse rotation, setting is similarly performed so that a continuous sinusoidal wave is output.

And the subsequent as 717, processing is performed that updates an absolute position. The absolute value illustrated in FIG. 43 is the value 88 at the start position prior to driving. After driving initiation, additive processing is performed which is proportionate to the phase change amount that is the portion of advancement of the table number value. Consequently, 512 is added to the absolute position if the sinusoidal wave advances by a one cycle portion in the direction of forward rotation. On the other hand, 512 is subtracted from the absolute position if the sinusoidal wave advances by a one cycle portion in the direction of reverse rotation. This absolute position is an integrated value of how many motor drive waveform signals were output, and represents how much the rotor has rotated to the present point in time.

In S718, it is determined whether or not, when the present table number is changed in S716, the values respectively corresponding to 0°, 90°, 180°, and 270° of the output sinusoidal wave, i.e., the values of 0, 128, 256, and 384 in terms of table numbers, have been straddled. Processing advances to S719 when the table numbers were changed by straddling these values, and processing advances to S722 when this is not the case. In S719, it is determined whether the present rotational direction is the direction of forward rotation or the direction of reverse rotation. Processing advances to S720 in the case of forward rotation, and processing is performed in which 1 is added to the value of the sinusoidal wave 2-2 phase count. Processing advances to S721 in the case of reverse rotation, and processing is performed in which 1 is subtracted from the sinusoidal wave 2-2 phase count value. In the subsequent S722, it is determined whether or not the present absolute position pertaining to motor driving has surpassed the set stop position. Processing advances to S723 when the stop position is surpassed, and the sinusoidal wave generator 109 changes the internal status to the stop status. Processing advances to S724 of FIG. 41 when the stop position is not surpassed in S722.

Figure 44:
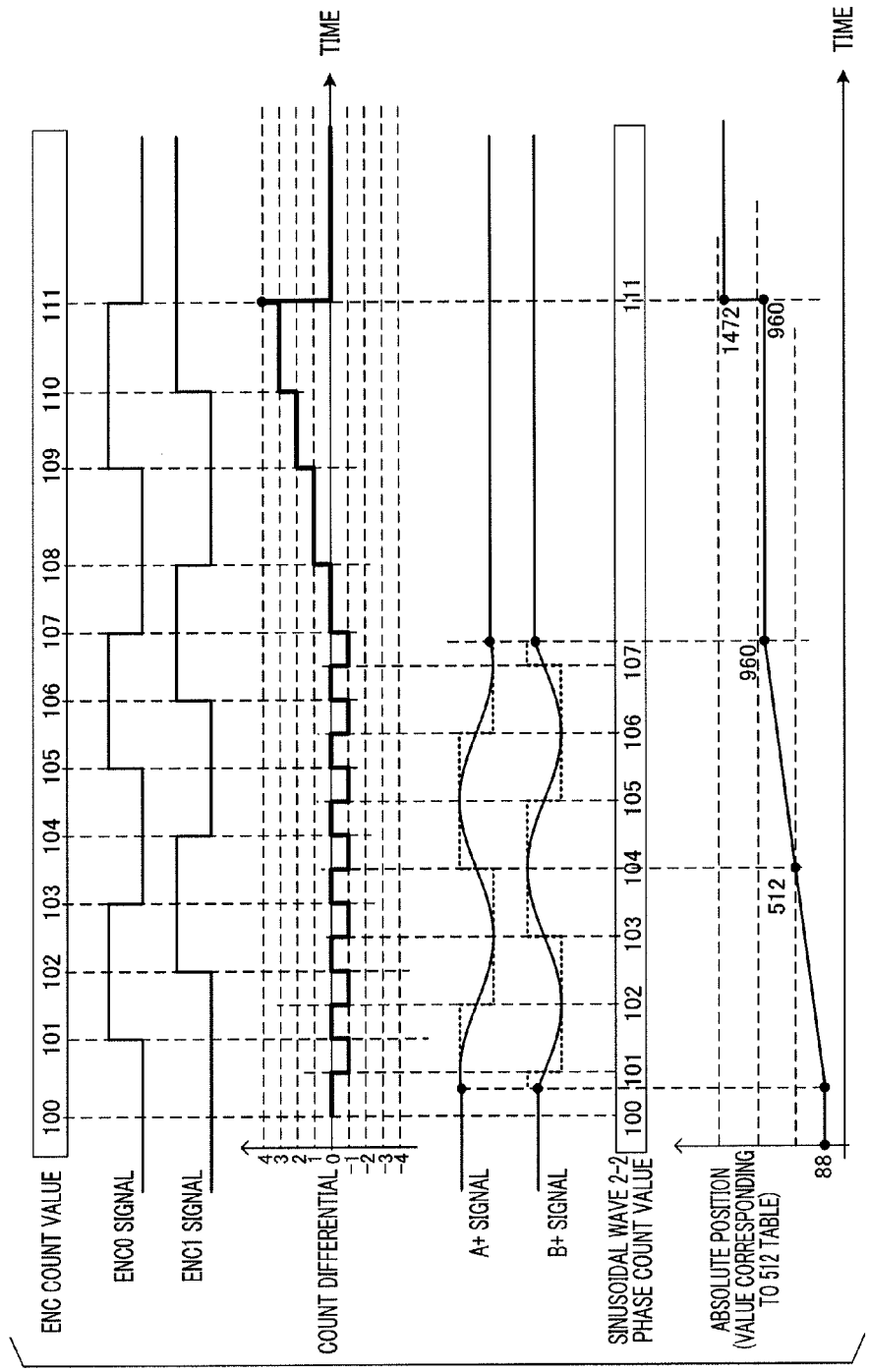
FIG. 44 is a diagram illustrating a processing example in the case where a rotor shaft continues to rotate due to inertia after drive stoppage.

In 724, the sinusoidal wave 2-2 phase count value is subtracted from the ENC count value, and it is determined whether or not this value is at or above a threshold value. The threshold value in the present example is 4, and is the value corresponding to 1 cycle of a drive waveform. Processing advances to S725 when the result of subtraction is 4 or more, and processing advances to S727 when the result of subtraction is less than 4. In S725, 4 is added to the sinusoidal wave 2-2 phase count value. In the subsequent S726, the phase quantity corresponding to 1 cycle of sinusoidal wave table numbers, i.e., 512 is added to an absolute value indicating the present position, and a return to the processing of S708 occurs. FIG. 44 illustrates the case where the series of processing steps shown in S724 to S726 is performed. In this example, the case is represented where the rotor shaft 102 continues to rotate from inertia after drive stoppage, and runs too far.

In this example, as application of the drive waveform signal is stopped at the location of absolute position 960, the sinusoidal wave 2-2 phase count value stops at 107. However, as the rotor continues to rotate due to inertia, the respective outputs of the ENC0 signal and the ENC1 signal continue, and the ENC count value increases to 111. When the motor experiences step-out, a stable corresponding point of the rotor and the applied voltage appears at every increase of 4 in the ENC count value. In the example of FIG. 44, the rotor settles into a state of balance with applied voltage from the stator at a point where there is a 1-cycle displacement in the magnetization phase of the rotor magnet 119. At this time, processing is performed by the CPU 108 in which 512 is added to the absolute position 960 at the point when the ENC count value is 111 to bring about correction to 1472, and the sinusoidal wave 2-2 count value becomes 111 by the addition of 4.

Again, we return to the description of the flowchart of FIG. 41. In S727, it is determined whether or not the value obtained by subtracting the sinusoidal wave 2-2 phase count value from the ENC count value is −4 or less. Processing advances to S728 when the value resulting from subtraction is −4 or less, and processing returns to S708 when the value resulting from subtraction is larger than −4. In S728, 4 is subtracted from the sinusoidal wave 2-2 phase count value. In the subsequent S729, a phase quantity corresponding to 1 cycle of sinusoidal wave table numbers, i.e., 512 is subtracted from the absolute value indicating the present position, and return to the processing of S708 occurs.

Figure 45:
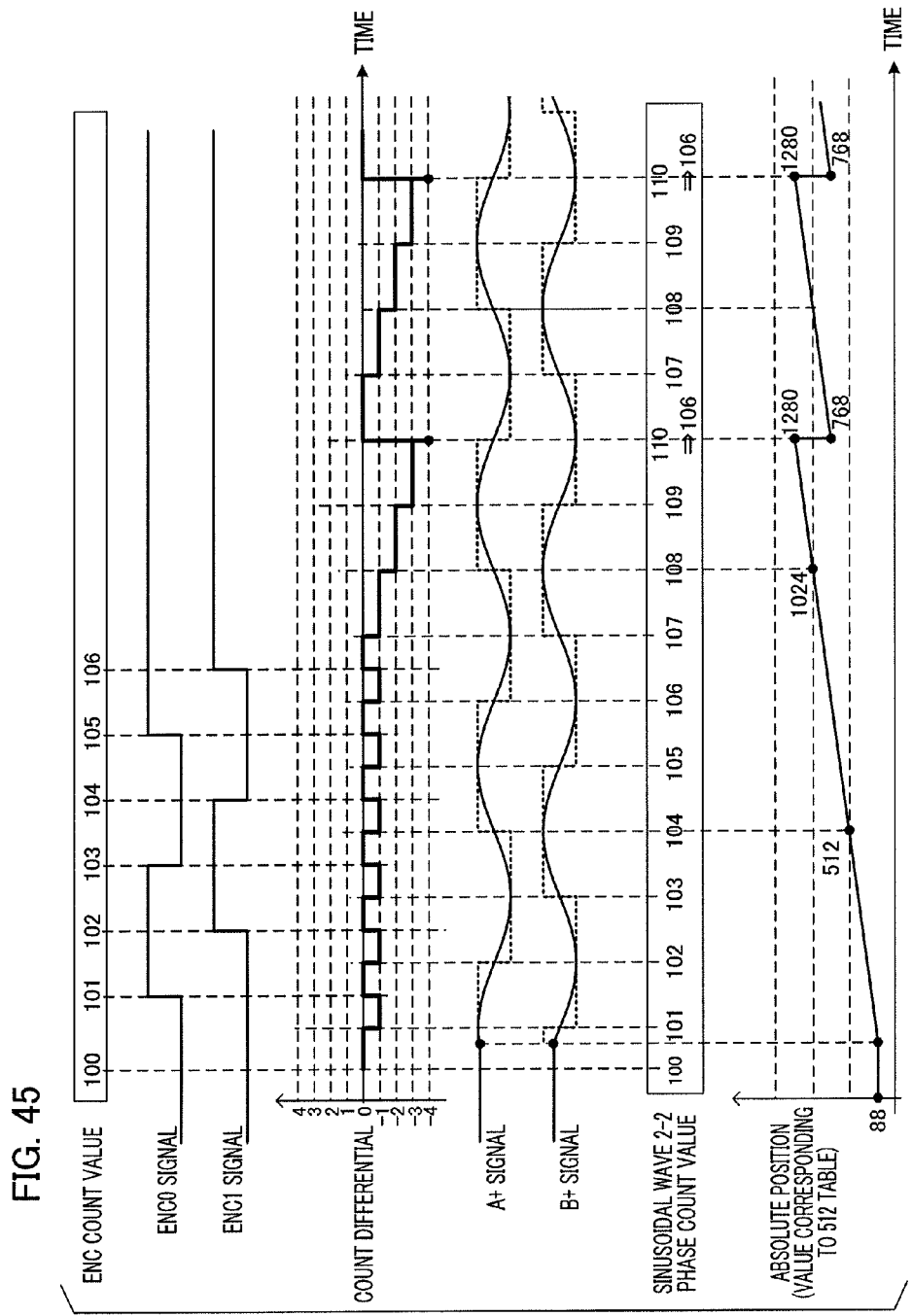
FIG. 45 is a diagram illustrating a processing example in the case where a rotor does not rotate even when application of a drive waveform signal is pursued.

FIG. 45 illustrates the case where the series of processing steps shown in S727 to S729 is carried out. This example represents the case where, although drive waveform signal application continues, the rotor does not rotate for the reason that an excessive load is imposed on the rotor or the like. In this case, the ENC count value stops at the position of 106. However, the sinusoidal wave 2-2 phase count value continues to increase, because application of the drive waveform signals is sustained. After the addition, −4 is the value obtained by subtracting the sinusoidal wave 2-2 phase count value from the ENC count value at the point where the sinusoidal wave 2-2 phase count value is 110. At this time, 106 is obtained by subtracting 4 from the sinusoidal wave 2-2 phase count value, and 512 is subtracted from the absolute position (1280−512=768). As the ENC count value does not change even after this, the same corrective processing is again performed at the point where the sinusoidal wave 2-2 phase count value becomes 110.

By means of the count value correction processing described above, correction of position displacement relative to an integrated value of a phase quantity of an applied drive waveform is performed even when the motor cannot be driven due to occurrence of a temporary overload during driving of the stepping motor. At this time, processing that drives the motor and the like is not needed in order to correct a position displacement after stoppage has once occurred at a mistaken stop position.

In the count value correction processing performed under excessive load shown in FIG. 45, an example is described where reversion to normal operation is prompted by continuous application of drive waveform signals to the motor. However, one is not limited thereto, and it may also be performed by adding timeout processing that stops a drive waveform signal after elapse of a fixed period of time. That is, correction processing for a second count value is stopped when no change is detected in a position detection signal for a fixed period of time or more after a change in the pertinent signal has been detected. Or, it may also be performed by adding processing in which drive waveform application is stopped when it is determined that reversion to normal processing does not occur even when a given number of drive waveforms signal outputs is performed. That is, correction processing for a second count value is stopped when, after detection of change in a position detection signal, a given number or more of drive waveform signals has been applied to the aforementioned motor during a period in which no change is detected in the pertinent signal for a fixed time or more.

Figure 46A:
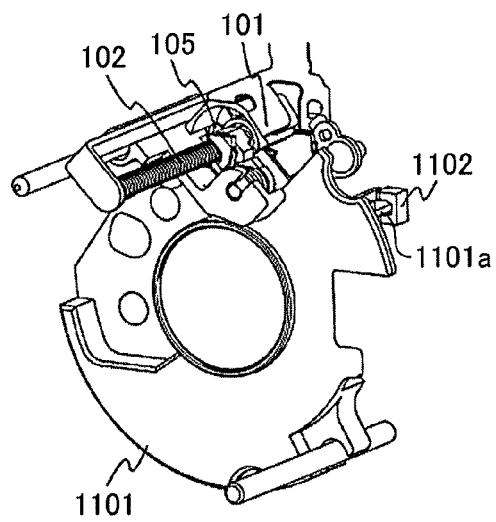
FIGS. 46A and 46B are perspective views illustrating an example of application to a lens unit.
Figure 46B:
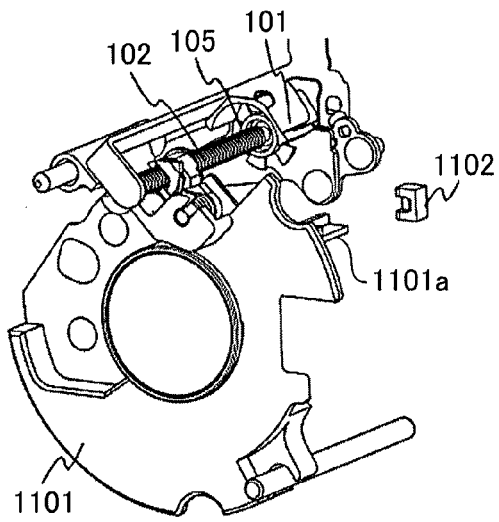

As shown in FIG. 46, when the aforementioned motor unit is applied to an actual mechanism, this processing may be stopped in circumstances where its implementation would be meaningless, or where no problems would occur if it were implemented. FIGS. 46a and 46b show an example of application of a motor unit 100 of the present processing to a lens unit. The diagrams show a stepping motor 101, a rotor shaft 102, and a slit rotating plate 105. A lens holder 1101 is the member that is subject to control by motor driving. When the stepping motor 101 is rotated, the lens holder 1101 is moved in the direction of the rotor shaft 102. The lens holder 1101 is provided with a light-intercepting plate 1101a for a reset PI 1102, and a reference position of the lens holder 1101 is determined using the reset PI 1102. In the processing that determines a reference position of the lens holder 1101, processing is performed in which the lens holder 1101 is moved in an appropriate direction according to a present light/dark state of the reset PI 1102, and a position at which the light/dark state of the reset PI 1102 changes is determined as the reference position. During the reference position determination processing, the above-described position displacement correction processing is not applied, because no absolute position of the lens holder 1101 relative to the lens unit is determined. Consequently, processing load is reduced.

When a state of temporary blockage (mechanical binding or the like) occurs in the lens holder 1101, release processing is performed with operations in which the lens holder 1101 undergoes short-distance reciprocating operation in a short time. As the aforementioned position displacement correction processing is performed at this time, it may happen that a release effect is not obtained as expected. In release operations from a state of binding, control is repetitively performed in which drive waveforms are output in a short time for driving the motor in a first direction, followed by output of drive waveforms in a short time for driving in an opposite second direction. When the correction processing is performed in this case, because the lens does not move, the drive waveform signals are not output within a short time, but are continuously output in the interval until timeout occurs, with the result that the expected release operation does not happen. Consequently, the correction processing is stopped when processing is performed for release from a state of temporary blockage.

According to the above processing, even when the rotor runs too far by exceeding a planned position after motor stoppage, the corrected result can be reflected in the actual positioning control by performing correction by constant visual observation of the overrun amount.

Processing was described above with exemplification of a stepping motor, but the present invention is not limited thereto, and may also be applied to other types of motors provided that they are motors to which an encoder is added, and in which the rotational amount and drive amount are determined according to a wavenumber of applied drive waveform signals.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2012-170253 filed Jul. 31, 2012, Japanese Patent Application No. 2012-170254 filed Jul. 31, 2012, and Japanese Patent Application No. 2012-172375 filed Aug. 2, 2012, which are hereby incorporated by reference herein in their entirety.

What is claimed is:

1. A motor control apparatus that drives by application of a drive waveform to a motor, the motor control apparatus comprising:
    a detection unit configured to output a positional detection signal according to a rotation of the motor, and
    an acquire unit configured to acquire a phase value corresponding to a phase of the drive waveform of the motor; and
    a control unit configured to change a cycle of the drive waveform based on the phase of the drive waveform of the motor,
    wherein the control unit controls to change a cycle of the drive waveform to a cycle in which a difference between a phase value of the drive waveform and a target phase value at a second timing in which a travel time has elapsed from a first timing is smaller than a difference between a phase value of the drive waveform and a target phase value at the first timing by gradually changing a voltage of the drive waveform in a case where the phase value of the drive waveform acquired at the first timing of the signal differs from the target phase value at the first timing, and
    wherein the positional detection signal includes a first level and a second level and the first timing corresponds to a timing at which the positional detection signal switches between the first level and the second level.

2. The motor control apparatus according to claim 1, wherein the control unit controls to change a phase relationship of the drive waveform and the positional detection signal during driving of the motor.

3. The motor control apparatus according to claim 1, wherein the detection unit comprises a detection unit configured to detect a position of the motor or a unit to be detected attached to the motor.

4. The motor control apparatus according to claim 3, wherein the detection unit further comprises:
    a comparison unit configured to compare an output of the detection unit with a threshold value to generate a binary signal.

5. The motor control apparatus according to claim 1, wherein the control unit controls to change the cycle of the drive waveform to a cycle in which the phase value of the drive waveform matches the target phase value at the timing in which the travel time has elapsed from the first timing.

6. The motor control apparatus according to claim 1, wherein the control unit continuously changes the cycle of the drive waveform.

7. The motor control apparatus according to claim 1, wherein a number of times an intensity change of the drive wave is detected in one cycle is greater than an number of times an intensity change of the positional detection signal is detected in one cycle.

8. The motor control apparatus according to claim 7, wherein the drive wave having a sinusoidal waveform.

9. The motor control apparatus according to claim 8, wherein the positional detection signal is rectangular signal.

10. The motor control apparatus according to claim 9, wherein control unit controls to change the travel time during driving of the motor by calculating and setting the travel time based on a cycle of the drive waveform.

11. The motor control apparatus according to claim 9, wherein the control unit controls to change a phase relationship between the drive waveform and the positional detection signal during driving of the motor, and
    wherein the control unit controls to change the travel time during driving of the motor by calculating and setting the pertinent travel time from a cycle of the drive waveform that has been measured.

12. The motor control apparatus according to claim 9, wherein the travel time is set to a predetermined ratio with respect to the cycle of the drive waveform.

13. The motor control apparatus according to claim 1, wherein the drive wave having a sinusoidal waveform and the positional detection signal is rectangular signal.

14. The motor control apparatus according to claim 1, wherein the control unit configured to measure a time from a timing at which the positional detection signal has previously switched between the first level and the second level to a timing at which the positional detection signal has presently switched between the first level and the second level.

15. The motor control apparatus according to claim 1, wherein the target phase value is determined based on a determined advance angle.

16. The motor control apparatus according to claim 15, wherein the control unit configured to gradually change the cycle of the drive waveform to a cycle in which the phase value of the drive waveform and the target phase value is at a second timing.

17. The motor control apparatus according to claim 1, wherein the control unit configured to gradually change the cycle of the drive waveform during the travel time.

18. The motor control apparatus according to claim 1, wherein the control unit configured to gradually change the cycle of the drive waveform to a cycle in which the phase value of the drive waveform and the target phase value is at a second timing.

19. The motor control apparatus according to claim 1, wherein the motor control apparatus controls a move of a lens holder by controlling the drive waveform to the motor.

20. A motor control method that is executed by a motor control apparatus for driving by application of a drive waveform to a motor, the method comprising:
    detecting a signal corresponding to a rotation position of the motor detected by a detection unit;
    outputting a positional detection signal according to the rotation of the motor;
    acquiring a phase value corresponding to a phase of the drive waveform of the motor; and
    changing a cycle of the drive waveform based on the phase of the drive waveform of the motor,
    wherein a cycle of the drive waveform is changed to a cycle in which a difference between a phase value of the drive waveform and a target phase value at a second timing in which a travel time has elapsed from a first timing is smaller than a difference between a phase value of the drive waveform and a target phase value at the first timing by gradually changing a voltage of the drive waveform in a case where the phase value of the drive waveform acquired at the first timing of the signal differs from the target phase value at the first timing, and
    wherein the positional detection signal includes a first level and a second level, and the first timing corresponds to a timing at which the positional detection signal switches between the first level and the second level.

21. The motor control method according to claim 20, wherein the phase relationship of the drive waveform and the positional detection signal is changed during driving of the motor.

22. The motor control method according to claim 21, wherein a phase relationship between the drive waveform and the positional detection signal is changed during driving of the motor, and
   wherein the travel time is changed during driving of the motor by calculating the travel time from a cycle of the drive waveform that has been measured and setting.

23. The motor control method according to claim 20, wherein the travel time is changed during driving of the motor by calculating and setting the travel time based on a cycle of the drive waveform.

24. The motor control method according to claim 20, wherein the motor control apparatus controls a move of a lens holder by controlling the drive waveform of the motor.

\* \* \* \* \*